US012580919B2

(12) United States Patent
Xin et al.

(10) Patent No.: US 12,580,919 B2
(45) Date of Patent: *Mar. 17, 2026

(54) INFORMATION PROCESSING METHOD AND APPARATUS

(71) Applicant: Huawei Technologies Co., Ltd., Shenzhen (CN)

(72) Inventors: Yang Xin, Shanghai (CN); Xiaobo Wu, Shenzhen (CN); Manli Sun, Shenzhen (CN); Fangyuan Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,013

(22) Filed: Dec. 29, 2022

(65) Prior Publication Data

US 2023/0133980 A1     May 4, 2023

Related U.S. Application Data

(63) Continuation of application No. 17/131,127, filed on Dec. 22, 2020, now Pat. No. 11,595,810, which is a
(Continued)

(30) Foreign Application Priority Data

| Jun. 26, 2018 | (CN) | .......................... | 201810705963.8 |
| Feb. 25, 2019 | (CN) | ........................ | 201910143741.X |

(51) Int. Cl.
| *H04L 9/40* | (2022.01) |
| *H04L 41/14* | (2022.01) |
(Continued)

(52) U.S. Cl.
CPC ............ *H04L 63/102* (2013.01); *H04L 41/14* (2013.01); *H04W 8/02* (2013.01); *H04W 8/22* (2013.01)

(58) Field of Classification Search
None
See application file for complete search history.

(56) References Cited

U.S. PATENT DOCUMENTS

| 8,775,300 B2 | 7/2014 | Showalter |
| 9,710,767 B1 | 7/2017 | Dietrich et al. |
| | (Continued) | |

FOREIGN PATENT DOCUMENTS

| CN | 103856917 A | 6/2014 |
| CN | 104170419 A | 11/2014 |
| | (Continued) | |

OTHER PUBLICATIONS

S2-183604_pub.date_4-16-2018.pdf (Year: 2018).*
(Continued)

*Primary Examiner* — Jinsong Hu
*Assistant Examiner* — Alexander J Yi
(74) *Attorney, Agent, or Firm* — Conley Rose, P.C.

(57) ABSTRACT

An information processing method includes: obtaining, by a data analytics network element, terminal behavioral information of a plurality of terminals; determining, by the data analytics network element, network-side expected terminal behavioral information based on the terminal behavioral information; and sending, by the data analytics network element, the network-side expected terminal behavioral information to a user data management network element.

20 Claims, 22 Drawing Sheets

Related U.S. Application Data continuation of application No. PCT/CN2019/091795, filed on Jun. 18, 2019.

(51) Int. Cl.
| | |
| --- | --- |
| *H04W 8/02* | (2009.01) |
| *H04W 8/22* | (2009.01) |

(56) References Cited

U.S. PATENT DOCUMENTS

| | | | | |
| --- | --- | --- | --- | --- |
| 9,961,096 | B1 * | 5/2018 | Pierce | ............... H04L 63/1425 |
| 2006/0265376 | A1 | 11/2006 | Tagane et al. | |
| 2009/0043879 | A1 | 2/2009 | Jamieson et al. | |
| 2011/0188403 | A1 | 8/2011 | Calippe et al. | |
| 2012/0252411 | A1 * | 10/2012 | Johnsgard | .......... H04L 63/0861 |
| | | | | 455/411 |
| 2015/0099506 | A1 | 4/2015 | Iwai et al. | |
| 2017/0251355 | A1 | 8/2017 | Lu et al. | |
| 2017/0332282 | A1 | 11/2017 | Dao | |

FOREIGN PATENT DOCUMENTS

| | | |
| --- | --- | --- |
| CN | 107743307 A | 2/2018 |
| EP | 2830338 A1 | 1/2015 |
| RU | 2448423 C2 | 4/2012 |
| WO | 2017222836 A1 | 12/2017 |
| WO | 2018006306 A1 | 1/2018 |
| WO | 2018107368 A1 | 6/2018 |

OTHER PUBLICATIONS

3GPP TR 23.791 V0.4.0, Jun. 2018, "3rd Generation Partnership Project; Technical Specification Group Services and System Aspects; Study of Enablers for Network Automation for 5G (Release 16)," 31 pages.

S2-183604 SA WG2 Meeting #127, "Solution for performance improvement and supervision of mIoT terminals," Apr. 16-20, 2018, 3 pages.

Huawei et al., "Solution for Key Issue 5: NWDAF-Assisted QoS Profile Provisioning," SA WG2 Meeting #127, Apr. 16-20, 2018, Sanya, China, S2-186272, 6 pages.

Huawei, HiSilicon, "Discussion on big data and 5G," SA WG2 Meeting #125, Jan. 22-26, 2018, Gothenburg, Sweden, S2-181250, 14 pages.

Huawei, "Discussion about Big Data Driven Network Architecture." SA WG2 Meeting #121, May 15-19, 2017, Hangzhou, China, S2-173192, 11 pages.

Intel Corporation, CMCC, "Cell reselection for the UE on high-speed-dedicated network," 3GPP TSG RAN WG2 Meeting #100, Reno, United State, Nov. 30 thru Dec. 3, 2017, R2-1712616, 4 pages.

China Mobile, "Further clarification on Solution 8," SA WG2 Meeting #128bis, Aug. 20-24, 2018, Sophia Antipolis, France, S2-188250, 4 pages.

3GPP TS 23.501 V15.2.0 (Jun. 2018), "3rd Generation Partnership Project; Technical Specification Group Services and System Aspects; System Architecture for the 5G System; Stage 2 (Release 15)," 217 pages.

3GPP TS 23.502 V15.2.0 (Jun. 2018), "3rd Generation Partnership Project; Technical Specification Group Services and System Aspects; Procedures for the 5G System; Stage 2 (Release 15)," 308 pages.

3GPP TS 23.682 V15.5.0 (Jun. 2018), "3rd Generation Partnership Project; Technical Specification Group Services and System Aspects; Architecture enhancements to facilitate communications with packet data networks and applications (Release 15)," 125 pages.

3GPP TR 23.724 V0.4.0 (Jun. 2018); "3rd Generation Partnership Project; Technical Specification Group Services and System Aspects; Study on Cellular IoT support and evolution for the 5G System (Release 16)," 180 pages.

China Mobile, "Use Case on mIoT behaviour data collection and analysis," SA WG2 Meeting #126, S2-182086, Feb. 26-Mar. 2, 2018, Montreal, Canada, 2 pages.

China Mobile, "Use Case on mIoT behaviour data collection and analysis," SA WG2 Meeting #126, S2-182353, Feb. 26-Mar. 2, 2018, Montreal, Canada, 2 pages.

China Mobile, "Key issue on performance improvement and supervision of mIoT terminals," Sa WG2 Meeting #127, 82-183601, Apr. 16-20, 2018, Sanya, China, 2 pages.

SA WG2 Meeting #127, S2-183604, "Solution for performance improvement and supervision of mIoT terminals," China Mobile, Apr. 16-20, 2018, 3 pages.

Huawei et al., "Update on Key Issue Description," SA WG2 Meeting #127, S2-183632, Apr. 16-20, 2018, Sanya, China, 3 pages.

China Mobile, "Key issue on performance improvement and supervision of mIoT terminals," SA WG2 Meeting #127, S2-183948, Apr. 16-20, 2018, Sanya, China, 2 pages.

China Mobile, "Key issue on performance improvement and supervision of mIoT terminals," SA WG2 Meeting #127, S2-184575, Apr. 16-20, 2018, Sanya, China, 2 pages.

Nokia et al., "23.791: update to general Framework," SA WG2 Meeting #127b, S2-185125, May 28-Jun. 1, 2018, Newport Beach, USA, 3 pages.

3GPP TSG-SA WG2 Meeting #127 Sanya, China, S2-184631, New use case: Prevention of various security attacks, Orange, Apr. 16-20, 2018, total 1 page.

* cited by examiner

Input layer          Hidden layer          Output layer

INFORMATION PROCESSING METHOD AND APPARATUS

CROSS-REFERENCE TO RELATED APPLICATIONS

This application is a continuation of U.S. patent application Ser. No. 17/131,127, filed on Dec. 22, 2020, which is a continuation of International Patent Application No. PCT/CN2019/091795, filed on Jun. 18, 2019. The International Application claims priority to Chinese Patent Application No. 201910143741.8, filed on Feb. 25, 2019 and Chinese Patent Application No. 201810705963.X, filed on Jun. 26, 2018. All of the afore-mentioned patent applications are hereby incorporated by reference in their entireties.

TECHNICAL FIELD

Embodiments of this application relate to the field of communications technologies, and in particular, to an information processing method and apparatus.

BACKGROUND

In 5th generation (5G) communications technologies, massive Internet of things (mIoT) terminals are introduced. In other approaches, on a 5G network side, a third-party network element (such as an application function (AF) network element) is allowed to provide some third-party or server-expected terminal behavioral information (expected user equipment (UE) behavioral information), and then a 5G network element in the 5G network may use the third-party or server-expected terminal behavioral information provided by the AF network element. For example, the 5G network element may store the network-expected terminal behavioral information in a unified data management (UDM) network element as a part of subscription information of a terminal.

However, a process in which the AF network element provides the third-party or server-expected terminal behavioral information to the 5G network element is not a mandatory process. Therefore, when the AF network element does not provide the network-expected terminal behavioral information, the UDM network element may be unable to update the subscription information of the mIoT terminal. In addition, for an operator network, the expected terminal behavioral information provided by the AF network element has relatively low reliability.

SUMMARY

Embodiments of the present disclosure provide an information processing method and apparatus, to provide network-expected terminal behavioral information with relatively high reliability.

To resolve the foregoing problem, the embodiments of this application provide the following technical solutions.

According to a first aspect, this application provides an information processing method, including: obtaining, by a data analytics network element, terminal behavioral information of a plurality of terminals; determining, by the data analytics network element, network-expected terminal behavioral information based on the terminal behavioral information; and sending, by the data analytics network element, the network-expected terminal behavioral information to a user data management network element.

This embodiment of this application provides the information processing method. The data analytics network element obtains the terminal behavioral information of the plurality of terminals, determines the network-expected terminal behavioral information based on the terminal behavioral information of the plurality of terminals, and then sends the network-expected terminal behavioral information to the user data management network element. Because the data analytics network element is a network element managed by an operator, compared with third-party or server-expected terminal behavioral information provided by an application function network element in other approaches, the network-expected terminal behavioral information has higher reliability and is more real. In addition, the network-expected terminal behavioral information provided by the data analytics network element is more comprehensive. In addition, the network-expected terminal behavioral information provided by the data analytics network element may further be used to check third-party or server-expected terminal behavioral information provided by an application function network element.

In a possible implementation, the obtaining, by a data analytics network element, terminal behavioral information of a plurality of terminals includes: obtaining, by the data analytics network element from at least two core network elements, terminal behavioral information respectively corresponding to the at least two core network elements in the terminal behavioral information. The data analytics network element obtains, from the at least two core network elements, the terminal behavioral information that is of the plurality of terminals and that is on the at least two core network elements, such that the terminal behavioral information obtained by the data analytics network element can be more comprehensive.

In a possible implementation, the method provided in this embodiment of this application further includes: sending, by the data analytics network element, a first request message to the at least two core network elements, where the first request message requests the terminal behavioral information that corresponds to the plurality of terminals and that is on the at least two core network elements. In this way, the at least two core network elements are triggered to send the terminal behavioral information of the plurality of terminals to the data analytics network element.

In a possible implementation, the first request message includes filtering information that indicates a collection range of terminal behavioral information of each of the plurality of terminals. On one hand, it is convenient for the at least two core network elements to determine the range for collecting the terminal behavioral information of each terminal. On the other hand, the core network elements collect the terminal behavioral information of each terminal based on the filtering information, such that the terminal behavioral information collected by the at least two core network elements can meet a requirement of a network side.

In a possible implementation, the filtering information includes one or more of the following information: identification information of the terminal, a network area corresponding to the terminal, a terminal type corresponding to the terminal, or a time window corresponding to the terminal. This further narrows the range for collecting the terminal behavioral information by the at least two core network elements.

For example, the identification information of the terminal in this embodiment of this application may be one or more of the following: an Internet Protocol (IP) address, a subscription permanent identifier (SUFI), a permanent equipment identifier (PEI), a generic public subscription identifier (GPSI), an international mobile subscriber identifier (IMSI), an international mobile equipment identity (IMEI), an IP 5-tuple, or a mobile station international integrated service digital network number (MSISDN). For identification information of a terminal in the following embodiments, refer to the descriptions herein. Details are not described subsequently again.

In a possible implementation, the terminal behavioral information includes the identification information of the terminal and one or more of the following information corresponding to the terminal: identification information of a core network element, location information, a communication start time, a communication end time, a packet delay, a quantity of packets, a packet size, or at least one piece of first-type data of the terminal that corresponds to the core network element. Therefore, the obtained terminal behavioral information has wider coverage and is more comprehensive.

In a possible implementation, the location information corresponding to the terminal includes a time and a location, and the location information indicates a location of the terminal in a particular time.

For example, the location information of the terminal in this embodiment of this application may be one or more of the following information: a radio access network (RAN) identifier (RAN ID), a cell identifier (Cell ID), a tracking area (TA), a routing area (RA), or a Global Positioning System (GPS). For location information of a terminal in the following embodiments, refer to the descriptions herein. Details are not described subsequently again.

In a possible implementation, the obtaining, by a data analytics network element, terminal behavioral information of a plurality of terminals includes: obtaining, by the data analytics network element from an operation, administration and maintenance network element, the terminal behavioral information respectively corresponding to at least two core network elements in the terminal behavioral information.

In a possible implementation, the network-expected terminal behavioral information includes one or more of the following information: a stationary indication, a terminal moving trajectory, a periodic communication indicator, communication duration, a communication period, a scheduled communication time, a maximum packet transmission delay, a maximum packet transmission response time, a quantity of buffered packets, or at least one piece of second-type data.

In a possible implementation, the network-expected terminal behavioral information includes network-expected terminal behavioral information corresponding to at least one group of terminals in the plurality of terminals.

In a possible implementation, the method provided in this embodiment of this application further includes: sending, by the data analytics network element to the user data management network element, first information of the terminals corresponding to the network-expected terminal behavioral information, where the first information of the terminals includes the identification information of the terminals or identification information of a terminal group.

In a possible implementation, the network-expected terminal behavioral information includes network-expected terminal behavioral information corresponding to the at least two core network elements. As such, after receiving the network-expected terminal behavioral information, the user data management network element sends, to each core network element based on the network-expected terminal behavioral information corresponding to the at least two core network elements, network-expected terminal behavioral information corresponding to each core network element.

In a possible implementation, the method provided in this embodiment of this application further includes: sending, by the data analytics network element, at least one of identification information and type information of the at least two core network elements to the user data management network element. The identification information of the core network element indicates the core network element corresponding to the network-expected terminal behavioral information, and the type information of the core network element indicates a type of the core network element corresponding to the network-expected terminal behavioral information. In this way, the user data management network element determines a core network element to which the network-expected terminal behavioral information is sent.

In a possible implementation, the method provided in this embodiment of this application further includes: determining, by the data analytics network element, exception type of a terminal based on the network-expected terminal behavioral information; and sending, by the data analytics network element, alarm information to a policy control function network element, where the alarm information indicates the exception type of the terminal. In this way, the policy control function network element determines the exception type of the terminal, and then takes a further measure, for example, disables a network used for an abnormal terminal.

In a possible implementation, the method provided in this embodiment of this application further includes: receiving, by the data analytics network element, a second request message from the user data management network element, where the second request message requests the network-expected terminal behavioral information, and the second request message includes the identification information of the plurality of terminals. The data analytics network element may obtain the network-expected terminal behavioral information in response to the request of the user data management network element.

According to a second aspect, an embodiment of this application provides an information sending method, including: receiving, by a core network element, a first request message from a data analytics network element and that requests terminal behavioral information corresponding to a plurality of terminals; and sending, by the core network element to the data analytics network element based on the first request message, the terminal behavioral information that corresponds to the plurality of terminals and that is on the core network element. The core network element receives the first request message from the data analytics network element, and sends, to the data analytics network element under triggering of the first request message, the terminal behavioral information that corresponds to the plurality of terminals and that is on the core network element. In this way, the data analytics network element can obtain more comprehensive terminal behavioral information.

In a possible implementation, the first request message includes filtering information that indicates a collection range of terminal behavioral information of each of the plurality of terminals.

In a possible implementation, the filtering information includes one or more of the following information: identification information of the terminal, a network area corresponding to the terminal, a terminal type corresponding to the terminal, and a time window corresponding to the terminal.

In a possible implementation, the terminal behavioral information includes the identification information of the terminal and one or more of the following information corresponding to the terminal: identification information of a core network element, location information, a communication start time, a communication end time, a packet delay, a quantity of packets, a packet size, and at least one piece of first-type data of the terminal that corresponds to the core network element.

In a possible implementation, the location information corresponding to the terminal includes a time and a location, and the terminal is at the location in the time.

In a possible implementation, the core network element may send, to the data analytics network element using an operation, administration and maintenance network element, the terminal behavioral information that corresponds to the plurality of terminals and that is on the core network element. For example, the core network element sends, to the operation, administration and maintenance network element, the terminal behavioral information that corresponds to the plurality of terminals and that is on the core network element; and the operation, administration and maintenance network element is configured to send, to the data analytics network element, the terminal behavioral information that corresponds to the plurality of terminals and that is on the core network element.

According to a third aspect, an embodiment of this application provides an information processing method, including: receiving, by a user data management network element, network-expected terminal behavioral information from a data analytics network element; and using, by the user data management network element, the network-expected terminal behavioral information as user subscription data.

This embodiment of this application provides the information processing method. The user data management network element receives the network-expected terminal behavioral information from the data analytics network element, and stores the network-expected terminal behavioral information as user subscription data of a terminal. In this way, reliability of the network-expected terminal behavioral information provided by the data analytics network element can be higher.

In a possible implementation, the method provided in this embodiment of this application further includes: sending, by the user data management network element, a second request message to the data analytics network element, where the second request message requests the network-expected terminal behavioral information, and the second request message includes identification information of a plurality of terminals.

In a possible implementation, the network-expected terminal behavioral information includes one or more of the following information: a stationary indication, a terminal moving trajectory, a periodic communication indicator, communication duration, a communication period, a scheduled communication time, a maximum packet transmission delay, a maximum packet transmission response time, a quantity of buffered packets, or at least one piece of second-type data.

In a possible implementation, the network-expected terminal behavioral information includes network-expected terminal behavioral information corresponding to at least one group of terminals in the plurality of terminals.

In a possible implementation, the method provided in this embodiment of this application further includes: receiving, by the user data management network element, first information of the terminals that corresponds to the network-expected terminal behavioral information from the data analytics network element, where the first information of the terminals includes the identification information of the terminals or identification information of a terminal group.

In a possible implementation, the network-expected terminal behavioral information includes network-expected terminal behavioral information corresponding to at least two core network elements.

In a possible implementation, the method provided in this embodiment of this application further includes: receiving, by the user data management network element, at least one of identification information and type information of the at least two core network elements from the data analytics network element. The identification information of the core network element indicates the core network element corresponding to the network-expected terminal behavioral information, and the type information of the core network element indicates a type of the core network element corresponding to the network-expected terminal behavioral information.

According to a fourth aspect, this application provides an information processing apparatus. The information processing apparatus can implement the method according to any one of the first aspect or the possible implementations of the first aspect, and therefore can also achieve the beneficial effects according to any one of the first aspect or the possible implementations of the first aspect. The information processing apparatus may be a data analytics network element, or may be an apparatus, for example, a chip applied to a data analytics network element, that can support the data analytics network element in implementing the method according to any one of the first aspect or the possible implementations of the first aspect. The information processing apparatus may implement the foregoing method by software, hardware, or hardware executing corresponding software.

The information processing apparatus according to the fourth aspect includes: an obtaining unit configured to obtain terminal behavioral information of a plurality of terminals; a determining unit configured to determine network-expected terminal behavioral information based on the terminal behavioral information; and a sending unit configured to send the network-expected terminal behavioral information to a user data management network element.

In a possible implementation, the obtaining unit is configured to obtain, from at least two core network elements, terminal behavioral information respectively corresponding to the at least two core network elements in the terminal behavioral information.

In a possible implementation, the sending unit is further configured to send a first request message to the at least two core network elements, and the first request message requests the terminal behavioral information that corresponds to the plurality of terminals and that is on the at least two core network elements.

In a possible implementation, the first request message includes filtering information that indicates a range of terminal behavioral information of each of the plurality of terminals.

In a possible implementation, the filtering information includes one or more of the following information: identification information of the terminal, a network area corresponding to the terminal, a terminal type corresponding to the terminal, or a time window corresponding to the terminal.

In a possible implementation, the terminal behavioral information includes the identification information of the terminal and one or more of the following information corresponding to the terminal: identification information of a core network element, location information, a communication start time, a communication end time, a packet delay, a quantity of packets, a packet size, or at least one piece of first-type data of the terminal that corresponds to the core network element.

In a possible implementation, the location information corresponding to the terminal includes a time period and a location. The location information indicates a specific location of the terminal in each time period. The location information may be a location of the terminal that corresponds to each of one or more time periods.

In a possible implementation, the obtaining unit is configured to obtain, from an operation, administration and maintenance network element, the terminal behavioral information respectively corresponding to the at least two core network elements in the terminal behavioral information.

In a possible implementation, the network-expected terminal behavioral information includes one or more of the following information: a stationary indication, a terminal moving trajectory, a periodic communication indicator, communication duration, a communication period, a scheduled communication time, a maximum packet transmission delay, a maximum packet transmission response time, a quantity of buffered packets, or at least one piece of second-type data.

In a possible implementation, the network-expected terminal behavioral information includes network-expected terminal behavioral information corresponding to at least one group of terminals in the plurality of terminals.

In a possible implementation, the sending unit is further configured to send, to the user data management network element, first information of the terminals corresponding to the network-expected terminal behavioral information, where the first information of the terminals includes the identification information of the terminals or identification information of a terminal group.

In a possible implementation, the network-expected terminal behavioral information includes network-expected terminal behavioral information corresponding to the at least two core network elements.

In a possible implementation, the sending unit is further configured to send at least one of identification information and type information of each of the at least two core network elements to the user data management network element. The identification information of the core network element indicates the core network element corresponding to the network-expected terminal behavioral information, and the type information of the core network element indicates a type of the core network element corresponding to the network-expected terminal behavioral information.

In a possible implementation, the determining unit is further configured to determine exception type of a terminal based on the network-expected terminal behavioral information. The sending unit is further configured to send alarm information to a policy control function network element, where the alarm information indicates the exception type of the terminal.

In a possible implementation, the information processing apparatus further includes a receiving unit configured to receive a second request message from the user data management network element, where the second request message requests the network-expected terminal behavioral information, and the second request message includes the identification information of the plurality of terminals.

In a possible implementation, this embodiment of this application further provides an information processing apparatus. The information processing apparatus may be a data analytics network element or a chip applied to a data analytics network element. The information processing apparatus includes a processor and a communications interface. The communications interface is configured to support the information processing apparatus in performing the message/data receiving and sending steps on the information processing apparatus side that are described in any one of the first aspect or the possible implementations of the first aspect. The processor is configured to support the information processing apparatus in performing the message/data processing steps on the information processing apparatus side that is described in any one of the first aspect or the possible implementations of the first aspect. For a corresponding step, refer to the descriptions in any one of the first aspect or the possible implementations of the first aspect. Details are not described herein again.

Optionally, the communications interface and the processor of the information processing apparatus are coupled to each other.

Optionally, the information processing apparatus may further include a memory configured to store code and data. The processor, the communications interface, and the memory are coupled to each other.

According to a fifth aspect, this application provides an information sending apparatus. The information sending apparatus can implement the method according to any one of the second aspect or the possible implementations of the second aspect, and therefore can also achieve the beneficial effects according to any one of the second aspect or the possible implementations of the second aspect. The information sending apparatus may be a core network element, or may be an apparatus, for example, a chip applied to a core network element, that can support the core network element in implementing the method according to any one of the second aspect or the possible implementations of the second aspect. The information sending apparatus may implement the foregoing method by software, hardware, or hardware executing corresponding software.

The information sending apparatus according to the fifth aspect of this application includes a sending unit configured to send, to a data analytics network element, terminal behavioral information that corresponds to a plurality of terminals and that is on the core network element.

In a possible implementation, the method provided in this embodiment of this application further includes a receiving unit configured to receive a first request message from the data analytics network element and that requests the terminal behavioral information corresponding to the plurality of terminals. The sending unit is configured to send, to the data analytics network element based on the first request message, the terminal behavioral information that corresponds to the plurality of terminals and that is on the core network element.

In a possible implementation, the first request message includes filtering information used to indicate ranges of the terminal behavioral information of the terminals.

In a possible implementation, the filtering information includes one or more of the following information: identification information of the terminal, a network area corresponding to the terminal, a terminal type corresponding to the terminal, and a time window corresponding to the terminal.

In a possible implementation, the terminal behavioral information includes the identification information of the terminal and one or more of the following information: identification information of a core network element, location information, a communication start time, a communication end time, a packet delay, a quantity of packets, a packet size, or at least one piece of first-type data of the terminal that corresponds to the core network element.

In a possible implementation, the location information corresponding to the terminal includes a time and a location, and the terminal is at the location in the time.

In a possible implementation, the sending unit is configured to send, to an operation, administration and maintenance network element, the terminal behavioral information that corresponds to the plurality of terminals and that is on the core network element. The operation, administration and maintenance network element is configured to send, to the data analytics network element, the terminal behavioral information that corresponds to the plurality of terminals and that is on the core network element.

In a possible implementation, this embodiment of this application further provides an information sending apparatus. The information sending apparatus may be a core network element or a chip applied to a core network element. The information sending apparatus includes a processor and a communications interface. The communications interface is configured to support the information sending apparatus in performing the message/data receiving and sending steps on the information sending apparatus side that are described in any one of the second aspect or the possible implementations of the second aspect. The processor is configured to support the information sending apparatus in performing the message/data processing step on the information sending apparatus side that is described in any one of the second aspect or the possible implementations of the second aspect. For a corresponding step, refer to the descriptions in any one of the second aspect or the possible implementations of the second aspect. Details are not described herein again.

Optionally, the communications interface and the processor of the information sending apparatus are coupled to each other.

Optionally, the information sending apparatus may further include a memory configured to store code and data. The processor, the communications interface, and the memory are coupled to each other.

According to a sixth aspect, this application provides an information processing apparatus. The information processing apparatus can implement the method according to any one of the third aspect or the possible implementations of the third aspect, and therefore can also achieve the beneficial effects according to any one of the third aspect or the possible implementations of the third aspect. The information processing apparatus may be a user data management network element, or may be an apparatus, for example, a chip applied to a user data management network element, that can support the user data management network element in implementing the method according to any one of the third aspect or the possible implementations of the third aspect. The information processing apparatus may implement the foregoing method by software, hardware, or hardware executing corresponding software.

The information processing apparatus according to the sixth aspect includes: a sending unit configured to send, to a data analytics network element, a second request message used to request network-expected terminal behavioral information, where the second request message includes identification information of a plurality of terminals; and a receiving unit configured to receive the network-expected terminal behavioral information from the data analytics network element.

In a possible implementation, the network-expected terminal behavioral information includes network-expected terminal behavioral information corresponding to at least one group of terminals in the plurality of terminals.

In a possible implementation, the receiving unit is further configured to receive first information of the terminals that corresponds to the network-expected terminal behavioral information from the data analytics network element, where the first information of the terminals includes the identification information of the terminals or identification information of a terminal group.

In a possible implementation, the network-expected terminal behavioral information includes one or more of the following information: a stationary indication, a terminal moving trajectory, a periodic communication indicator, communication duration, a communication period, a scheduled communication time, a maximum packet transmission delay, a maximum packet transmission response time, a quantity of buffered packets, or at least one piece of second-type data.

In a possible implementation, the network-expected terminal behavioral information includes network-expected terminal behavioral information corresponding to at least two core network elements.

In a possible implementation, the receiving unit is further configured to receive at least one of identification information and type information of each of the at least two core network elements from the data analytics network element. The identification information of the core network element indicates the core network element corresponding to the network-expected terminal behavioral information, and the type information of the core network element indicates a type of the core network element corresponding to the network-expected terminal behavioral information.

In a possible implementation, this embodiment of this application further provides an information processing apparatus. The information processing apparatus may be a user data management network element or a chip applied to a user data management network element. The information processing apparatus includes a processor and a communications interface. The communications interface is configured to support the information processing apparatus in performing the message/data receiving and sending steps on the information processing apparatus side that are described in any one of the third aspect or the possible implementations of the third aspect. The processor is configured to support the information processing apparatus in performing the message/data processing step on the information processing apparatus side that is described in any one of the third aspect or the possible implementations of the third aspect. For a corresponding step, refer to the descriptions in any one of the third aspect or the possible implementations of the third aspect. Details are not described herein again.

Optionally, the communications interface and the processor of the information processing apparatus are coupled to each other.

Optionally, the information processing apparatus may further include a memory configured to store code and data. The processor, the communications interface, and the memory are coupled to each other.

According to a seventh aspect, an embodiment of this application provides a computer-readable storage medium. The computer-readable storage medium stores a computer program or an instruction. When the computer program or the instruction is run on a computer, the computer is enabled to perform the information processing method according to any one of the first aspect or the possible implementations of the first aspect.

According to an eighth aspect, an embodiment of this application provides a computer-readable storage medium. The computer-readable storage medium stores a computer program or an instruction. When the computer program or the instruction is run on a computer, the computer is enabled to perform the information sending method according to any one of the second aspect or the possible implementations of the second aspect.

According to a ninth aspect, an embodiment of this application provides a computer-readable storage medium. The computer-readable storage medium stores a computer program or an instruction. When the computer program or the instruction is run on a computer, the computer is enabled to perform the information processing method according to any one of the third aspect or the possible implementations of the third aspect.

According to a tenth aspect, this application provides a computer program product including an instruction. When the computer program product is run on a computer, the computer is enabled to perform one or more of the first aspect and the possible implementations of the first aspect.

According to an eleventh aspect, this application provides a computer program product including an instruction. When the computer program product is run on a computer, the computer is enabled to perform one or more of the second aspect or the possible implementations of the second aspect.

According to a twelfth aspect, this application provides a computer program product including an instruction. When the computer program product is run on a computer, the computer is enabled to perform one or more of the third aspect or the possible implementations of the third aspect.

According to a thirteenth aspect, this application provides a chip. The chip includes a processor and an interface circuit. The interface circuit is coupled to the processor. The processor is configured to run a computer program or an instruction, to implement one or more of the first aspect or the possible implementations of the first aspect.

According to a fourteenth aspect, this application provides a chip. The chip includes a processor and an interface circuit. The interface circuit is coupled to the processor. The processor is configured to run a computer program or an instruction, to implement one or more of the second aspect or the possible implementations of the second aspect.

According to a fifteenth aspect, this application provides a chip. The chip includes a processor and an interface circuit. The interface circuit is coupled to the processor. The processor is configured to run a computer program or an instruction, to implement one or more of the third aspect or the possible implementations of the third aspect.

Optionally, the foregoing described chip in this application may further include at least one memory. The at least one memory stores the instruction or the computer program.

According to a sixteenth aspect, an embodiment of this application provides a communications system. The communications system includes: the information processing apparatus according to the fourth aspect and the possible implementations of the fourth aspect, at least two information sending apparatuses according to the fifth aspect or the possible implementations of the fifth aspect, and the information processing apparatus according to the sixth aspect or the possible implementations of the sixth aspect.

According to a seventeenth aspect, an embodiment of this application provides a method for determining exception information of a terminal. The method includes: receiving, by a data analytics network element from a first network element, indication information used to indicate that a terminal is abnormal; obtaining, by the data analytics network element, terminal behavioral information of the terminal on a second network element based on the indication information; and determining, by the data analytics network element, exception information of the terminal based on the terminal behavioral information.

In a possible implementation, the method provided in this embodiment of this application further includes: receiving, by the data analytics network element from the first network element, one or more of the following information corresponding to the terminal: identification information of the terminal, a network area, a terminal type, time information, and terminal behavioral information of the terminal on the first network element.

In a possible implementation, the method provided in this embodiment of this application further includes: obtaining, by the data analytics network element, the terminal behavioral information of the terminal on the first network element. Correspondingly, the method provided in this embodiment of this application further includes: obtaining, by the data analytics network element, terminal behavioral information of the terminal based on the terminal behavioral information of the terminal on the first network element and the terminal behavioral information of the terminal on the second network element.

For example, the data analytics network element associates the terminal behavioral information of the terminal on the first network element with the terminal behavioral information of the terminal on the second network element based on the identification information of the terminal, to obtain the terminal behavioral information of the terminal. The data analytics network element determines the exception information of the terminal based on the terminal behavioral information of the terminal that is obtained through association.

In a possible implementation, the obtaining, by the data analytics network element based on the indication information, terminal behavioral information that corresponds to the terminal and that is on a second network element includes: sending, by the data analytics network element, a request message to the second network element, where the request message requests the terminal behavioral information of the terminal on the second network element; and receiving, by the data analytics network element, a response message from the second network element, where the response message includes the terminal behavioral information of the terminal on the second network element.

In a possible implementation, the request message includes one or more of the following information corresponding to the terminal: the identification information of the terminal, the network area, the terminal type, and the time information.

In a possible implementation, the terminal behavioral information of the terminal on the second network element includes the terminal identification information of the terminal and one or more of the following information corresponding to the terminal: identification information of the second network element, location information, a communication start time, a communication end time, a packet delay, a quantity of packets, a packet size, mobility re-registration frequency information, reachability after a data network name (DNN) failure, a quantity of terminals in a geographical area, subscription permanent identifier (SUFI)-permanent equipment identifier (PEI) association update information, roaming status information, or at least one piece of first-type data of the terminal on the second network element.

In a possible implementation, the determining, by the data analytics network element, exception information of the terminal based on the terminal behavioral data includes: determining, by the data analytics network element, the exception information of the terminal based on the terminal behavioral information of the terminal and network-expected terminal behavioral information of the terminal.

For example, the determining, by the data analytics network element, exception information of the terminal based on the terminal behavioral data includes: the determining, by the data analytics network element, the exception information of the terminal based on the terminal behavioral information of the terminal and network-expected terminal behavioral information of the terminal includes: determining, by the data analytics network element, the exception information of the terminal based on the terminal behavioral information of the terminal on the first network element, the terminal behavioral information of the terminal on the second network element, and the network-expected terminal behavioral information of the terminal.

In a possible implementation, the method provided in this embodiment of this application further includes: obtaining, by the data analytics network element, the network-expected terminal behavioral information of the terminal from an application function network element.

In a possible implementation, the method provided in this embodiment of this application further includes: obtaining, by the data analytics network element, the network-expected terminal behavioral information of the terminal from the application function network element using a network exposure function network element.

In a possible implementation, the exception information of the terminal includes one or more of the following information corresponding to the terminal: the identification information, an exception type, an exception identifier, or an exception level of the terminal. The exception identifier is used to identify the exception type, and the exception level indicates a degree or a value of the exception type.

In a possible implementation, the method provided in this embodiment of this application further includes: sending, by the data analytics network element, the exception information of the terminal to a third network element, where the exception information is used to perform policy control on the terminal.

According to an eighteenth aspect, an embodiment of this application provides a method for determining exception information of a terminal. The method includes: determining, by a first network element, that a terminal is abnormal; sending, by the first network element, indication information to a data analytics network element, where the indication information indicates that the terminal is abnormal; receiving, by the data analytics network element, the indication information from the first network element; obtaining, by the data analytics network element, terminal behavioral information of the terminal on a second network element based on the indication information; and determining, by the data analytics network element, exception information of the terminal based on the terminal behavioral information.

In a possible implementation, the method provided in this embodiment of this application further includes: sending, by the data analytics network element, the exception information of the terminal to a third network element; receiving, by the third network element, the exception information from the data analytics network element; and performing, by the third network element, policy control on the terminal based on the exception information.

In a possible implementation, the first network element may be any one or more of a session management network element, a mobility management network element, a user plane network element, a policy control function network element, or a user data management network element. The second network element may be any one or more of a session management network element, a mobility management network element, a user plane network element, a policy control function network element, or a user data management network element. The first network element and the second network element may be a same network element, or may be different network elements.

In a possible implementation, the third network element may be an application function network element or a policy control function network element.

In a possible implementation, the determining, by a first network element, that a terminal is abnormal includes: determining, by the first network element, that the terminal is abnormal, based on network-expected terminal behavioral information of the terminal on the first network element and terminal behavioral information of the terminal on the first network element.

In a possible implementation, the terminal behavioral information of the terminal on the second network element includes identification information of the terminal and one or more of the following information corresponding to the terminal: identification information of the second network element, location information, a communication start time, a communication end time, a packet delay, a quantity of packets, a packet size, mobility re-registration frequency information, reachability after a DNN failure, a quantity of terminals in a geographical area, SUFI-PEI association update information, roaming status information, or at least one piece of first-type data of the terminal on the second network element.

According to a nineteenth aspect, this application provides an apparatus for determining exception information of a terminal. The apparatus for determining exception information of a terminal can implement the method according to any one of the seventeenth aspect or the possible implementations of the seventeenth aspect, and therefore can also achieve the beneficial effects according to any one of the seventeenth aspect or the possible implementations of the seventeenth aspect. The apparatus for determining exception information of a terminal may be a data analytics network element, or may be an apparatus, for example, a chip applied to a data analytics network element, that can support the data analytics network element in implementing the method according to any one of the seventeenth aspect or the possible implementations of the seventeenth aspect. The apparatus for determining exception information of a terminal may implement the foregoing method by software, hardware, or hardware executing corresponding software.

In an example, the apparatus for determining exception information of a terminal includes: a receiving unit configured to receive, from a first network element, indication information used to indicate that a terminal is abnormal, where the receiving unit is configured to obtain terminal behavioral information of the terminal on a second network element based on the indication information; and a processing unit configured to determine exception information of the terminal based on the terminal behavioral information.

In a possible implementation, the receiving unit is further configured to receive, from the first network element, one or more of the following information corresponding to the terminal: identification information of the terminal, a network area, a terminal type, time information, mobility re-registration frequency information, reachability after a DNN failure, a quantity of terminals in a geographical area, SUFI-PEI association update information, roaming status information, or terminal behavioral information of the terminal on the first network element.

In a possible implementation, the receiving unit is further configured to obtain the terminal behavioral information of the terminal on the first network element. Additionally, the processing unit is further configured to obtain terminal behavioral information of the terminal by associating the terminal behavioral information of the terminal on the first network element and the terminal behavioral information of the terminal on the second network element.

In a possible implementation, the apparatus for determining exception information of a terminal further includes a sending unit configured to send a request message to the second network element, where the request message requests the terminal behavioral information of the terminal on the second network element. The receiving unit is configured to receive a response message from the second network element, where the response message includes the terminal behavioral information of the terminal on the second network element.

In a possible implementation, the request message includes one or more of the following information corresponding to the terminal: the identification information of the terminal, the network area, the terminal type, or the time information.

In a possible implementation, the terminal behavioral information of the terminal on the second network element includes a terminal identifier and one or more of the following information corresponding to the terminal: identification information of the second network element, location information, a communication start time, a communication end time, a packet delay, a quantity of packets, a packet size, mobility re-registration frequency information, reachability after a DNN failure, a quantity of terminals in a geographical area, SUPI-PEI association update information, roaming status information, or at least one piece of first-type data of the terminal on the second network element.

In a possible implementation, the processing unit is configured to determine the exception information of the terminal based on the terminal behavioral data and network-expected terminal behavioral information of the terminal.

In a possible implementation, the processing unit is configured to determine the exception information of the terminal based on the network-expected terminal behavioral information of the terminal and the terminal behavioral information of the terminal that is obtained by associating the terminal behavioral information of the terminal on the first network element and the terminal behavioral information of the terminal on the second network element.

In a possible implementation, the receiving unit is further configured to obtain the network-expected terminal behavioral information of the terminal from an application function network element.

In a possible implementation, the receiving unit is further configured to obtain the network-expected terminal behavioral information of the terminal from the application function network element using a network exposure function network element.

In a possible implementation, the exception information of the terminal includes one or more of the following information corresponding to the terminal: the identification information, an exception type, an exception identifier, and an exception level of the terminal. The exception identifier is used to identify the exception type, or the exception level indicates a degree or a value of the exception type.

In a possible implementation, the sending unit is further configured to send the exception information of the terminal to a third network element.

In another example, this embodiment of this application further provides an apparatus for determining exception information of a terminal. The apparatus for determining exception information of a terminal may be a data analytics network element or a chip applied to a data analytics network element. The apparatus for determining exception information of a terminal includes a processor and a communications interface. The communications interface is configured to support the apparatus for determining exception information of a terminal in performing the message/data receiving and sending steps on the apparatus side for determining exception information of a terminal that are described in any one of the seventeenth aspect or the possible implementations of the seventeenth aspect. The processor is configured to support the information processing apparatus in performing the message/data processing step on the apparatus side for determining exception information of a terminal that is described in any one of the seventeenth aspect or the possible implementations of the seventeenth aspect. For a corresponding step, refer to the descriptions in any one of the seventeenth aspect or the possible implementations of the seventeenth aspect. Details are not described herein again.

In a possible implementation, the communications interface and the processor of the apparatus for determining exception information of a terminal are coupled to each other.

In a possible implementation, the apparatus for determining exception information of a terminal may further include a memory configured to store code and data. The processor, the communications interface, and the memory are coupled to each other.

According to a twentieth aspect, this application provides a communications system. The communications system includes a first network element, a data analytics network element communicating with the first network element, and a second network element communicating with the data analytics network element. The first network element is configured to: determine that a terminal is abnormal and send indication information to the data analytics network element, where the indication information indicates that the terminal is abnormal. The data analytics network element is configured to: receive the indication information from the first network element, and obtain terminal behavioral information of the terminal on the second network element based on the indication information. The data analytics network element is further configured to determine exception information of the terminal based on the terminal behavioral information.

In a possible implementation, the first network element may be any one or more of a session management network element, a mobility management network element, or a user data management network element.

In a possible implementation, the communications system further includes a third network element communicating with the data analytics network element. The data analytics network element is further configured to send the exception information of the terminal to the third network element. The third network element is configured to: receive the exception information from the data analytics network element, and perform policy control on the terminal based on the exception information.

In a possible implementation, the third network element may be an application function network element or a policy control function network element.

In a possible implementation, that the first network element is configured to determine that a terminal is abnormal includes: the first network element is configured to determine that the terminal is abnormal, based on network-expected terminal behavioral information of the terminal on the first network element and terminal behavioral information of the terminal on the first network element.

In a possible implementation, the first network element is further configured to send, to the data analytics network element, one or more of the following information corresponding to the terminal: identification information of the terminal, a network area, a terminal type, time information, or the terminal behavioral information on the first network element.

According to a twenty-first aspect, an embodiment of this application provides a computer-readable storage medium. The computer-readable storage medium stores a computer program or an instruction. When the computer program or the instruction is run on a computer, the computer is enabled to perform the method for determining exception information of a terminal according to any one of the seventeenth aspect or the possible implementations of the seventeenth aspect.

According to a twenty-second aspect, an embodiment of this application provides a computer-readable storage medium. The computer-readable storage medium stores a computer program or an instruction. When the computer program or the instruction is run on a computer, the computer is enabled to perform the method for determining exception information of a terminal according to any one of the eighteenth aspect or the possible implementations of the eighteenth aspect.

According to a twenty-third aspect, this application provides a computer program product including an instruction. When the computer program product is run on a computer, the computer is enabled to perform one or more of the seventeenth aspect and the possible implementations of the seventeenth aspect.

According to a twenty-fourth aspect, this application provides a computer program product including an instruction. When the computer program product is run on a computer, the computer is enabled to perform one or more of the eighteenth aspect or the possible implementations of the eighteenth aspect.

According to a twenty-fifth aspect, this application provides a chip. The chip includes a processor and an interface circuit. The interface circuit is coupled to the processor. The processor is configured to run a computer program or an instruction, to implement one or more of the seventeenth aspect or the possible implementations of the seventeenth aspect.

According to a twenty-sixth aspect, this application provides a chip. The chip includes a processor and an interface circuit. The interface circuit is coupled to the processor. The processor is configured to run a computer program or an instruction, to implement one or more of the eighteenth aspect or the possible implementations of the eighteenth aspect.

DESCRIPTION OF EMBODIMENTS

Figures 1, 2:
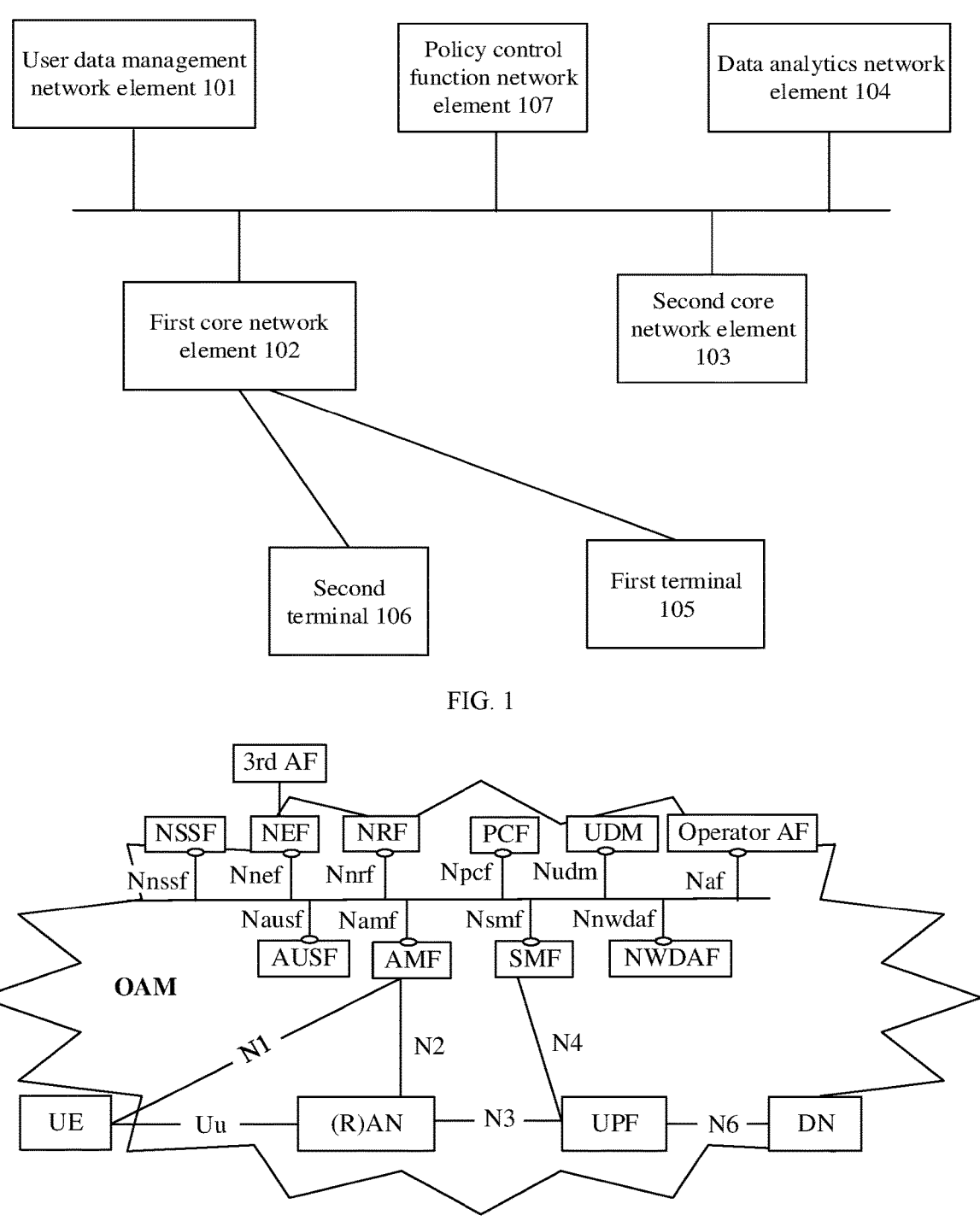
FIG. 1 is a schematic architectural diagram of a communications system according to an embodiment of the present disclosure.
FIG. 2 is a schematic architectural diagram of a 5G network according to an embodiment of the present disclosure.

To clearly describe the technical solutions in embodiments of this application, terms such as "first" and "second" are used in the embodiments of this application to distinguish between same or similar items that have basically same functions and purposes. For example, a first core network element and a second core network element are merely used to distinguish between different core network elements, and are not intended to limit a sequence of the first core network element and the second core network element. A person skilled in the art may understand that the terms such as "first" and "second" do not limit a quantity or an execution sequence, and that the terms such as "first" and "second" do not indicate a definite difference.

It should be noted that, in this application, a word such as "example" or "for example" is used to represent giving an example, an illustration, or a description. Any embodiment or design scheme described as an "example" or "for example" in this application should not be explained as being more preferable or having more advantages than another embodiment or design scheme. Use of the word or phrase such as "example" or "for example" is intended to present a related concept in an exemplary, but not necessarily a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

In this application, "at least one" refers to one or more, and "a plurality of" refers to two or more. A term "and/or" describes an association relationship for describing associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following items (pieces)" or a similar expression thereof indicates any combination of these items, including any combination of a singular item (piece) or plural items (pieces). For example, at least one of a, b, or c may represent a, b, c, a-b, a-c, b-c, or a-b-c, where a, b, and c may be in a singular or plural form.

The technical solutions in the embodiments of this application may be applied to various communications systems, such as a code-division multiple access (CDMA) system, a time-division multiple access (TDMA) system, a frequency division multiple access (FDMA) system, an orthogonal frequency-division multiple access (OFDMA) system, a single carrier frequency division multiple access (SC-FDMA) system, and another system. The terms "system" and "network" can be interchanged with each other. Wireless technologies such as universal terrestrial radio access (UTRA) and CDMA2000 may be implemented in the CDMA system. UTRA may include a wideband CDMA (WCDMA) technology and another variation technology of CDMA. CDMA2000 may cover the interim standard (IS) 2000 (IS-2000), the IS-95 standard, and the IS-856 standard. Wireless technologies such as Global System for Mobile Communications (GSM) may be implemented in the TDMA system. Wireless technologies such as Evolved universal terrestrial radio access (E-UTRA), ultra mobile broadband (UMB), Institute of Electrical and Electronics Engineers (IEEE) 802.11 (Wi-Fi), IEEE 802.16 (e.g., Worldwide Interoperability for Microwave Access (WiMAX)), IEEE 802.20, or Flash OFDMA may be implemented in the OFDMA system. UTRA corresponds to Universal Mobile Telecommunications Service (UMTS), and E-UTRA corresponds to an evolved version of UMTS. A new version of UMTS, namely, E-UTRA, is used in the $3^{rd}$ Generation Partnership Project (3GPP) Long-Term Evolution (LTE) and various versions evolved based on LTE. A 5G communications system and a new radio (NR) system are next generation communications systems under study. In addition, the communications systems may further be applied to a future-oriented communications technology, and are all applicable to the technical solutions provided in the embodiments of this application.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems. In the embodiments of this application, an example in which a provided method is applied to an NR system or a 5G network is used for description.

FIG. 1 is a schematic architectural diagram of a communications system to which an information processing method and an information sending method are applied according to an embodiment of this application. As shown in FIG. 1, the communications system includes a user data management network element 101, at least two core network elements (FIG. 1 shows only two core network elements, for example, a first core network element 102 and a second core network element 103. It may be understood that there may be more than two core network elements in an actual process), a data analytics network element 104, and a policy control function (PCF) network element 107.

In this embodiment of this application, the at least two core network elements may include one or more of control plane network elements of a core network. For example, the at least two core network elements may be a session management function (SMF) network element and an access and mobility management function (AMF) network element.

In a possible implementation, one or more of the user data management network element 101, the at least two core network elements, the data analytics network element 104, and the policy control function network element 107 may be virtual network elements, and the network elements may communicate with each other using a service operation. In another possible implementation, one or more of the user data management network element 101, the at least two core network elements, the data analytics network element 104, and the policy control function network element 107 may be physical network elements, and the network elements are connected to each other through an existing standard interface.

In an example, as shown in FIG. 1, the communications system may further include one or more terminals (two terminals are used as an example in FIG. 1, and the two terminals are a first terminal 105 and a second terminal 106). The one or more terminals are connected to the core network elements in a wired or wireless manner.

In this embodiment of the present disclosure, the terminals may be widely distributed in the communications network. Each terminal may be stationary or moving.

The at least two core network elements are configured to provide, to the data analytics network element 104, terminal behavioral information that corresponds to each of the plurality of terminals and that is on the at least two core network elements.

For example, the first core network element 102 is configured to provide, to the data analytics network element 104, terminal behavioral information that respectively corresponds to the first terminal 105 and the second terminal 106 and that is on the first core network element 102.

The PCF network element 107 is configured to send or receive signaling or data that is between the PCF network element 107 and an AF network element or an SMF network element, or may be configured to receive a data analytics result, for example, an exception type of the terminal, from the data analytics network element.

For example, if the communications system is applied to a 4th generation (4G) network, a control plane network element in the 4G network may be a mobility management entity (MME).

For example, if the communications system is applied to a 5G network, as shown in FIG. 2, the data analytics network element 104 may be a network data analytics function (NWDAF) network element. Network elements corresponding to the at least two core network elements may be any two different network elements in the following plurality of network elements, for example, 5G system network function (5GS NF) network elements. For example, the at least two core network elements may be an SMF network element and an AMF network element. The user data management network element 101 may be any one of a unified data management (UDM) network element, a user data repository (UDR) network element, and a home subscriber server (HSS) network element.

For example, the first core network element 102 is an AMF network element, and the second core network element 103 is an SMF network element.

In addition, as shown in FIG. 2, the 5G network may further include an application function (AF) network element, a user plane function (UPF), an access device (such as an access network (AN)), an authentication server function (AUSF) network element, a network slice selection function (NSSF) network element, a network exposure function (NEF) network element, a network repository function (NRF) network element, a data network (DN), an operation, administration and maintenance (OAM) network element, and the like. This is not specifically limited in this embodiment of this application.

As shown in FIG. 2, the OAM network element may cover network elements of an access network and a core network, and may collect data from the network elements of the access network and the core network. In addition, the OAM network element in this embodiment of this application may also collect terminal behavioral data that corresponds to the terminal and that is on each core network element.

The terminal communicates with the AMF network element through an N1 interface (N1). The AMF network element communicates with the SMF network element through an N11 interface (N11). The SMF network element communicates with one or more UPF network elements through an N4 interface (N4). Any two of the one or more UPF network elements communicate with each other through an N9 interface (N9). The UPF network element communicates with a data network (DN) through an N6 interface (N6). The terminal accesses a network using the access device (such as a RAN device). The access device communicates with the AMF network element through an N2 interface (N2). The SMF network element communicates with the PCF network element through an N7 interface (N7), and the PCF network element communicates with the AF network element through an N5 interface. The access device communicates with the UPF network element through an N3 interface (N3). Any two or more AMF network elements communicate with each other through an N14 interface (N14). The SMF network element communicates with the UDM network element through an N10 interface (N10). The AMF network element communicates with the AUSF network element through an N12 interface (N12). The AUSF network element communicates with the UDM network element through an N13 interface (N13). The AMF network element communicates with the UDM network element through an N8 interface (N8).

It should be noted that both a 3rd AF network element and an operator AF in FIG. 2 are AF network elements. Differences lie in that the 3rd AF network element (such as a WeChat service server or an Alipay payment service server) is not managed and controlled by an operator, the operator AF network element (such as a proxy-call session control function (P-CSCF) network element in an IP multimedia system) is managed and controlled by an operator, and that the 3rd AF network element needs to interact with the NWDAF network element using the NEF network element.

It should be noted that the names of the interfaces between the various network elements in FIG. 2 are merely examples, and the interfaces may have other names in other implementations. This is not specifically limited in this embodiment of this application.

It should be noted that the access device, the AF network element, the AMF network element, the SMF network element, the AUSF network element, the UDM network element, the UPF network element, the PCF network element, and the like in FIG. 2 are merely names, and the names do not constitute any limitation on the devices. In the 5G network and another future network, network elements corresponding to the access device, the AF network element, the AMF network element, the SMF network element, the AUSF network element, the UDM network element, the UPF network element, and the PCF network element may alternatively have other names. This is not specifically limited in this embodiment of this application. For example, the UDM network element may alternatively be replaced with a home subscriber server (HSS), a user subscription database (USD), a database entity, or the like. This is uniformly described herein. Details are not described below again.

For example, the access device in the embodiments of this application is a device that accesses a core network, for example, a base station, a broadband network gateway (BNG), an aggregation switch, or a non-3rd generation partnership project (non-3GPP) access device. Base stations may include base stations in various forms such as a macro base station, a micro base station (also referred to as a small cell), a relay station, and an access point.

For example, the AMF network element in the embodiments of this application may further be responsible for functions such as registration management, mobility management, and lawful interception. This is not specifically limited in this embodiment of this application.

For example, the SMF network element in the embodiments of this application is configured to perform session management, including session-related control functions, such as session establishment, session modification, session release, IP address allocation and management of a terminal, UPF network element selection and control, and lawful interception.

For example, in addition to a function of the user plane function network element shown in FIG. 2, the UPF network element in the embodiments of this application may further implement user plane functions of a serving gateway (SGW) and a packet data network gateway (PGW). In addition, the UPF network element may alternatively be a software-defined networking (SDN) switch. This is not specifically limited in this embodiment of this application.

For example, the AUSF network element in the embodiments of this application is configured to perform authentication on a terminal based on user subscription data of the terminal.

For example, the UDM network element in the embodiments of this application is configured to store user subscription data. In addition, the UDM network element further has functions such as authentication, user identifier processing, and subscription management. This is not specifically limited in this embodiment of this application.

For example, the PCF network element in the embodiments of this application is further used for policy-related functions, such as providing a policy rule, and supporting a unified policy architecture to manage network behavior.

Optionally, the user plane function network element in FIG. 2 may be implemented by one device, or may be implemented jointly by a plurality of devices, or may be a logical functional module in a device. This is not specifically limited in the embodiments of this application.

The SMF network element is configured to reallocate a UPF network element to the terminal based on location information of the terminal, a feature of data from the terminal, location information between the UPF network element and the terminal, or quality of service of the UPF network element, to re-establish a session between the terminal and the newly allocated UPF network element, such that a user plane can be optimized, thereby improving user experience of the re-established session.

The access device is configured to provide a data service to the terminal, for example, receive data from the terminal, or send data to the terminal. In an actual use process, the access device may be a base station. In the embodiments of the present disclosure, the base station (BS) may be a device that communicates with a user equipment (UE) or another communications station such as a relay station, and the base station may provide communication coverage in a specific physical area.

The PCF network element is configured to: receive service information from the AF network element; generate and distribute, based on the service information, quality of service (QoS) parameters corresponding to a service flow.

The PCF network element may be further configured to: receive a data analytics result from the NWDAF network element; take a corresponding measure based on the data analytics result, for example; receive an exception type of the terminal from the NWDAF network element; and disable a network by one lick to prevent the network from serving the terminal.

The AF network element may be configured to provide third-party or server-expected terminal behavioral information to the UDM network element. For example, the AF network element initiates an Nnef_ParameterProvision_Update Request service operation to the NEF network element, to provide third-party or server-expected terminal behavioral data of each of the one or more terminals to the NEF network element. The Nnef_ParameterProvision_Update Request service operation carries identification information of the terminal and a transaction reference ID. The transaction reference ID is used to identify a request for interaction between the AF network element and the NEF network element.

The NEF network element first determines whether the Nnef_ParameterProvision_Update Request service operation from the AF network element is valid. When the NEF network element determines that the Nnef_ParameterProvision_Update Request service operation is valid, the NEF network element sends an Nudm_ParameterProvision_Update Request service operation to the UDM network element, to provide, to the UDM network element, the third-party or server-expected terminal behavioral information of each of the one or more terminals that is from the AF network element. The Nudm_ParameterProvision_Update Request service operation further carries an NEF reference ID, to identify a request for interaction between the NEF network element and the UDM network element.

The UDM network element first performs authentication to determine whether the request of the AF network element is valid. If the request of the AF network element is valid, the UDM network element first maps the identification information of the terminal (for example, maps the identification information of the terminal from a GPSI to a SUPI), uses the third-party or server-expected terminal behavioral data of each of the one or more terminals that is from the AF network element as a part of user subscription data of each terminal, and initiates an Nudr_DM_Update Request service operation to the UDR network element, to request the UDR network element to update and store the third-party or server-expected terminal behavioral data of each of the one or more terminals that is from the AF network element. The UDR network element parses the GPSI or maps the GPSI into the SUPI, and stores the third-party or server-expected terminal behavioral data of each of the one or more terminals that is from the AF network element as respective user subscription data of each of the one or more terminals. Then, the UDR network element initiates an Nudm_DM_Update Response service operation to the UDM. If the UDR network element cannot parse the GPSI or map the GPSI into the SUPI, the Nudm_DM_Update Response service operation indicates to the UDM that the terminal behavioral data fails to be provided, and carries a cause value.

If the UDM network element determines that the request of the AF network element is invalid, the UDM network element initiates an Nudm_ParameterProvision_Update Response service operation to the NEF network element, and the Nudm_ParameterProvision_Update Response service operation indicates that the third-party or server-expected terminal behavioral data fails to be provided, and carries a cause value.

When the NEF network element determines that the Nnef_ParameterProvision_Update Request service operation is invalid, the NEF network element initiates an Nnef_ParameterProvision_Update Response service operation to the AF network element, and the Nnef_Parameter-Provision_Update Response service operation indicates that the terminal behavioral data fails to be provided, and carries a cause value.

The DN is an external network that provides a data service.

The NWDAF network element is configured to collect terminal behavioral information that corresponds to the terminal and that is on different core network elements. The terminal behavioral information may include the identification information of the terminal and terminal behavioral information. Then, terminal behavioral information that corresponds to the terminal and that is on the different core network elements is associated using the identification information of the terminal, to obtain the terminal behavioral information corresponding to the terminal. The terminal behavioral information includes at least the terminal behavioral information that corresponds to the terminal and that is on the different core network elements. In addition, the NWDAF network element is further configured to: analyze terminal behavioral information corresponding to the plurality of terminals, to obtain network-expected terminal behavioral information; and send the network-expected terminal behavioral information to the user data management network element. When the network-expected terminal behavioral information includes network-expected terminal behavioral information corresponding to the at least two core network elements, the NWDAF network element is further configured to send identification information or type information of each of the at least two core network elements to the user data management network element.

Optionally, the data analytics network element may obtain, from the AF network element, the third-party or server-expected terminal behavioral information of the terminal, and then may check the third-party or server-expected terminal behavioral information using the network-expected terminal behavioral information that is obtained through analysis. When finding that the third-party or server-expected terminal behavioral information is inconsistent with the network-expected terminal behavioral information, the data analytics network element may update the network-expected terminal behavioral information to the third-party or server-expected terminal behavioral information, then send the updated third-party or server-expected terminal behavioral information (namely, the network-expected terminal behavioral information that is obtained by the data analytics network element through analysis) to the user data management network element, such that the user data management network element stores the information as subscription data of the terminal. Alternatively, the data analytics network element may alarm the user data management network element that the third-party or server-expected terminal behavioral information is unreliable.

Optionally, the data analytics network element cannot obtain the third-party or server-expected terminal behavioral information from the AF network element. After the data analytics network element sends the network-expected terminal behavioral information of the terminal to the user data management network element, the user data management network element may check the third-party or server-expected terminal behavioral information of the terminal that is obtained from the AF network element. When the user data management network element finds that the third-party or server-expected terminal behavioral information is inconsistent with the network-expected terminal behavioral information, the user data management network element may update the network-expected terminal behavioral information to the third-party or server-expected terminal behavioral information, and store the updated third-party or server-expected terminal behavioral information (namely, the network-expected terminal behavioral information that is obtained by the data analytics network element through analysis) as subscription data of the terminal.

It should be noted that in addition to the core network element, the data analytics network element may further obtain the terminal behavioral information of the terminal from the terminal, the radio access network (RAN) network element, the OAM network element, or another server. The data analytics network element is configured to obtain the network-expected terminal behavioral information by analyzing the terminal behavioral information of the terminal.

As shown in Table 1, Table 1 shows information related to the terminal behavioral data that is collected by the NWDAF network element from the 5GC NF or the RAN.

TABLE 1

| Terminal behavioral data | | |
| --- | --- | --- |
| Data type | Name of a network element to which terminal behavioral data belongs | Function |
| Identification information of a terminal | AMF network element/SMF network element/RAN network element | Identifying the terminal |
| Location information | | |
| > Time (Timestamp) | AMF network element/RAN network element | Time of the terminal |
| > Location | AMF network element/RAN network element | Location of the terminal at the corresponding time |

TABLE 1-continued

| | Terminal behavioral data | |
| --- | --- | --- |
| Data type | Name of a network element to which terminal behavioral data belongs | Function |
| Communication pattern information | | |
| > Communication start time | SMF network element/UPF network element | Start time of communication between the terminal and the SMF network element |
| > Communication end time | SMF network element/UPF network element | End time of communication between the terminal and the SMF network element |
| > Registration time | AMF network element | Time at which the terminal is registered with the AMF network element |
| > Deregistration time | AMF network element | Time at which the terminal is deregistered from the AMF network element |
| > Session establishment time (protocol data unit (PDU) Session Establishment Time) | SMF network element | Time at which the terminal establishes a PDU session |
| > Session modification time (PDU Session Modification Time) | SMF network element | Time at which the PDU session of the terminal is modified |
| > Session release time (PDU Session Release Time) Network configuration information | SMF network element | Time at which the PDU session is released |
| > (Uplink (UL) or downlink (DL)) packet delay (UL or DL Packet Delay) | SMF network element/UPF network element/RAN network element | Indicating an end-to-end (terminal-to-service server or -DN) delay of an uplink packet or a downlink packet |
| > (Uplink or downlink) packet size (UL or DL Packet Size) | SMF network element/UPF network element/RAN network element | Indicating a size of an uplink buffered packet or a size of a downlink buffered packet |
| > (Uplink or downlink) packet quantity (UL or DL Packet Number) | SMF network element/UPF network element/RAN network element | Indicating a quantity of uplink buffered packets or downlink buffered packets |
| > (Uplink or downlink) packet transmission start time | SMF network element/UPF network element/RAN network element | Indicating a time at which an uplink packet or a downlink packet starts to be transmitted |
| > (Uplink or downlink) packet transmission end time | SMF network element/UPF network element/RAN network element | Indicating a time at which transmission of an uplink packet or a downlink packet ends |
| > RRC connection establishment time | AMF network element/RAN network element | Indicating a time at which a Radio Resource Control (RRC) connection of the terminal is established |
| > RRC connection release time | AMF network element/RAN network element | Indicating a time at which the RRC connection of the terminal is released |
| At least one piece of first-type data on the AMF network element (normalized UE behavioral data from AMF) | AMF network element | Other terminal behavioral data on the AMF network element |
| At least one piece of first-type data on the SMF network element (normalized UE behavioral data from SMF) | SMF network element | Other terminal behavioral data on the SMF network element |

TABLE 1-continued

| | Terminal behavioral data | |
|---|---|---|
| Data type | Name of a network element to which terminal behavioral data belongs | Function |
| At least one piece of first-type data on the UPF network element (normalized UE behavioral data from UPF) | UPF network element | Other terminal behavioral data on the UPF network element |
| At least one piece of first-type data on the RAN network element (normalized UE behavioral data from RAN) | RAN network element | Other terminal behavioral data on the RAN network element |

The at least one piece of first-type terminal behavioral data on the AMF network element, the SMF network element, the UPF network element, and the RAN network element is terminal behavioral data that can be identified or used by the AMF network element or the SMF network element. Optionally, each piece of first-type data may be obtained after normalization processing. The normalization processing mainly refers to mapping a physical data value of each data type to fixed numerical space using a maximum-minimum normalization method, a Z-Score normalization method, or the like. This processing improves a model training convergence speed in a big data analytics process on one hand, and provides a feature data transmission manner on the other hand.

For example, the identification information of the terminal in the embodiments of this application may be one or more of the following: an IP address, an SUPI, a PEI, a generic public subscription identifier (GPSI), an international mobile subscriber identifier (IMSI), an international mobile equipment identity (IMEI), an IP 5-tuple, or a mobile station international integrated service digital network number (MSISDN). For identification information of a terminal in the following embodiments, refer to the descriptions herein. Details are not described subsequently again.

As shown in Table 2, Table 2 shows related content of the network-expected terminal behavioral information in this embodiment of this application.

TABLE 2

| | Network-expected terminal behavioral information | |
|---|---|---|
| Data type | Network element name | Function |
| Identification information of a terminal | AMF network element or SMF network element | Identifying the terminal |
| MM information | | Mobility management (MM) information |
| > Stationary indication | AMF network element | Indicating whether the terminal is stationary or moving |
| > Terminal moving trajectory (UE moving trajectory) | | Identifying a physical moving trajectory of the terminal that is expected by a third party |
| At least one piece of second-type data on the AMF network element (normalized expected UE behavioral data from AMF) | | Other network-expected terminal behavioral data on the AMF network element |
| SM information | SMF network element | Session management (SM) information |
| > Periodic communication indicator | SMF network element | Indicating whether service data of the terminal is periodically transmitted |
| > Communication duration | SMF network element | Duration of the service data transmission of the terminal, for example, five minutes |
| > Communication period (periodic time) | | Period of the service data transmission of the terminal, for example, every hour |
| > Scheduled communication tim | | Time range of the service data transmission of the terminal, such as a specified day in each week, for example, 13:00 to 20:00 on Monday |
| > Maximum packet transmission delay (maximum latency) | | Indicating a maximum delay of downlink packet transmission that is acceptable by the third party |

TABLE 2-continued

| | Network | |
|---|---|---|
| Data type | element name | Function |
| > Maximum packet transmission response time | | Indicating a reachable time of the terminal that allows the third party to complete downlink data transmission |
| > Suggested quantity of buffered packets (suggested number of downlink packets) | | Indicating, to the UPF network element, a quantity of packets that need to be buffered by the UPF network element when the terminal is unreachable |
| > At least one piece of second-type data on the SMF network element (normalized expected UE behavioral data from SMF) | | Other network-expected terminal behavioral data on the SMF network element |

The at least one piece of second-type data, namely, the network-expected terminal behavioral data, on the AMF network element (the SMF network element) is network-expected terminal behavioral data that can be identified or used by the AMF network element (the SMF network element).

Optionally, each piece of the at least one piece of second-type data may be obtained after normalization processing. The normalization processing may refer to mapping a physical data value of each data type to fixed numerical space using a maximum-minimum normalization method, a Z-Score normalization method, or the like. This processing improves a model training convergence speed in a big data analytics process on one hand, and provides a feature data transmission manner on the other hand.

In this embodiment of this application, the first type and the second type may be the same or may be different. For example, the first type is any type of the terminal behavioral data obtained by the data analytics network element from the core network element, the RAN network element, or the terminal, and the second type is a data type obtained after the data analytics network element analyzes the terminal behavioral data obtained from the core network element, the RAN network element, or the terminal.

Optionally, the terminal in this application may also be referred to as a terminal device, a user equipment (UE), an access terminal, a subscriber unit, a subscriber station, a mobile station, a remote station, a remote terminal, a mobile device, a user terminal, a wireless communications device, a user agent, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, and a terminal device in a next generation communications system, for example, a 5th generation (5G) communications network or a terminal in a future evolved public land mobile network (PLMN).

For example, in the embodiments of the present disclosure, the terminal may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on the body or integrated into clothes or an accessory of a user. The wearable device is not merely a hardware device, and further implements powerful functions through software support, data exchange, and cloud interaction. Generalized wearable intelligent devices include full-featured and large-size devices that can implement complete or partial functions without depending on smartphones, such as smart watches or smart glasses, and also include devices that focus on only one type of application function and need to work with other devices such as smartphones, such as various smart bands or smart jewelry for monitoring physical signs.

It may be understood that in the embodiments of this application, an information processing method may be performed by a data analytics network element, or may be performed by an apparatus (for example, a chip) applied to a data analytics network element. An information sending method may be performed by a network element, or may be performed by an apparatus (for example, a chip) applied to a network element. Another information processing method may be performed by a user data management network element, or may be performed by an apparatus (for example, a chip) applied to a user data management network element. In the following embodiments, an example in which an information processing method is performed by a data analytics network element, an information sending method is performed by a core network element, and another information processing method is performed by a user data management network element is used for description.

Embodiment 1

Figure 3:
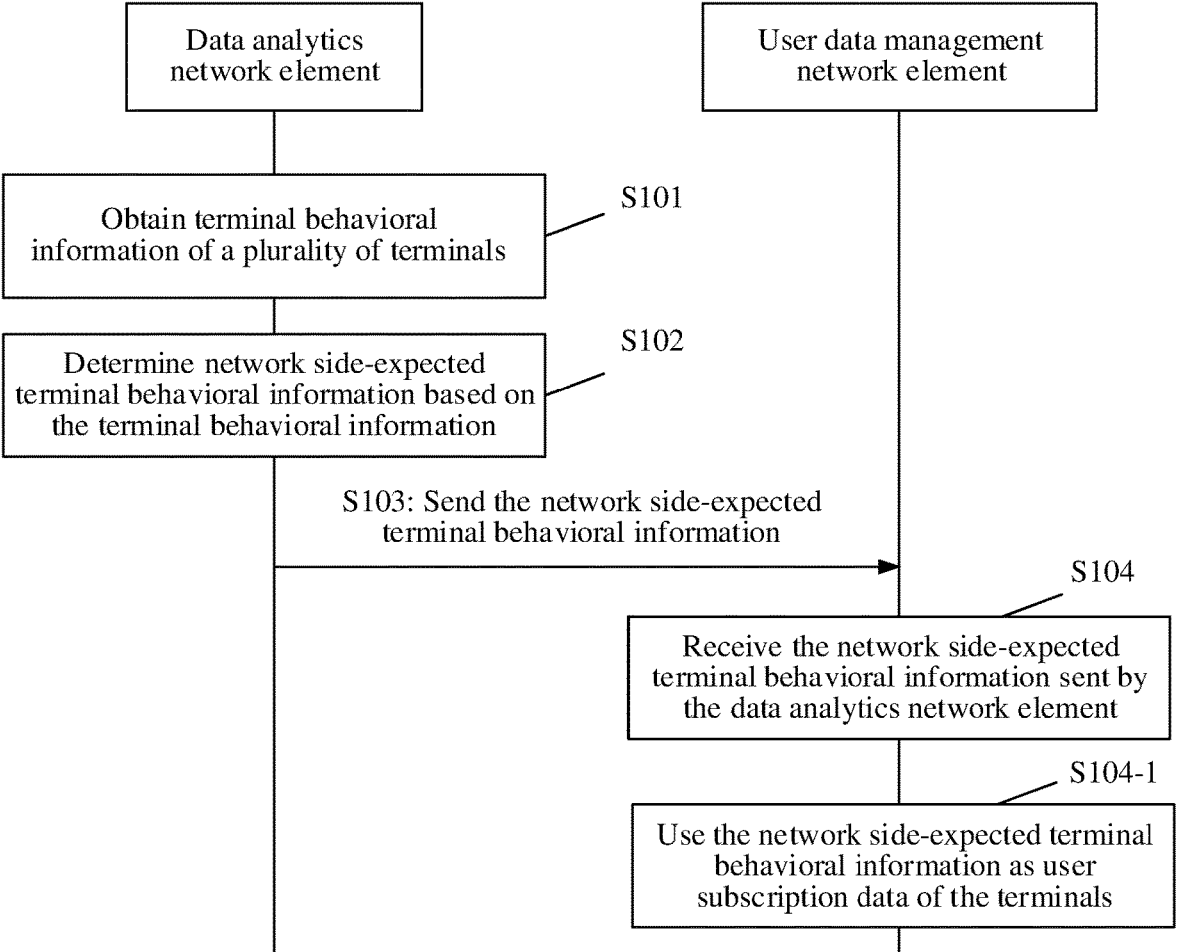
FIG. 3 is a schematic interaction flowchart of an information processing method and an information sending method according to an embodiment of this application.

FIG. 3 is a schematic interaction flowchart of an information processing method and an information sending method according to an embodiment of this application. The method includes the following steps.

S101: A data analytics network element obtains terminal behavioral information of a plurality of terminals.

The terminal behavioral information of the plurality of terminals may include terminal behavioral information of each of the plurality of terminals.

For example, terminal behavioral information of a terminal includes identification information of the terminal and terminal behavioral data corresponding to the identification information of the terminal.

For the terminal behavioral data, refer to the descriptions in Table 1, for example, location information of the terminal, a communication start time, a communication end time, a packet delay, a packet size, and a packet quantity. Details are not described herein again.

Figure 4:
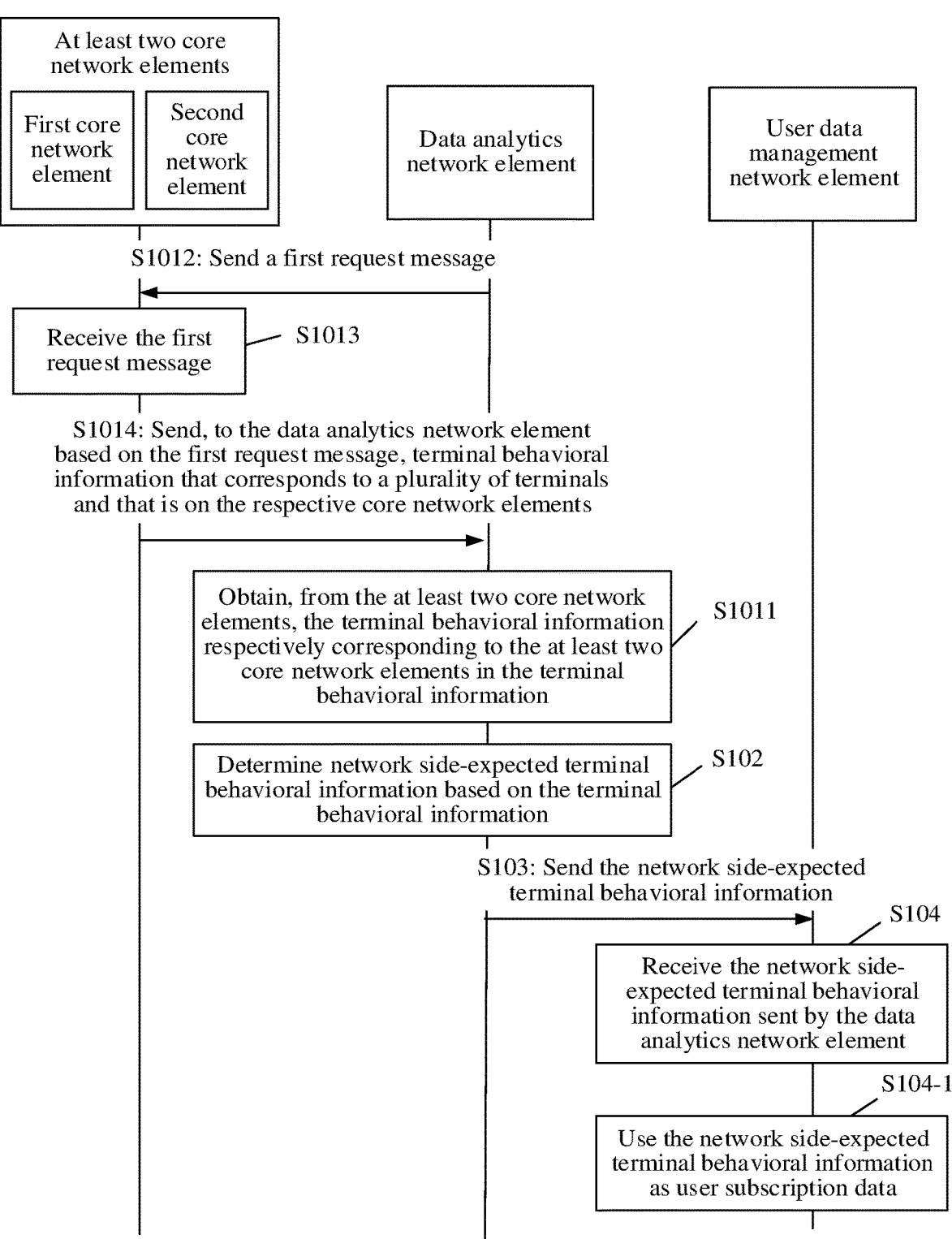
FIG. 4 is a schematic interaction flowchart of an information processing method and an information sending method according to an embodiment of this application.

In an example, as shown in FIG. 4, S101 may be implemented in the following manner:

S1011: The data analytics network element obtains, from at least two core network elements, terminal behavioral information respectively corresponding to the at least two core network elements in the terminal behavioral information.

For example, the data analytics network element obtains terminal behavioral information (including identification information and terminal behavioral data of each terminal) that corresponds to each of the plurality of terminals and that is on each of the at least two core network elements. Then, the data analytics network element associates the terminal behavioral data of each terminal on all core network elements based on the identification information of the terminal, to obtain terminal behavioral information corresponding to the terminal. Terminal behavioral information corresponding to a terminal includes at least identification information of the terminal and terminal behavioral information that corresponds to the terminal and that is on each of the at least two core network elements.

For example, the at least two core network elements are an AMF network element and an SMF network element. According to Table 1, the data analytics network element may obtain, from the AMF network element, terminal behavioral information 1 that corresponds to a terminal 1 and that is on the AMF network element. The terminal behavioral information 1 includes identification information of the terminal 1 and location information (including a time and a location) of the terminal 1 on the AMF network element. The data analytics network element may further obtain terminal behavioral information 2 of the terminal 1 on the SMF network element from the SMF network element. The terminal behavioral information 2 includes the identification information of the terminal 1, communication pattern information (a communication start time and a communication end time) of the terminal 1 on the SMF network element, and network configuration information (a delay and a size of an uplink or downlink packet, and a quantity of uplink or downlink packets). Then, the data analytics network element associates the terminal behavioral information 1 of the terminal 1 on the AMF network element with the terminal behavioral information 2 of the terminal 1 the SMF network element using the identification information of the terminal 1, to obtain terminal behavioral information corresponding to the terminal 1.

It should be noted that, in this embodiment of this application, terminal behavioral data that corresponds to a same terminal and that is on different core network elements may be the same or may be different.

It should be noted that in this embodiment of this application, the data analytics network element may alternatively obtain, from a terminal, a radio access network element, and an application function network element, terminal behavioral information that corresponds to the terminal and that is respectively on the terminal, the radio access network element, and the application function network element.

In an actual process, if the data analytics network element finds that terminal behavioral information of some types of terminals, in some network areas, or in some time periods needs to be reported and analyzed, the data analytics network element may provide, to each core network element, a requirement for analyzing the foregoing terminal behavioral information, such that each core network element collects, from the core network element, terminal behavioral information corresponding to the terminal. In another possible embodiment of this application, as shown in FIG. 4, the method provided in this embodiment of this application further includes the following steps.

S1012: The data analytics network element sends a first request message to each of the at least two core network elements (a first core network element and a second core network element are used as an example in FIG. 4), where the first request message requests the terminal behavioral information that corresponds to the plurality of terminals and that is on the core network element.

Optionally, the first request message carries filtering information, and the filtering information indicates a range of the terminal behavioral information of each of the plurality of terminals.

For example, the filtering information includes one or more of the following information: identification information of the terminal, a network area corresponding to the terminal, a terminal type corresponding to the terminal, and a time window corresponding to the terminal. For example, the filtering information includes the network area and the terminal type that correspond to each terminal.

The time window is used by the core network element to determine to collect terminal behavioral information of a terminal in a specified time period. For example, the time window is from Mar. 1, 2018 to Mar. 8, 2018. In this case, the core network element may determine that terminal behavioral information that corresponds to the terminal and that is on the core network element from Mar. 1, 2018 to Mar. 8, 2018 needs to be collected.

The network area is used by the core network element to determine to collect terminal behavioral information of a terminal in a specified area (for example, a tacking area (TA), a TA list, a routing area (RA), or an RA list).

For example, when the filtering information includes the identification information of the terminal, a network area, and a terminal type, the filtering information is used to instruct the core network element to collect terminal behavioral information of the terminal, in the specified network area or belongs to the specified terminal type, indicated by the identification information of the terminal.

For example, when the filtering information includes the identification information of the terminal, a network area, and a time window, the filtering information is used to instruct the core network element to collect terminal behavioral information of the terminal, in the specified network area or in the specified time window, indicated by the identification information of the terminal.

S1013: The at least two core network elements receive the first request message.

It may be understood that, in S1013, each of the at least two core network elements receives the first request message.

S1014: The at least two core network elements send, to the data analytics network element based on the first request message, the terminal behavioral information that corresponds to the plurality of terminals and that is on the respective core network elements.

For example, each of the at least two core network elements may send a response message for the first request message to the data analytics network element. Additionally, the response message carries the terminal behavioral information that corresponds to the plurality of terminals and that is on the respective core network elements.

For example, a core network element sends, to the data analytics network element, terminal behavioral information of at least one of the plurality of terminals on the core network element.

Using an example in which the core network element is an AMF network element, the AMF network element sends, to the data analytics network element, terminal behavioral information of at least one terminal on the AMF network element.

The terminal behavioral information includes the identification information of the terminal and one or more of the following information corresponding to the terminal: identification information of a core network element, location information, a communication start time, a communication end time, a packet delay, a quantity of packets, a packet size, or at least one piece of first-type data of the terminal that corresponds to the core network element.

It should be noted that a name (for example, the terminal behavioral information) of information obtained by the data analytics network element in S101 in this embodiment of this application is merely an example. In an implementation, the name of the terminal behavioral information may be another name, for example, user behavioral information, behavioral information, or terminal information. This is not specifically limited in this embodiment of this application. A person skilled in the art may understand that, in an actual process, if one piece of information includes identification information of a terminal and one or more of the foregoing information corresponding to the terminal, the piece of information may be understood as the terminal behavioral information in this embodiment of this application.

Terminal behavioral information that is reported by one core network element, that corresponds to the plurality of terminals, and that is on the core network element includes: identification information of the plurality of terminals and terminal behavioral data corresponding to each of the plurality of terminals. For the terminal behavioral data, refer to the descriptions in Table 1.

Because terminal behavioral data reported by different core network elements to the data analytics network element is different, descriptions are separately provided below.

Using an example in which the core network element is an AMF network element, terminal behavioral information reported by the AMF network element includes: the identification information of the terminal and location information (including a time and a location).

Using an example in which the core network element is an SMF network element, terminal behavioral information reported by the SMF network element includes one or more of the following information: a communication start time, a communication end time, a packet delay, a quantity of packets, or a packet size.

S1014 may alternatively be implemented in the following manner: Each core network element sends, to an operation, administration and maintenance network element based on the first request message, the terminal behavioral information that corresponds to the plurality of terminals and that is on the core network element; and the operation, management and maintenance network element sends, to the data analytics network element, the terminal behavioral information that corresponds to the plurality of terminals and that is on each core network element.

In another example, S101 in this embodiment of this application may alternatively be implemented in the following manner: The data analytics network element obtains, from an operation, administration and maintenance network element, terminal behavioral information that corresponds to each of the plurality of terminals and that is on at least two core network elements.

For example, the data analytics network element sends a first request message to the operation, administration and maintenance network element, and the operation, administration and maintenance network element sends, to the data analytics network element based on the first request message, the terminal behavioral information that corresponds to each of the plurality of terminals and that is on the at least two core network elements.

The terminal behavioral information that is provided by the operation, administration and maintenance network element to the data analytics network element, that corresponds to each terminal, and that is on the at least two core network elements may be already stored in the operation, administration and maintenance network element, or may be requested by the operation, administration and maintenance network element from the at least two core network elements after receiving the first request message. For example, for a process in which the operation, administration and maintenance network element requests the terminal behavioral information from the at least two core network elements, refer to the process in S1012 to S1014, provided that the data analytics network element is replaced with the operation, administration and maintenance network element.

S102: The data analytics network element determines network-expected terminal behavioral information based on the terminal behavioral information.

For example, the data analytics network element determines the network-expected terminal behavioral information based on the terminal behavioral information of each of the plurality of terminals.

For example, S102 may be implemented using the following process:

Process 1: The data analytics network element uses the terminal behavioral data included in the collected terminal behavioral information (which may be referred to as training data) of each of the plurality of terminals as one piece of sample data, and represents each piece of sample data as a vector $(x_{i1}, \ldots x_{ij}, \ldots, x_{iM})$, where $i=1, 2, \ldots, N$, N indicates a quantity of pieces of sample data, or may be understood as a quantity of terminals, and N is an integer greater than or equal to 1; $x_{ij}$ indicates the terminal behavioral information provided by any one of the at least two core network elements; and M indicates a dimension of each piece of sample data.

Figure 5:
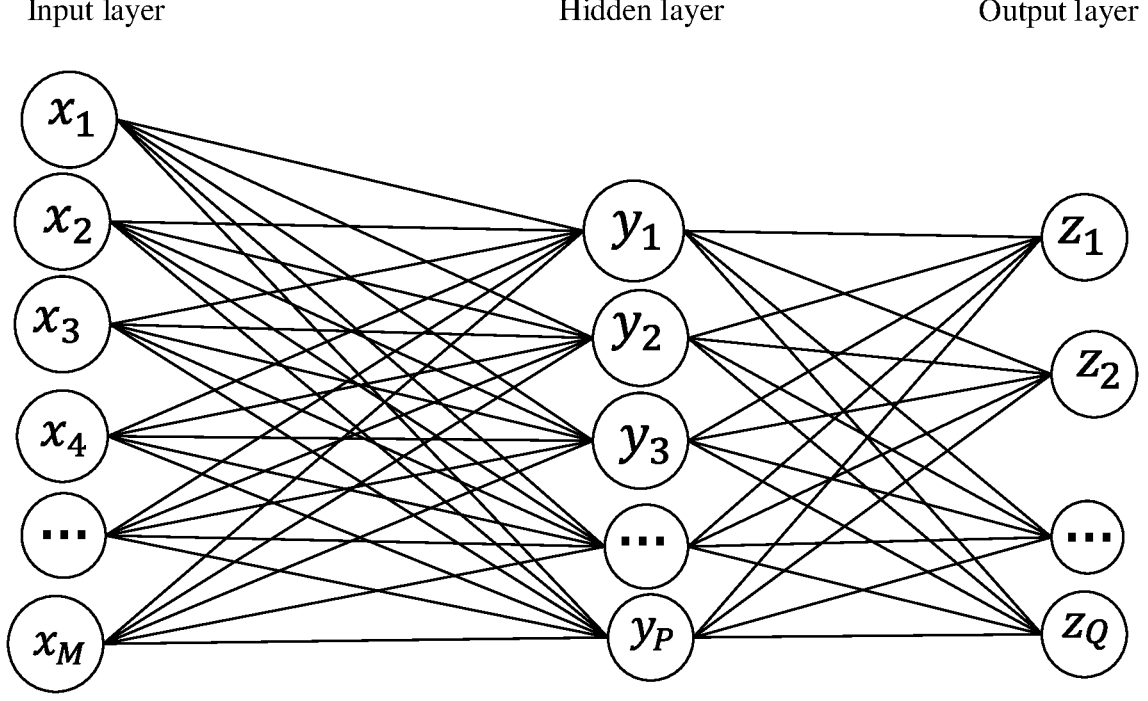
FIG. 5 is a schematic diagram of information processing according to an embodiment of this application.

Process 2: The data analytics network element clusters terminals corresponding to all sample data in the training data. A clustering process is as follows: As shown in FIG. 5, a 3-tier deep neural network is used as an example. The data analytics network element clusters the plurality of terminals corresponding to Process 1 into Q groups of terminals, and a plurality of terminals in each group have same network-expected terminal behavioral data.

(1) Input Layer (A) According to the definitions in Table 1, $x_1$ is a time from the AMF network element, $x_2$ is a location from the AMF network element, $x_3$ is a communication start time from the SMF network element, $x_4$ is a communication end time from the SMF network element, . . . , and $x_M$ is a piece of first-type data from the SMF network element.

(B) M is a data dimension of all terminal behavioral information in Table 1.

(2) Hidden Layer (A) According to the definitions in Table 2, $y_1$ is a stationary indication, $y_2$ is a terminal moving trajectory, $y_3$ is a periodic communication indicator, . . . , and $y_M$ is a piece of second-type data from the SMF network element.

(B) P is a data dimension of all terminal behavioral information in Table 1.

(3) Output Layer (A) Q is a quantity of groups obtained after the plurality of terminals are clustered. In other words, the plurality of terminals are classified into Q categories, and each group of terminals have same network-expected terminal behavioral data, which is as follows:

$$z_1:(y_{11}, y_{12}, y_{13}, \ldots, y_{1P})$$
$$z_2:(y_{21}, y_{22}, y_{23}, \ldots, y_{2P})$$
$$\ldots$$
$$z_Q:(y_{Q1}, y_{Q2}, y_{Q3}, \ldots, y_{QP}).$$

In this way, all the terminals in the training data are classified into Q categories, each category corresponds to one group of terminals (corresponding to one terminal identification information set), each category is represented using a vector, and the vector is a terminal behavioral feature vector of a group of terminals of a corresponding category, to be more specific, $(y_{k1}, y_{k2}, y_{k3}, \ldots, y_{kP})$, k=1, 2, . . . , Q.

The terminal behavioral feature vector of each category may be used as user subscription data, namely, network-expected terminal behavioral information, of all terminals in a terminal set corresponding to the category as shown in Table 2.

It should be noted that in this embodiment of this application, first distance thresholds corresponding to centroids of all the categories may be the same or may be different. This is not limited in this embodiment of this application.

In an example, the terminal behavioral information is communication duration, and the first distance thresholds corresponding to all the categories are the same. To be more specific, for example, the first distance threshold is 5 minutes, communication duration corresponding to a terminal 1 is 10 minutes, communication duration corresponding to a terminal 2 is 20 minutes, communication duration corresponding to a terminal 3 is 14 minutes, communication duration corresponding to a terminal 4 is 12 minutes, communication duration corresponding to a terminal 5 is 18 minutes, communication duration corresponding to a terminal 6 is 21 minutes, and communication duration corresponding to a terminal 7 is 20 minutes.

It is assumed that a centroid selected by the data analytics network element corresponds to Category 1 in which the communication duration corresponds to the terminal 3 is 14 minutes, and corresponds to Category 2 in which the communication duration corresponds to the terminal 5 is 18 minutes. In this case, the data analytics network element may determine that the communication duration of 14 minutes that corresponds to the terminal 3, the communication duration of 10 minutes that corresponds to the terminal 1, and the communication duration of 12 minutes that corresponds to the terminal 4 belong to Category 1, and are used as network-expected terminal behavioral information corresponding to a group of terminals; and the data analytics network element may determine that the communication duration of 20 minutes that corresponds to the terminal 2, the communication duration of 18 minutes that corresponds to the terminal 5, the communication duration of 21 minutes that corresponds to the terminal 6, and the communication duration of 20 minutes that corresponds to the terminal 7 belong to Category 1, and are used as network-expected terminal behavioral information corresponding to another group of terminals.

In this case, the network-expected terminal behavioral information includes network-expected terminal behavioral information corresponding to at least one group of terminals in the plurality of terminals.

It should be noted that, in this embodiment of this application, the data analytics network element may determine, based on terminal behavioral data corresponding to the plurality of terminals, network-expected terminal behavioral information corresponding to Q groups of terminals. The data analytics network element may send all network-expected terminal behavioral information to a user data management network element/policy control function network element (for example, send the network-expected terminal behavioral information corresponding to all the Q groups of terminals to the user data management network element or the policy control function network element), or may send network-expected terminal behavioral information corresponding to at least one of the Q groups of terminals, where Q is an integer greater than or equal to 1, and a sum of quantities of terminals included in all the Q groups of terminals is equal to a quantity of the plurality of terminals.

For example, the plurality of terminals are a terminal 1 to a terminal 100, the terminal 1 to the terminal 20 correspond to a group of network-expected terminal behavioral information, the terminal 21 to the terminal 62 correspond to a group of network-expected terminal behavioral information, and the terminal 63 to the terminal 100 correspond to a group of network-expected terminal behavioral information. For the foregoing three groups of network-expected terminal behavioral information, the data analytics network element may select at least one group from the three groups as the network-expected terminal behavioral information determined by the data analytics network element. For example, the network-expected terminal behavioral information determined by the data analytics network element is the group of network-expected terminal behavioral information corresponding to the terminal 1 to the terminal 20. Alternatively, for example, the network-expected terminal behavioral information determined by the data analytics network element is the group of network-expected terminal behavioral information corresponding to the terminal 1 to the terminal 20 and the group of network-expected terminal behavioral information corresponding to the terminal 63 to the terminal 100.

For example, the network-expected terminal behavioral information includes one or more of the following information: a stationary indication, a terminal moving trajectory, a periodic communication indicator, communication duration, a communication period, a scheduled communication time, a maximum packet transmission delay, a maximum packet transmission response time, a quantity of buffered packets, or at least one piece of second-type data.

It should be noted that in S102 in this embodiment of this application, a name of information (for example, the network-expected terminal behavioral information) determined by the data analytics network element based on the terminal behavioral information is merely an example. In an actual process, the name of the information determined by the data analytics network element based on the terminal behavioral information may alternatively be another name, for example, network-expected information, network-expected behavioral information, or network-expected terminal information. A person skilled in the art may understand that in an actual process, if one piece of information includes one or more of a stationary indication, a terminal moving trajectory, a periodic communication indicator, communication duration, a communication period, a scheduled communication time, a maximum packet transmission delay, a maximum packet transmission response time, a quantity of buffered packets, or at least one piece of second-type data, the piece of information may be understood as the network-expected terminal behavioral information in this embodiment of this application.

It should be noted that the first-type data in this embodiment of this application is terminal behavioral information collected by the data analytics network element from at least one core network element. The second-type data is a data type obtained by the data analytics network element based on terminal behavioral information (including the first-type data) collected from at least one network element.

For example, the data analytics network element may obtain the stationary indication and the terminal moving trajectory in the network-expected terminal behavioral information based on the location information (including the time and the location) in the terminal behavioral data; may obtain the periodic communication indicator, the communication duration, the communication period, and the scheduled communication time in the network-expected terminal behavioral information based on the communication start time and the communication end time in the terminal behavioral data. The data analytics network element may also obtain the at least one piece of second-type data in the network-expected terminal behavioral information based on the at least one piece of first-type data in the terminal behavioral information. Further, the first-type data is input information of the data analytics network element, namely, the terminal behavioral information, and the second-type data is output information of the data analytics network element, namely, the network-expected terminal behavioral information.

S103: The data analytics network element sends the network-expected terminal behavioral information to the user data management network element/policy control function network element.

S104: The user data management network element/policy control function network element receives the network-expected terminal behavioral information from the data analytics network element.

S104-1: The user data management network element uses the network-expected terminal behavioral information as user subscription data of the terminals.

For example, after receiving the network-expected terminal behavioral information, the user data management network element may use the received network-expected terminal behavioral information as the subscription information of each terminal. After receiving the network-expected terminal behavioral information, the policy control function network element may further forward the network-expected terminal behavioral information to the user data management network element.

This embodiment of this application provides the information processing method. In the method, the data analytics network element obtains the terminal behavioral information of the plurality of terminals, then determines the network-expected terminal behavioral information based on the terminal behavioral information of the plurality of terminals, and sends the network-expected behavioral information to the user data management network element/policy control function network element. Compared with other approaches in which network-expected behavioral information is provided by an AF network element, reliability of the network-expected behavioral information received by the user data management network element/policy control function network element can be improved.

Figure 6:
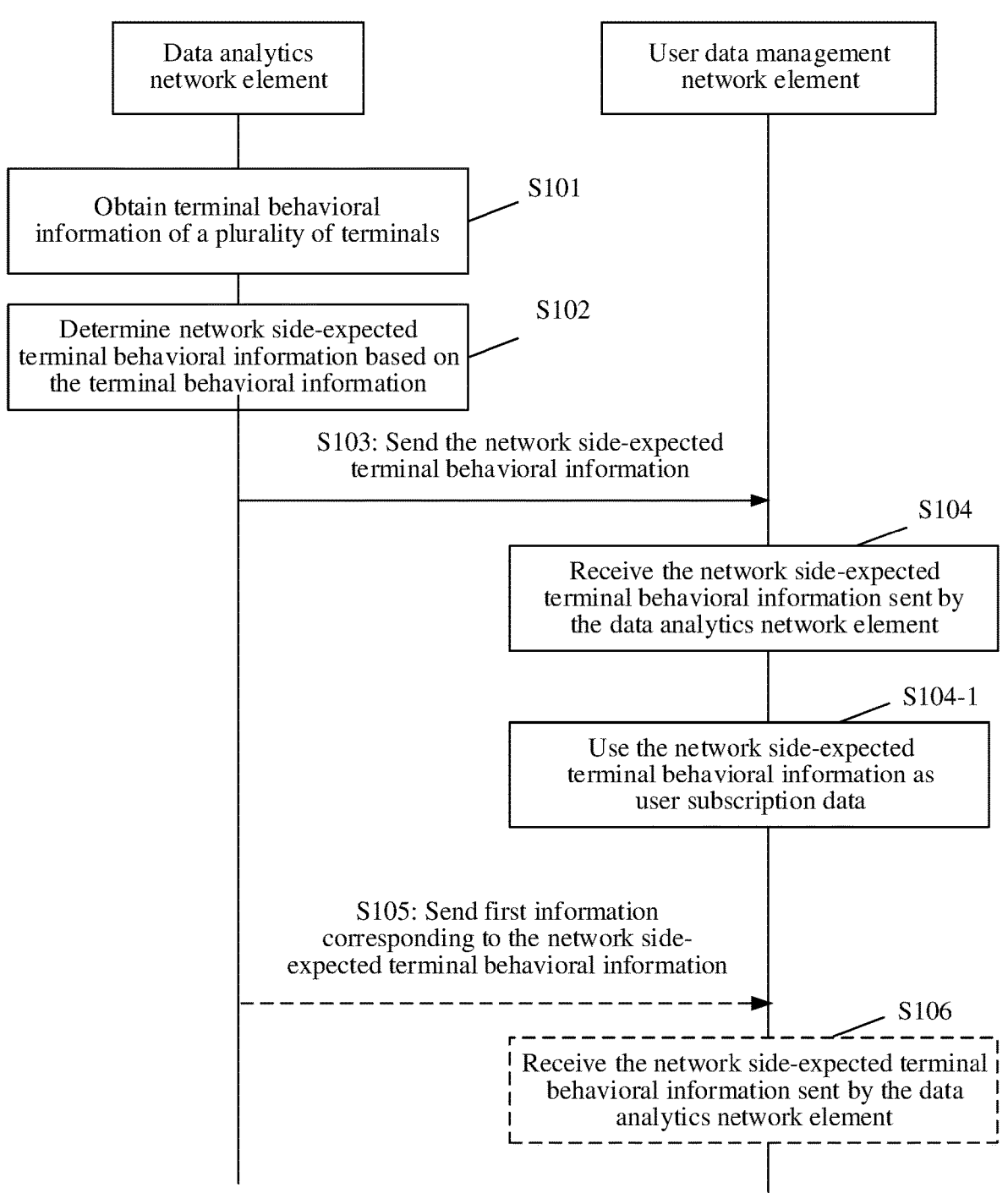
FIG. 6 is a schematic interaction flowchart of an information processing method and an information sending method according to an embodiment of this application.

Optionally, in another embodiment of this application, as shown in FIG. 6, the method provided in this embodiment of this application further includes the following steps.

S105. The data analytics network element sends, to the user data management network element, first information of the terminals corresponding to the network-expected terminal behavioral information.

It may be understood that the first information of the terminals corresponding to the network-expected terminal behavioral information in S105 and the network-expected terminal behavioral information in S103 may be sent to the user data management network element using a same message, or may be carried in different messages and sent to the user data management network element.

The first information of the terminals indicates network-expected terminal behavioral information corresponding to each terminal. The first information of the terminals may be the identification information of the terminal or identification information of a terminal group. The identification information of the terminal group indicates an identifier of a group of terminals.

For example, if the network-expected terminal behavioral information includes network-expected terminal behavioral information corresponding to at least one group of terminals, network-expected terminal behavioral information corresponding to each of the at least one group corresponds to a first information list of one terminal, and the first information list of the terminal indicates network-expected terminal behavioral information corresponding to each of at least one terminal.

S106. The user data management network element receives the first information of the terminals that corresponds to the network-expected terminal behavioral information from the data analytics network element.

In this way, after receiving the first information of the terminals, the user data management network element may use the network-expected terminal behavioral information corresponding to each terminal as subscription information corresponding to the terminal. For example, the user data management network element uses network-expected terminal behavioral information corresponding to the terminal 1 as subscription information corresponding to the terminal 1.

Figure 7:
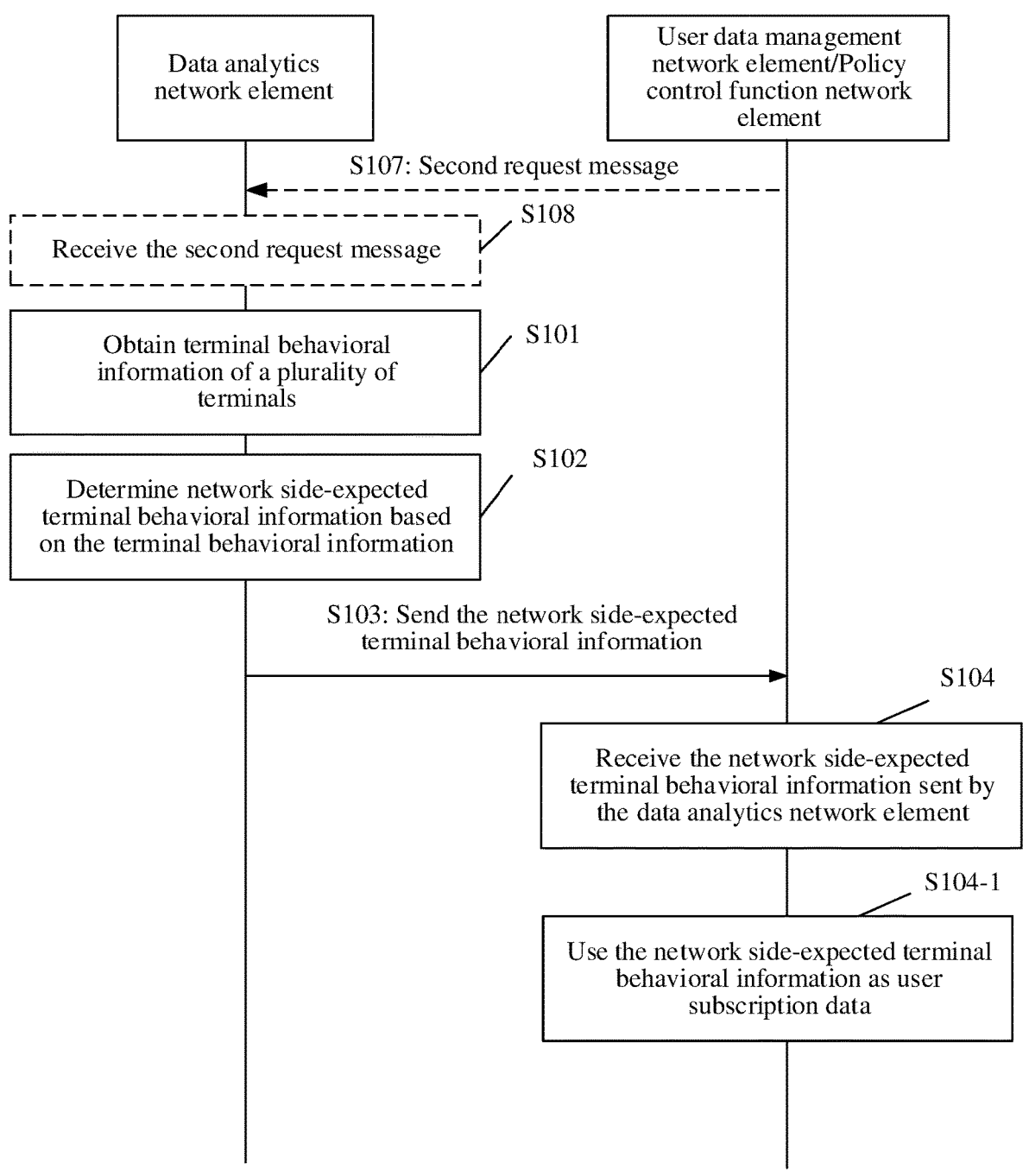
FIG. 7 is a schematic interaction flowchart of an information processing method and an information sending method according to an embodiment of this application.

In another embodiment of this application, as shown in FIG. 7, the method provided in this embodiment of this application further includes the following steps.

S107. The user data management network element/policy control function network element sends a second request message to the data analytics network element, where the second request message requests the network-expected terminal behavioral information, and the second request message includes the identification information of the plurality of terminals.

It should be noted that, in this embodiment of this application, if the second request message from the user data management network element to the data analytics network element, after determining the network-expected terminal behavioral information, the data analytics network element sends the network-expected terminal behavioral information to the user data management network element, or sends the network-expected terminal behavioral information to the policy control function network element.

If the second request message is sent by the policy control function network element to the data analytics network element, the data analytics network element may send the network-expected terminal behavioral information to the policy control function network element and the policy control function network element sends the network-expected terminal behavioral information to the core network element, or the data analytics network element may send the network-expected terminal behavioral information to the user data management network element.

It may be understood that the second request message includes the identification information of each of the plurality of terminals.

For example, the second request message may be a message newly defined between the user data management network element/policy control function network element and the data analytics network element, or may be an Nnwdaf_EventsSubscription_Subscribe service operation. This is not limited in this embodiment of this application.

Optionally, the second request message further includes at least one of a network area corresponding to the terminal, a time window corresponding to the terminal, a terminal type corresponding to the terminal, and the like.

S108: The data analytics network element receives the second request message from the user data management network element/policy control function network element.

Optionally, the second request message may further carry the foregoing filtering information.

In an example, a network-expected terminal behavioral vector $(y_{k1}, y_{k2}, y_{k3}, \ldots, y_{kP})$ may be classified into a mobility management (MM)-type behavioral vector or a session management (SM)-type behavioral vector of a terminal based on a corresponding core network element. According to Table 1, $(y_{k1}, y_{k2}, y_{k3}, \ldots, y_{kP})$ may be classified into two types of terminal behavioral vectors, an MM-type $(y_{k1}, y_{k2}, y_{k3}, \ldots, y_{kS})$ and an SM-type $(y_{k1}, y_{k2}, y_{k3}, \ldots, y_{kT})$, based on the AMF and the SMF, where S+T=P. An MM-type or SM-type terminal behavioral sub-vector in each category may be used as MM-type or SM-type behavioral feature information of all terminals in a terminal set corresponding to the category.

Optionally, each MM-type or SM-type feature vector corresponds to a distance threshold. When a distance between new MM-type behavioral sample data of the terminal and the MM-type feature vector exceeds a second distance threshold, the core network element may determine that the new MM-type behavioral sample data of the terminal does not belong to a category corresponding to the MM-type feature vector. When a distance between new SM-type behavioral sample data of the terminal and the SM-type feature vector exceeds a third distance threshold, the core network element may determine that the new SM-type behavioral sample data of the terminal does not belong to a category corresponding to the SM-type feature vector.

The first distance threshold, the second distance threshold, and the third distance threshold are not limited in this embodiment of this application, and may be set based on a requirement.

Figure 8:
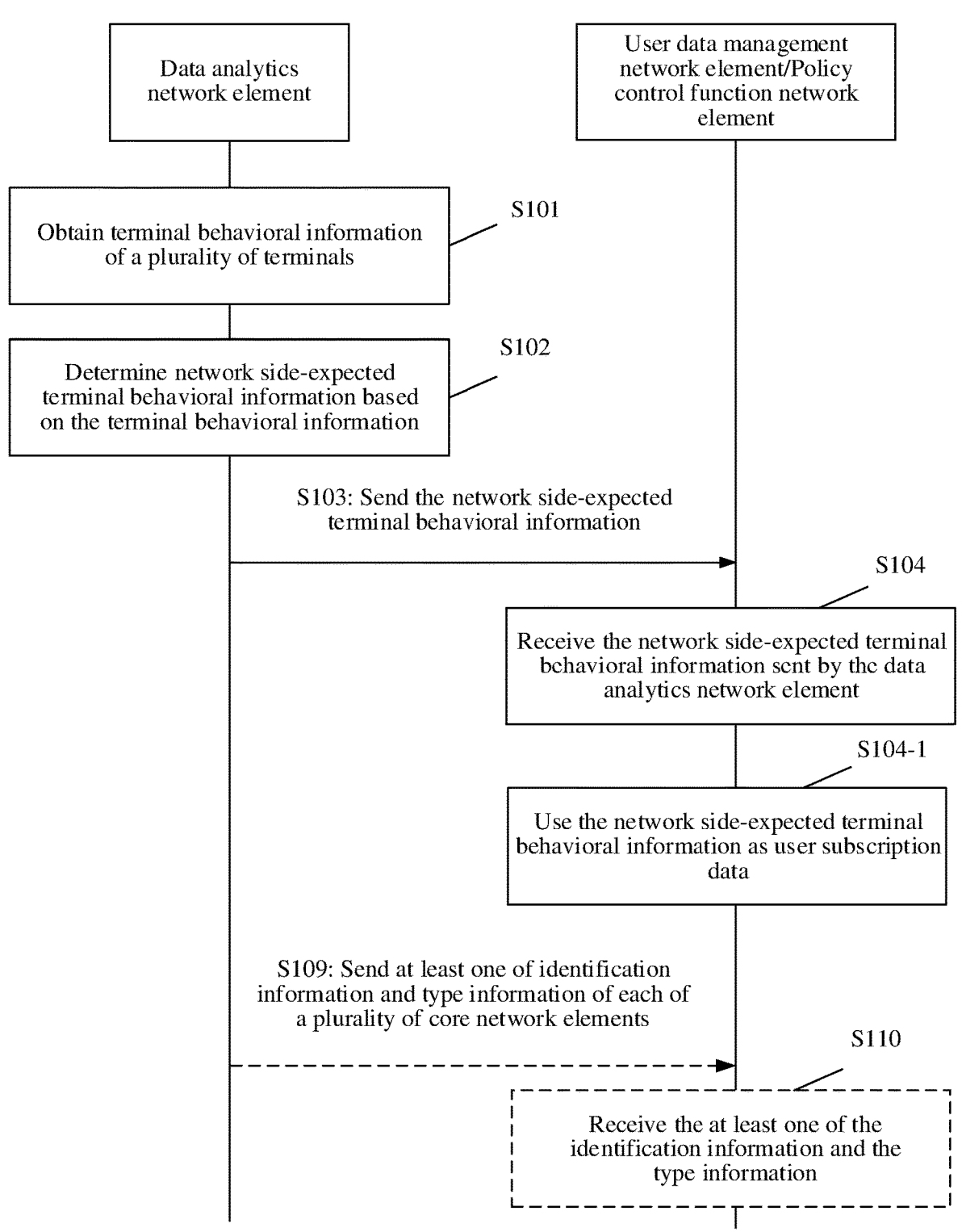
FIG. 8 is a schematic interaction flowchart of an information processing method and an information sending method according to an embodiment of this application.

In another embodiment of this application, the network-expected terminal behavioral information includes network-expected terminal behavioral information corresponding to the at least two core network elements. In this way, the data analytics network element may further classify the obtained network-expected terminal behavioral information, to determine network-expected terminal behavioral information corresponding to each core network element. Based on this, as shown in FIG. 8, the method provided in this embodiment of this application further includes the following steps.

S109: The data analytics network element sends at least one of identification information and type information of each of the at least two core network elements to the user data management network element/policy control function network element. The identification information of the core network element indicates the core network element corresponding to each of a plurality of pieces of network-expected terminal behavioral information included in the network-expected terminal behavioral information. The type information of the core network element indicates a type, such as an MM type or an SM type, of the core network element corresponding to each of the plurality of pieces of network-expected terminal behavioral information included in the network-expected terminal behavioral information.

Optionally, an MM-type core network element may be an AMF network element, and an SM-type network element may be an SMF network element.

Optionally, before S109, the method provided in this embodiment of this application further includes: determining, by the data analytics network element based on identification information of a core network element that is included in each piece of terminal behavioral information, network-expected terminal behavioral information that corresponds to each core network element and that is in the network-expected terminal behavioral information.

S110: The user data management network element/policy control function network element receives the at least one of the identification information and the type information that is of each of the at least two core network elements and that is from the data analytics network element.

It may be understood that, after S110, the user data management network element/policy control function network element may determine the core network elements corresponding to the received network-expected terminal behavioral information.

In a possible embodiment, after S110, the method provided in this embodiment of this application further includes: sending, by the user data management network element/policy control function network element to each core network element based on the at least one of the identification information and the type information of the core network element, the network-expected terminal behavioral information corresponding to the core network element.

For example, if the network-expected terminal behavioral information includes network-expected terminal behavioral information corresponding to the AMF network element, the user data management network element/policy control function network element sends, to the AMF network element, the network-expected terminal behavioral information corresponding to the AMF network element.

The user data management network element may send, to each core network element, the network-expected terminal behavioral information corresponding to the core network element in the following process.

In an example, when determining that the AMF network element requests to register a terminal with a 5G network, the user data management network element sends, to the AMF network element, network-expected terminal behavioral information corresponding to the AMF network element. For example, the terminal sends a registration request to the AMF network element. The registration request carries identification information of the terminal, and the registration request requests to register the terminal corresponding to the identification information of the terminal with the 5G network. The AMF network element sends an Nudm_SDM_Get service operation to the user data management network element, and the Nudm_SDM_Get service operation carries the identification information of the terminal. The user data management network element sends, to the AMF network element, MM-type network-expected terminal behavioral information corresponding to the identification information of the terminal. The AMF network element sends Registration Accept to the terminal.

In another example, in a process in which the SMF network element requests to establish a protocol data unit (PDU) session for a terminal, the user data management network element sends, to the SMF network element, network-expected terminal behavioral information corresponding to the SMF network element. For example, the terminal sends a session establishment request to the SMF network element using the AMF network element. The session establishment request carries identification information of the terminal. The SMF network element sends an Nudm_SDM_Get service operation to the user data management network element, and the Nudm_SDM_Get service operation carries the identification information of the terminal. The UDM network element sends, to the SMF network element, session management-type network-expected terminal behavioral information corresponding to the identification information of the terminal. The SMF network element sends PDU Session Establishment Accept to the terminal using the AMF network element.

Figure 9:
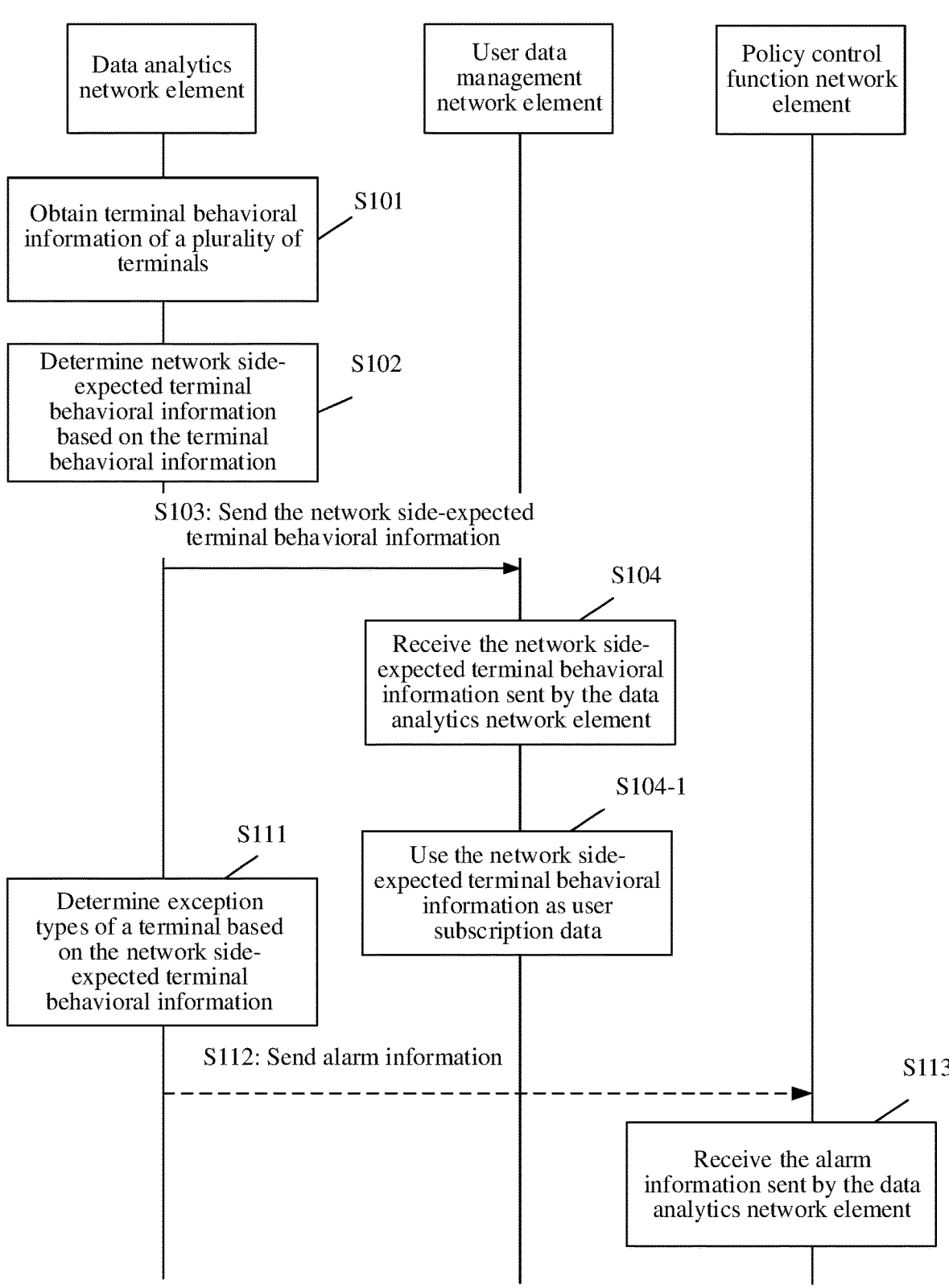
FIG. 9 is a schematic interaction flowchart of an information processing method and an information sending method according to an embodiment of this application.

In still another possible embodiment, as shown in FIG. 9, the method provided in this embodiment of this application further includes the following steps.

S111: The data analytics network element determines exception type of a terminal based on the network-expected terminal behavioral information.

In an example, S111 in this embodiment of this application may be implemented in the following manner:

Step 1: A core network element obtains behavioral information of a new terminal (for content, refer to the descriptions in Table 1). In this application, the plurality of terminals that correspond to the obtained network-expected terminal behavioral information are first terminals, and the new terminal may be a second terminal. If the core network element determines that the terminal behavioral information of the second terminal does not match network-expected terminal behavioral information received by the core network element, to be more specific, a distance between a vector formed by the behavioral information of the second terminal and a vector formed by the network-expected terminal behavior information exceeds a specified threshold, the core network element determines that the second terminal is abnormal. In this case, the core network element sends, to the data analytics network element, terminal behavioral information that corresponds to the second terminal and that is on the core network element. The core network element sends identification information of the second terminal to another core network element, to instruct the other core network element to send, to the data analytics network element, terminal behavioral information that corresponds to the second terminal and that is on the other core network element.

Optionally, the core network element may periodically report the terminal behavioral information corresponding to the second terminal to the data analytics network element according to a preset period.

Step 2: The data analytics network element obtains terminal behavioral information that is from the at least two core network elements (an SMF network element and an AMF network element are used as an example), that separately corresponds to the second terminal, and that is on the SMF network element and the AMF network element.

Step 3: The data analytics network element obtains terminal behavioral data of a single abnormal terminal based on the identification information of the first terminal. After accumulating a particular amount of terminal behavioral data of abnormal terminals, the data analytics network element further analyzes the abnormal terminal behavioral data. If finding that most or all of the abnormal terminal behavioral data is of one type, the data analytics network element determines the exception type of the terminals.

For example, the exception type may be one or more of the following: (1) being incorrectly used; (2) being hijacked; or (3) a new terminal.

S112: The data analytics network element sends alarm information to the policy control function network element, where the alarm information indicates the exception type of the terminal.

S113: The policy control function network element receives the alarm information from the data analytics network element, and then the policy control function network element may take a further measure on an abnormal terminal, for example, one-click shutdown, to be more specific, stop a network from serving the abnormal terminal.

Figure 10:
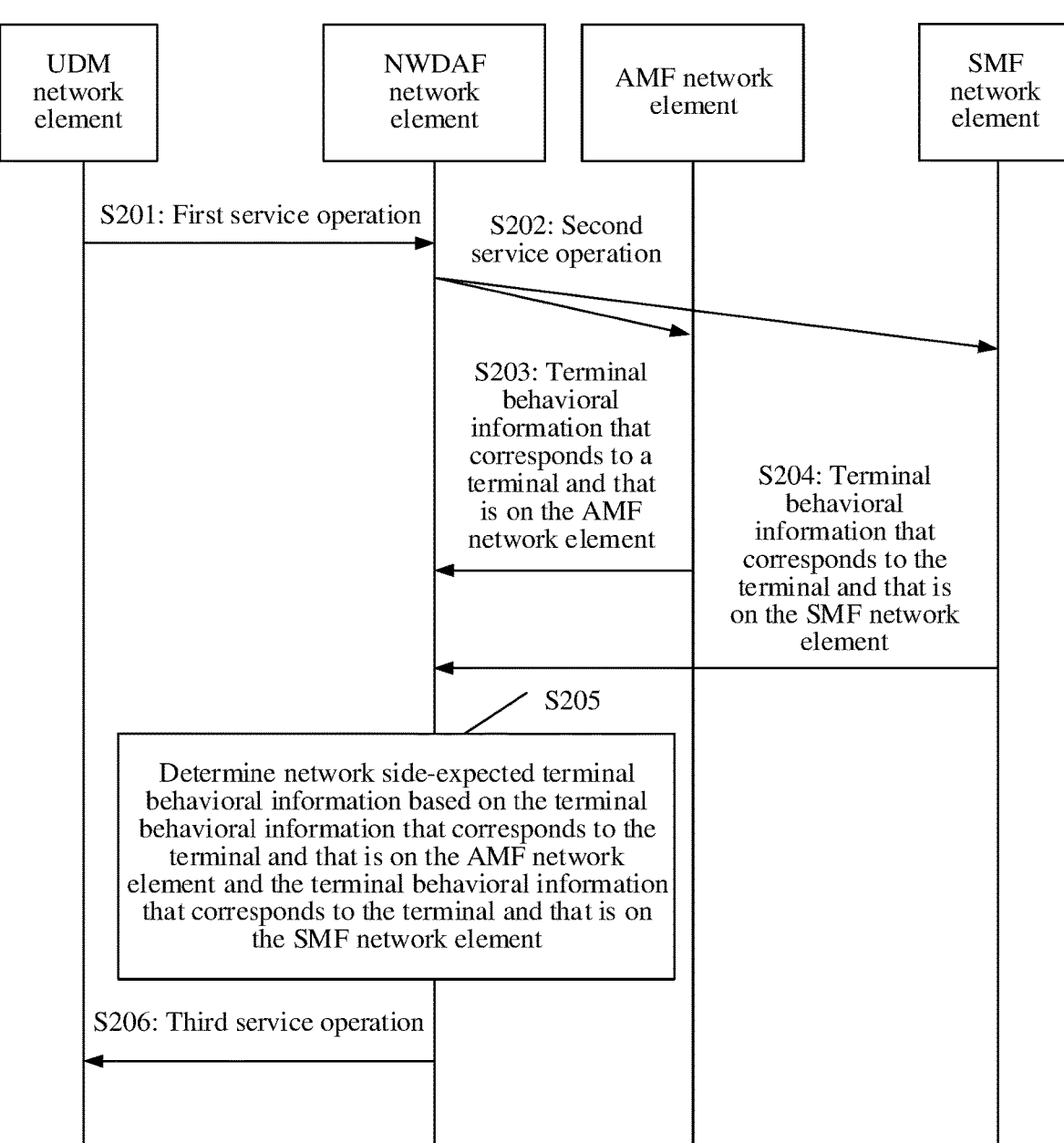
FIG. 10 is a schematic flowchart of an information processing method according to an embodiment of this application.

FIG. 10 shows an embodiment of an information processing method according to the embodiments of this application. The method includes the following steps.

S201: A UDM network element sends a first service operation to an NWDAF network element, where the first service operation is used to subscribe to network-expected terminal behavioral information of a terminal.

For example, the first service operation may be an Nnwdaf_EventsSubscription_Subscribe service operation.

For content of the first service operation, refer to the descriptions of the second request message in the foregoing embodiment. Details are not described herein again.

S202: The NWDAF network element sends a second service operation separately to an AMF network element and an SMF network element, where the second service operation is used to subscribe to terminal behavioral information that separately corresponds to the terminal and that is on the AMF network element and the SMF network element.

For example, the second service operation is an Nnf_UE-BehavioralDataCollectionSubscription_Subscribe service operation.

For content of the second service operation, refer to the descriptions of the first request message in the foregoing embodiment. Details are not described herein again.

S203: The AMF network element reports, to the NWDAF network element, the terminal behavioral information that corresponds to the terminal and that is on the AMF network element.

S204: The SMF network element reports, to the NWDAF network element, the terminal behavioral information that corresponds to the terminal and that is on the SMF network element.

S205: The NWDAF network element determines network-expected terminal behavioral information based on the terminal behavioral information that corresponds to the terminal and that is on the AMF network element and the terminal behavioral information that corresponds to the terminal and that is on the SMF network element.

For an implementation of S205, refer to the descriptions of S102. Details are not described herein again.

S206: The NWDAF network element sends a third service operation to the UDM network element, where the third service operation carries the network-expected terminal behavioral information.

For example, the third service operation may be an Nnwdaf_EventsSubscription_Notify service operation.

Figure 11A:
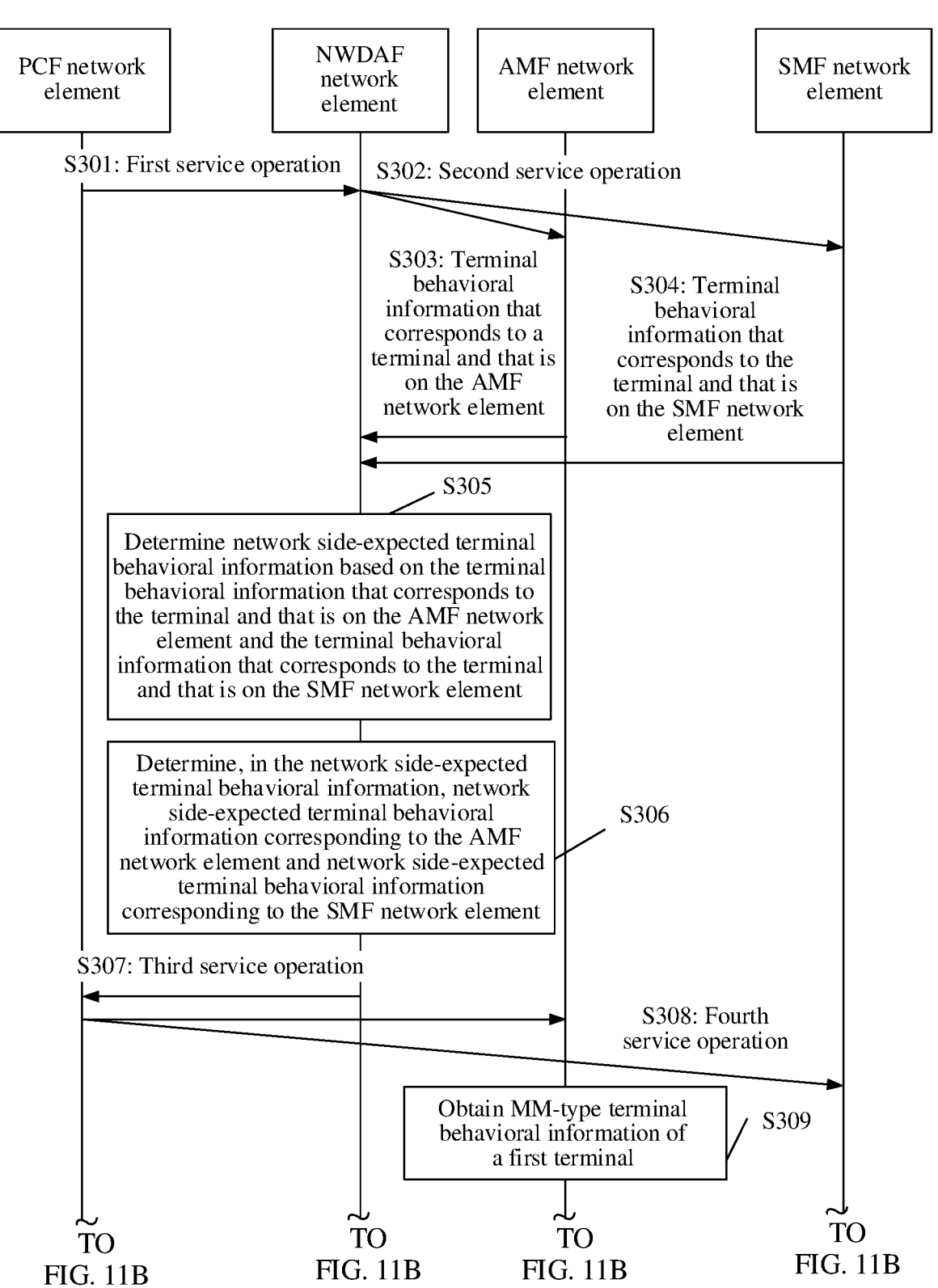
FIGS. 11A and 11B are schematic flowcharts of an information processing method according to an embodiment of this application.
Figure 11B:
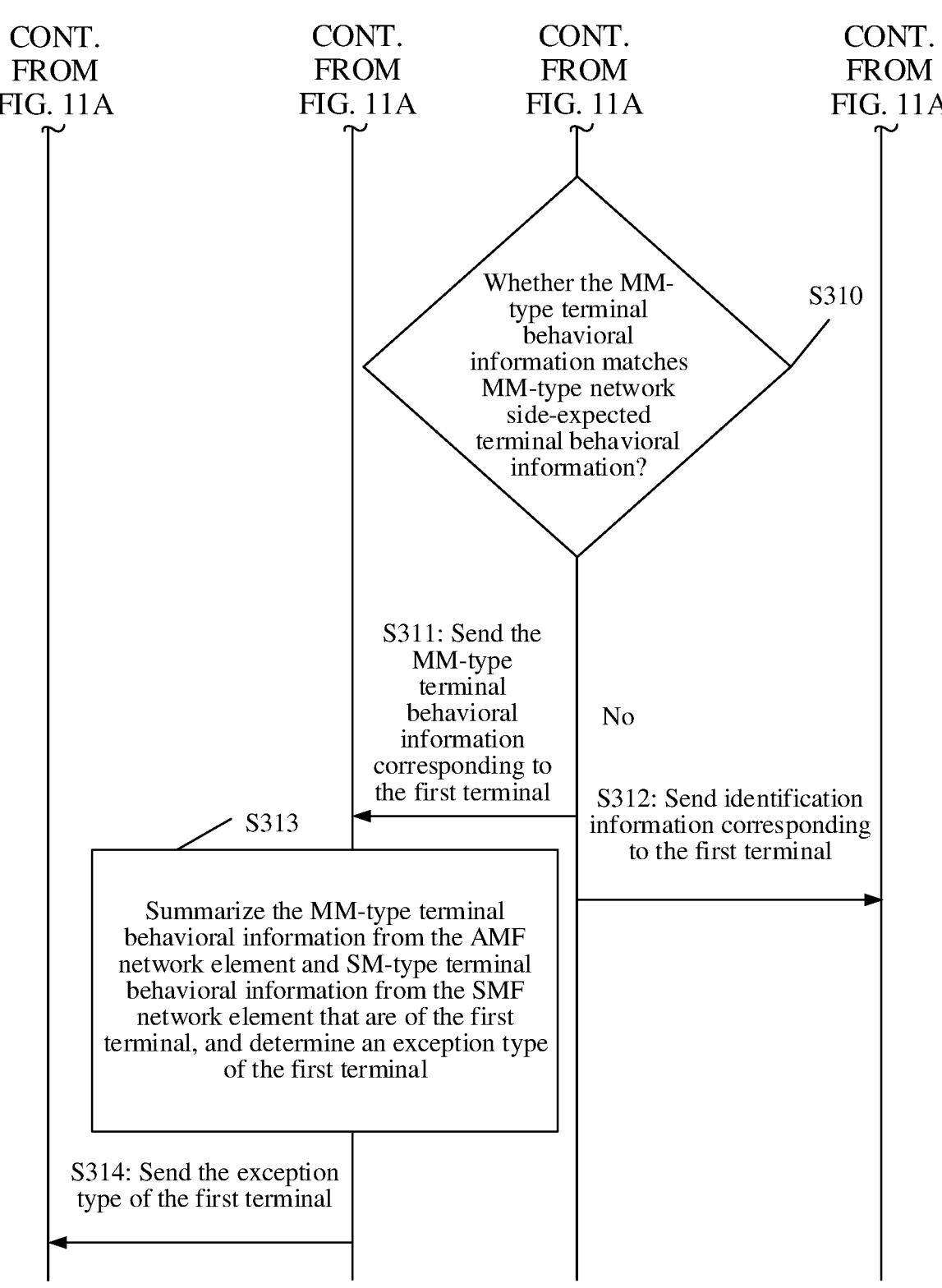

FIG. 11A and FIG. 11B show an embodiment of another information processing method according to the embodiments of this application. A difference between the embodiment shown in FIG. 11A and FIG. 11B and the embodiment shown in FIG. 10 lies in that in S201 in FIG. 10, the first service operation is from the UDM network element to the NWDAF network element, and in S301 in FIG. 11A and FIG. 11B, the first service operation is from a PCF network element to the NWDAF network element. For content of other steps 302 to 305, correspondingly refer to the content of S202 to S205. Details are not described herein again. In addition, after S305, the solution shown in FIG. 11A and FIG. 11B further includes the following steps.

S306: The NWDAF network element determines, in the network-expected terminal behavioral information, network-expected terminal behavioral information corresponding to the AMF network element and network-expected terminal behavioral information corresponding to the SMF network element.

S307: The NWDAF network element sends a third service operation to the PCF network element, where the third service operation includes the network-expected terminal behavioral information corresponding to the AMF network element and the network-expected terminal behavioral information corresponding to the SMF network element.

For example, the third service operation may be an Nnwdaf_EventsSubscription_Notify service operation.

S308: The PCF network element initiates a fourth service operation to the AMF network element or the SMF network element, where the fourth service operation is used to: send, to the AMF network element, the network-expected terminal behavioral information corresponding to the AMF network element; and send, to the SMF network element, the network-expected terminal behavioral information corresponding to the SMF network element.

For example, the fourth service operation may be an Npcf_UEExpectedBehavioralInfo_Notify service operation.

Further, the PCF network element may distribute, to the AMF network element, MM-type network-expected terminal behavioral information corresponding to each category; and distribute, to the SMF network element, SM-type network-expected terminal behavioral information corresponding to each category.

S309: The AMF network element obtains MM-type terminal behavioral information (referring to Table 2) of a first terminal, where the first terminal is any one of a plurality of terminals.

S310: If determining that the MM-type terminal behavioral information of the first terminal does not match MM-type network-expected terminal behavioral information that corresponds to the terminal and that is from the NWDAF network element to the AMF network element, the AMF network element determines that the first terminal is abnormal.

S311: The AMF network element sends, to the NWDAF network element, the MM-type terminal behavioral information corresponding to the first terminal.

S312: The AMF network element sends, to the SMF network element, identification information corresponding to the first terminal, where the identification information corresponding to the first terminal is used to instruct the SMF network element to report, to the NWDAF network element, SM-type terminal behavioral information that corresponds to the first terminal and that is on the SMF network element. It may be understood that after receiving the identification information corresponding to the first terminal, the SMF network element reports, to the NWDAF network element, the SM-type terminal behavioral information that corresponds to the first terminal and that is on the SMF network element.

S313: The NWDAF network element summarizes the MM-type terminal behavioral information from the AMF network element and the SM-type terminal behavioral information from the SMF network element that are of the first terminal, and determines an exception type of the first terminal.

S314: The NWDAF network element sends the exception type of the first terminal to the PCF network element.

It may be understood that the AMF network element in S310 to S311 may alternatively be replaced with an SMF network element. When the AMF network element is replaced with the SMF network element, the identification information corresponding to the first terminal in S312 is from the SMF network element to the AMF network element.

Figure 12A:
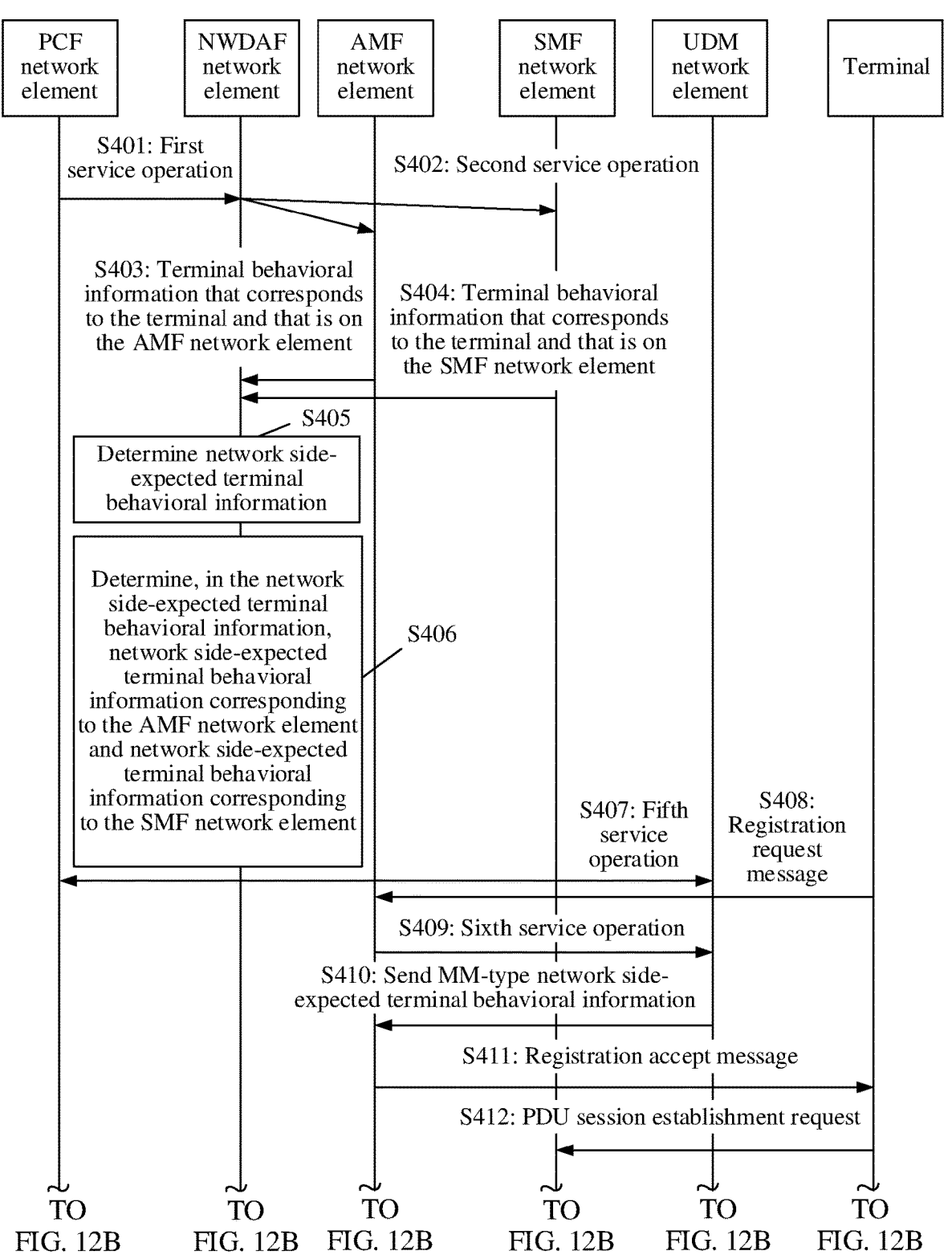
FIGS. 12A and 12B are schematic flowcharts of an information processing method according to an embodiment of this application.
Figure 12B:
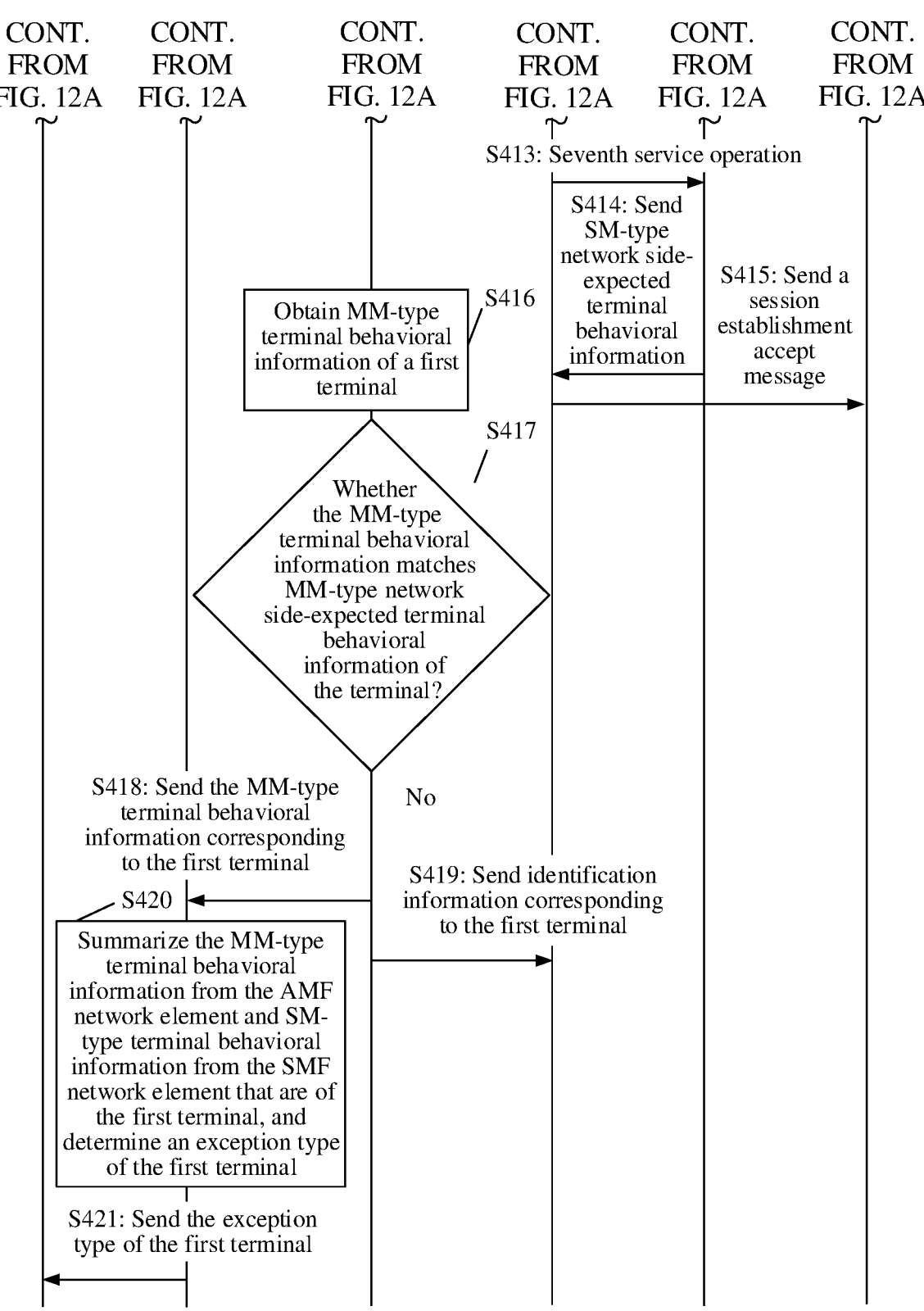

FIG. 12A and FIG. 12B are schematic flowcharts of an information processing method according to an embodiment of this application. In the solution shown in FIG. 12A and FIG. 12B, for S401 to S406, refer to content in the S301-S306. For content of S416 to S421, refer to the descriptions in S309 to S314. Details are not described herein again. In the solution shown in FIG. 12A and FIG. 12B:

S407: The NWDAF network element sends a fifth service operation to the UDM network element, where the fifth service operation includes the network-expected terminal behavioral information corresponding to the AMF network element and the network-expected terminal behavioral information corresponding to the SMF network element.

For example, the fifth service operation may be an Nnwdaf_EventsSubscription_Notify service operation.

S408: The terminal sends a registration request message to the AMF network element, where the registration request message includes identification information of the terminal, and the registration request message requests to register the terminal corresponding to the identification information of the terminal with a 5G network.

S409: The AMF network element sends a sixth service operation to the UDM network element, where the sixth service operation includes the identification information of the terminal.

For example, the sixth service operation may be an Nudm_SDM_Get service operation.

S410: The UDM network element sends, to the AMF network element, MM-type network-expected terminal behavioral information corresponding to the identification information of the terminal.

S411: The AMF network element sends a registration accept message to the terminal.

S412: The terminal sends a PDU session establishment request message to the SMF network element, where the PDU session establishment request message carries the identification information of the terminal.

For example, the terminal may send the PDU session establishment request message to the SMF network element using the AMF network element.

S413: The SMF network element sends a seventh service operation to the UDM network element, where the seventh service operation includes the identification information of the terminal.

For example, the seventh service operation may be an Nudm_SDM_Get service operation.

S414: The UDM network element sends, to the SMF network element, SM-type network-expected terminal behavioral information corresponding to the identification information of the terminal.

S415: The SMF network element sends a PDU session establishment accept message to the terminal using the AMF network element.

Embodiment 2

Figure 13:
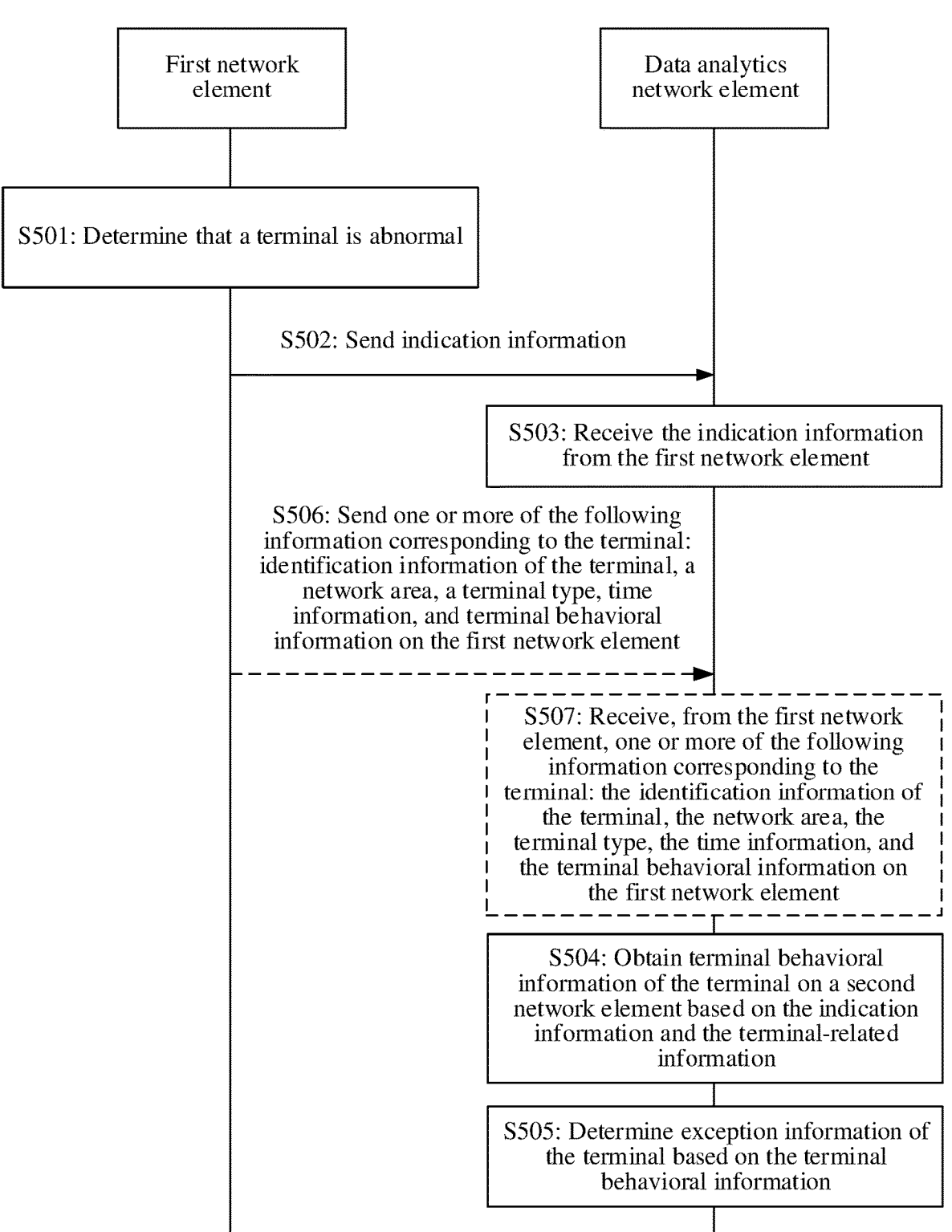
FIG. 13 is a schematic flowchart of a method for determining exception information of a terminal according to an embodiment of this application.

FIG. 13 is a schematic flowchart of a method for determining exception information of a terminal according to this embodiment of this application. The method includes the following steps.

S501: A first network element determines that a terminal is abnormal.

For example, the first network element may be the first core network element, the user data management network element 101, or the policy control function network element 107 in the communications system shown in FIG. 1. In addition, the first network element may alternatively be a user plane network element. For example, the first core network element may be a session management network element or a mobility management network element.

The first network element may obtain, from a user data management network element, the network-expected terminal behavioral information (for example, referring to Table 2) of the terminal on the first network element. The user data management network element may obtain the network-expected terminal behavioral information from a data analytics network element or an application function network element. For a process in which the user data management network element obtains the network-expected terminal behavioral information, refer to Embodiment 1. Details are not described herein again.

The network-expected terminal behavioral information of the terminal on the first network element may be understood as behavioral feature information of the terminal.

For example, the terminal behavioral information of the terminal on the first network element may include identification information of the terminal and behavioral data (for examples of information, refer to Table 1) of the terminal on the first network element. The terminal behavioral information of the terminal on the first network element is terminal behavioral data collected on the first network element. Moreover, in addition to the information shown in Table 1, the terminal behavioral data may further be shown in Table 3.

TABLE 3

| | Terminal behavioral data | |
| --- | --- | --- |
| Data type | Name of a network element to which terminal behavioral data belongs | Function |
| Mobility re-registration frequency | AMF network element | Indicating frequency of AMF network element re-registration (in different neighboring cells) |
| Reachability after a DNN failure | AMF network element | Indicating that a (signaling) data sending failure case exists when a terminal is reachable |
| Quantity of terminals in a geographical area | AMF network element | Indicating a quantity of terminals in a specific area (where the area is usually provided by an AF) |
| SUPI-PEI association update | UDM network element | Indicating that a terminal PEI (IMEI software version (SV)) (corresponding to a specific SUPI) is updated |
| Roaming status | UDM network element | Indicating a roaming status of the terminal (whether a serving PLMN and/or the terminal is in a home public land mobile network (HPLMN)) and whether a notification status is updated |

It should be understood that, in S501 and the following steps in this embodiment, there may be one terminal, a plurality of terminals, or a group of terminals. Details are not described below again.

In a possible implementation, S501 in this embodiment of this application may be implemented in the following manner: The first network element determines that the terminal is abnormal, based on network-expected terminal behavioral information (Expected UE behavioral information) of the terminal on the first network element and terminal behavioral information of the terminal on the first network element.

Step 501 may be implemented in the following manner: If the network-expected terminal behavioral information of the terminal on the first network element does not match terminal behavioral information of the terminal on the first network element, the first network element determines that the terminal is abnormal.

S502: The first network element sends indication information to the data analytics network element, where the indication information indicates that the terminal is abnormal.

For example, the data analytics network element may be the data analytics network element 104 shown in FIG. 1. For example, the data analytics network element may be an NWDAF network element.

In a possible implementation, S502 may be implemented in the following manner: The first network element may send, to the data analytics network element, an Nnf_EventExposure_Notify service operation carrying the indication information, where of is a name of the first network element. For example, if the first network element is an AMF network element, the service operation may be Namf_EventExposure_Notify. If the first network element is an SMF network element, the service operation may be Nsmf_EventExposure_Notify.

For example, the first network element may separately send, to the data analytics network element, another message or service operation that carries the indication information, for example, a terminal exception notification message or an Nnf_UEAbnormal_Notify service operation.

S503: The data analytics network element receives the indication information from the first network element.

S504: The data analytics network element obtains terminal behavioral information of the terminal on a second network element based on the indication information.

It should be understood that in S504, the data analytics network element may obtain terminal behavioral information of the terminal on one or more second network elements. The terminal behavioral information of the terminal on the one or more second network elements may be the same or different. For example, the second network elements are a policy control function network element and a session management network element. The data analytics network element may obtain terminal behavioral information 1 of the terminal on the policy control function network element and terminal behavioral information 2 of the terminal on the session management network element. In addition, the terminal behavioral information 1 of the terminal on the policy control function network element may be different from the terminal behavioral information 2 of the terminal on the session management network element.

It should be understood that the one or more second network elements may include the first network element. Certainly, the one or more second network elements may alternatively not include the first network element. This is not limited in this embodiment of this application. If the one or more second network elements include the first network element, the data analytics network element may obtain the terminal behavioral information from the first network element that triggers the data analytics network element to determine exception information of the terminal and a network element other than the first network element in the one or more second network elements. For example, the first network element is a mobility management network element, and the one or more second network elements may include the mobility management network element and a session management network element. To be more specific, the mobility management network element triggers the data analytics network element to obtain the exception information of the terminal. In this case, the data analytics network element may obtain the terminal behavioral information from the mobility management network element and the session management network element. When the one or more second network elements do not include the first network element, the data analytics network element may obtain the terminal behavioral information from another network element that triggers the data analytics network element to determine exception information of the terminal. For example, if the first network element is a mobility management network element, and the one or more second network elements include a policy control function network element and a session management network element, the data analytics network element may obtain the terminal behavioral information from the policy control function network element or the session management network element.

It should be noted that when the data analytics network element obtains the terminal behavioral information from the one or more second network elements, the data analytics network element may associate the terminal behavioral information of the terminal on the one or more second network elements, and determine the exception information of the terminal based on terminal behavioral information obtained after the association.

It should be understood that, in S504, when the data analytics network element obtains terminal behavioral information of the terminal on at least two second network elements, the data analytics network element needs to associate the terminal behavioral information of the terminal on the at least two second network elements based on the identification information of the terminal, to obtain complete terminal behavioral information of the terminal. Certainly, in addition to the identification information of the terminal, the data analytics network element may alternatively associate the terminal behavioral information of the terminal on the at least two second network elements based on area information, time information, or terminal type information. For a process in which the data analytics network element associates the terminal behavioral information of the terminal on the at least two second network elements, refer to the descriptions of S1011 in Embodiment 1. Details are not described herein again.

S505: The data analytics network element determines the exception information of the terminal based on the terminal behavioral information.

For example, the exception information of the terminal includes one or more of the following information corresponding to the terminal: the identification information, an exception type, an exception identifier, and an exception level of the terminal. The exception identifier is used to identify the exception type, and the exception level indicates a degree or a value of the exception type.

In an optional embodiment, still with reference to FIG. 13, before S504 provided in this embodiment of this application, the method provided in this embodiment of this application further includes the following steps.

S506: The first network element sends, to the data analytics network element, one or more of the following information corresponding to the terminal: the identification information of the terminal, a network area, a terminal type, time information, and the terminal behavioral information on the first network element.

Functions of the identification information of the terminal, the network area, the terminal type, the time information, and the terminal behavioral information on the first network element are shown in Table 4.

TABLE 4

| Functions of the information provided by the first network element to the data analytics network element | |
| --- | --- |
| Information | Function |
| Identification information of the terminal | The identification information of the terminal may be an SUPI, a PEI, a GPSI, an IMSI, an IMEI, an IP, an IP 5-tuple, or the like, used to identify the terminal; or may be an internal group ID, a UE group ID, or an external group ID, used to identify a group of terminals. |

TABLE 4-continued

| Functions of the information provided by the first network element to the data analytics network element | |
|---|---|
| Information | Function |
| Network area | The network area may be a network area (for example, a TA, a TA list, a cell, or a cell list), or may be a geographical area (for example, a GPS list), indicates a network area in which the terminal is located. |
| Terminal type | The terminal type may be a terminal model iPhone 8, Mate 20, Honor 10, or the like; or may be an operating system (iOS, Android, or Symbian) of the terminal, indicates a type of the terminal. |
| Time information | The time information is a timestamp, a time interval, a time window, or the like, indicates a time period in which the terminal is abnormal. |

For ease of description, in this embodiment of this application, the information from the first network element to the data analytics network element in S506 may be referred to as terminal-related information. The terminal-related information and the indication information may be from the first network element to the data analytics network element using a same message (for example, an Nnf_EventExposure_Notify service operation). In this way, signaling overheads can be reduced.

Certainly, the terminal-related information and the indication information may alternatively be from the first network element to the data analytics network element using different messages. For example, after the first network element sends the indication information, the data analytics network element subscribes to the terminal behavioral information from the first network element, and then the first network element sends the terminal behavioral information to the data analytics network element. A step is the same as S504.

S507: The data analytics network element receives, from the first network element, one or more of the following information corresponding to the terminal: the identification information of the terminal, the network area, the terminal type, the time information, and the terminal behavioral information on the first network element.

For content of the identification information of the terminal, the network area, the terminal type, the time information, and the terminal behavioral data on the first network element, refer to the foregoing related descriptions. Details are not described herein again.

Correspondingly, S504 may be implemented in the following manner: The data analytics network element obtains terminal behavioral information of one or more terminals on the second network element based on the indication information and any one or more of the information received in S507.

It should be understood that the identification information of the terminal may indicate one or more terminals (referring to Table 4). For terminal behavioral data, refer to the descriptions in Table 1 and Table 3. Details are not described herein again.

In a possible implementation, the terminal-related information received by the data analytics network element in S507 may be separately used, or may be used in a combination manner. For use, refer to the process in which the data analytics network element uses the filtering information in S1012.

Figure 14:
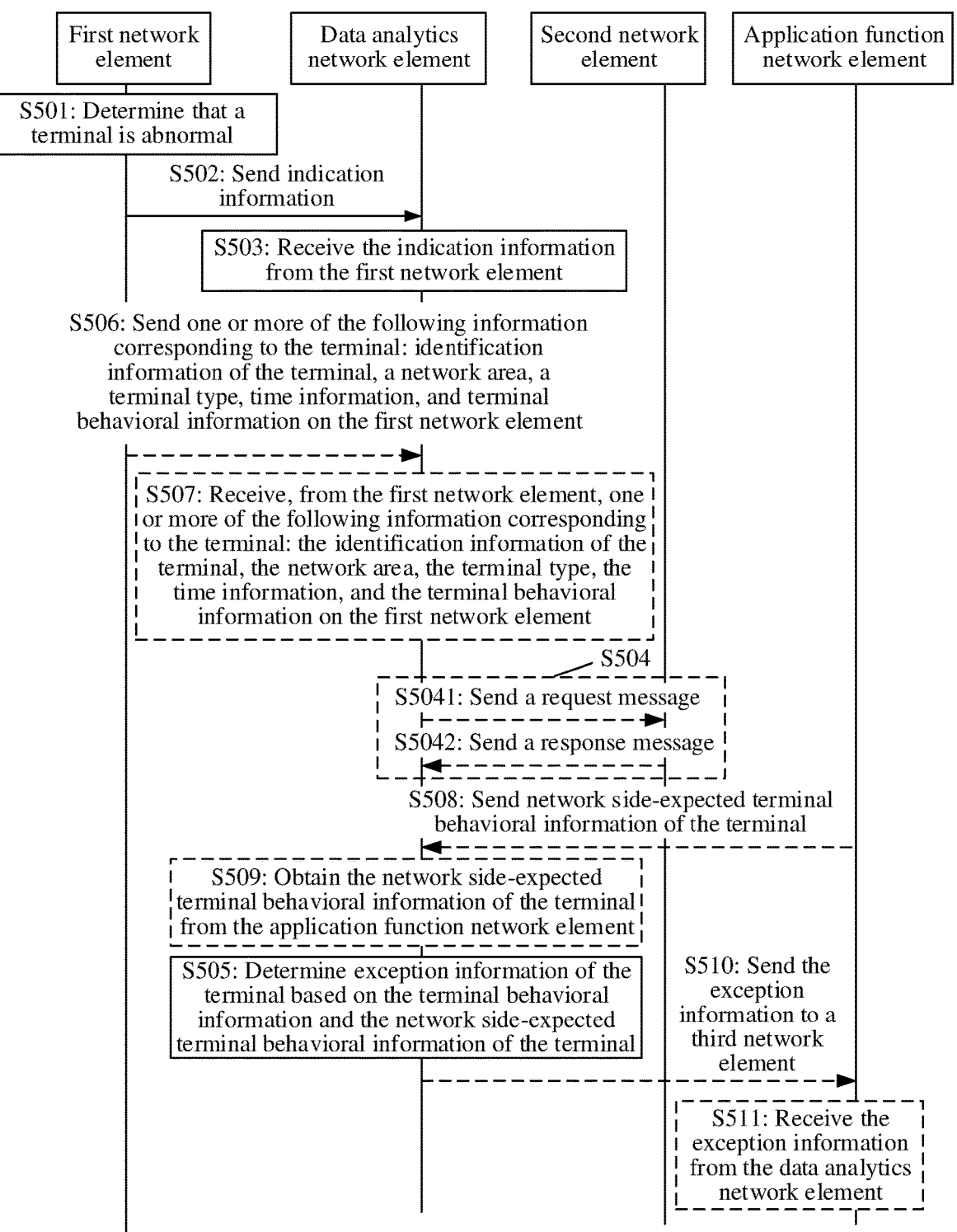
FIG. 14 is a schematic flowchart of a method for determining exception information of a terminal according to an embodiment of this application.

In a possible implementation, as shown in FIG. 14, S504 in this embodiment of this application may be implemented in the following manner.

S5041: The data analytics network element sends a request message to the second network element, such that the second network element receives the request message from the data analytics network element, where the request message requests the terminal behavioral information of the terminal on the second network element.

For example, the request message may be an Nnf_EventExposure_Subscribe service operation. That is, the data analytics network element subscribes to data from the second network element.

In an optional implementation, the request message may further include one or more of the following information corresponding to the terminal: a terminal identifier, the network area, the terminal type, and the time information. For details of the information, refer to Table 4. The information is used to collect the terminal behavioral information of the terminal on the second network element from the second network element. Refer to Table 1 and Table 3.

S5042: The data analytics network element receives a response message from the second network element, where the response message includes the terminal behavioral information of the terminal on the second network element. For example, the response message may be an Nnf_EventExposure_Notify service operation.

For example, the terminal behavioral information includes any one or more of the following information: identification information of the second network element, location information, a communication start time, a communication end time, a packet delay, a quantity of packets, a packet size, or at least one piece of first-type data of the one or more terminals on the second network element. For the terminal behavioral information, refer to Table 1 and Table 3.

For the at least one piece of first-type data, refer to the foregoing descriptions in Embodiment 1. Details are not described herein again. It should be understood that, in S505, if the first network element sends the terminal behavioral information of the terminal on the first network element to the data analytics network element, in S5041, the data analytics network element does not need to subscribe to the terminal behavioral information of the terminal on the first network element from the first network element. In this case, the data analytics network element needs to associate the terminal behavioral information of the terminal on the first network element and the terminal behavioral information of the terminal on the second network element based on the identification information of the terminal, to obtain complete terminal behavioral information of the terminal. In addition to the identification information of the terminal, the data analytics network element may alternatively associate terminal behavioral information on at least two second network elements based on area information, time information, or terminal type information.

Still with reference to FIG. 14, S505 in this embodiment of this application may be implemented in the following manner: The data analytics network element determines the exception information of the terminal based on the terminal behavioral information and network-expected terminal behavioral information of the terminal.

For example, if the data analytics network element further obtains the terminal behavioral information of the terminal on the first network element, S505 in this embodiment of this application may be implemented in the following manner: The data analytics network element determines the exception information of the terminal based on the terminal behavioral information of the terminal on the first network element, the terminal behavioral information of the terminal on the second network element, and the network-expected terminal behavioral information of the terminal.

The network-expected terminal behavioral information of the terminal may be prestored in the data analytics network element. If the data analytics network element does not have the network-expected terminal behavioral information of the terminal after the data analytics network element obtains the terminal behavioral information, in an optional embodiment, still with reference to FIG. 14, before S505 provided in this embodiment of this application, the method provided in this embodiment of this application further includes the following steps.

S508: The application function network element sends the network-expected terminal behavioral information of the terminal to the data analytics network element.

For example, before S508, the method provided in this embodiment of this application further includes: requesting, by the data analytics network element, behavioral feature data of the one or more terminals from the application function network element.

Optionally, before S508, the method provided in this embodiment of this application further includes: requesting, by the data analytics network element, behavioral feature data of the one or more terminals from the application function network element using a network exposure function network element.

S509: The data analytics network element obtains the network-expected terminal behavioral information of the terminal from the application function network element.

For example, the method provided in this embodiment of this application further includes: obtaining, by the data analytics network element, the network-expected terminal behavioral information of the terminal from the application function network element using the network exposure function network element.

It should be noted that, if the network-expected terminal behavioral information of the terminal may be obtained through analysis by the data analytics network element, S508 and S509 may be omitted.

In an optional embodiment, still with reference to FIG. 14, after S505, the method provided in this embodiment of this application further includes the following steps.

S510: The data analytics network element sends the exception information to a third network element, where the exception information is used to perform policy control on the terminal.

For example, the third network element may be an AF network element or a policy control function network element. In FIG. 14, an example in which the third network element is an AF network element is used.

S511: The third network element receives the exception information from the data analytics network element.

Embodiment 3

Figure 15:
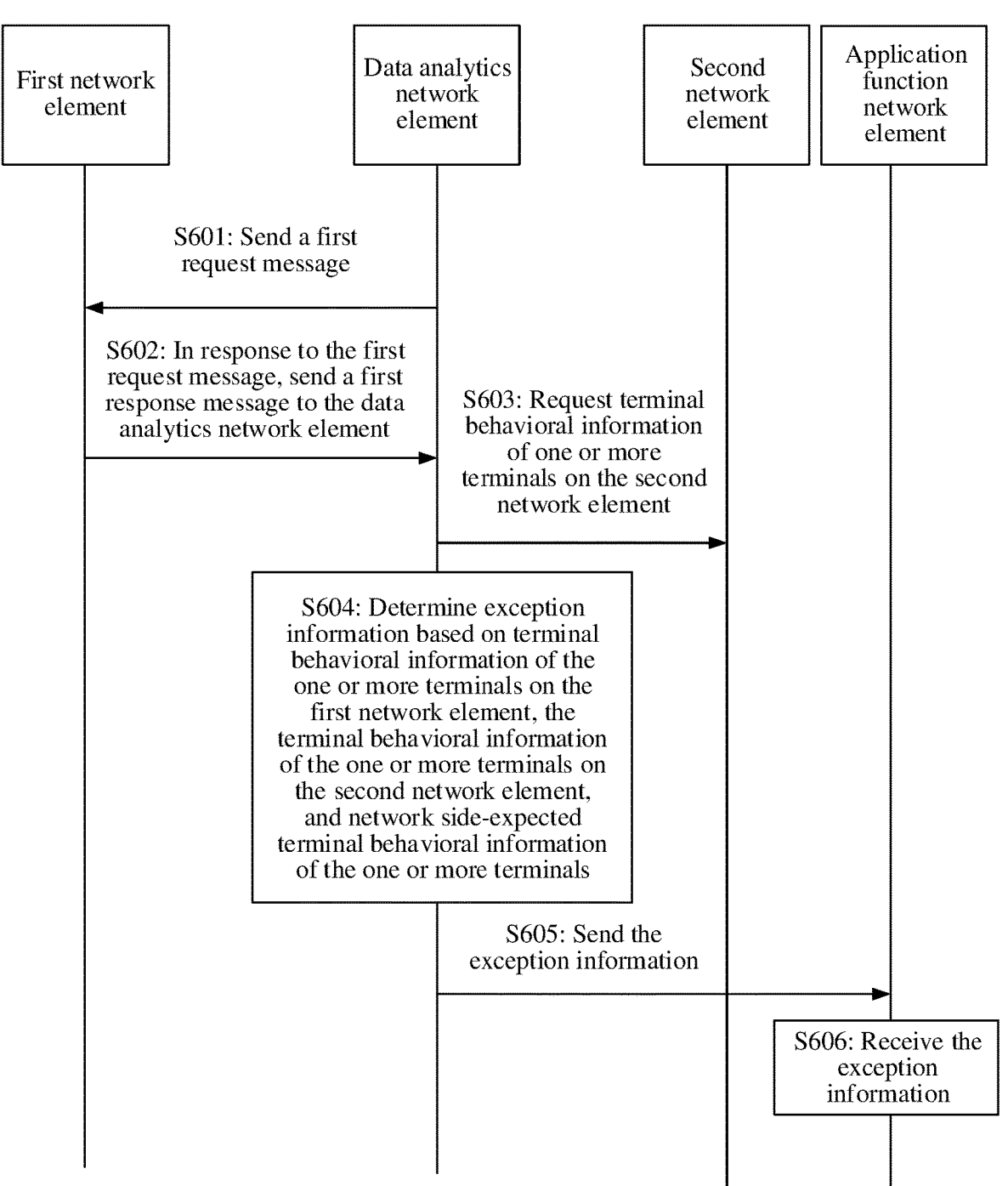
FIG. 15 is a schematic flowchart of a method for determining exception information of a terminal according to an embodiment of this application.

FIG. 15 shows a method for determining exception information of a terminal according to this embodiment of this application. The method includes the following steps.

S601: A data analytics network element sends a first request message to a first network element, where the first request message requests terminal behavioral information of an abnormal terminal on the first network element.

For example, the first network element may be any one of a session management network element, a policy control function network element, a user data management network element, a user plane network element, or a mobility management network element.

In a possible implementation, the first request message may carry a first instruction. The first instruction is used to instruct the first network element to report the terminal behavioral information of the abnormal terminal on the first network element.

In another possible implementation, the first request message itself may be used to request the terminal behavioral information of the abnormal terminal on the first network element.

For example, the first network element is a session management network element. The first request message may be Nsmf_EventExposure_Subscribe. The first instruction includes an event identifier (Event ID) and event filtering information (Event Filter). On one hand, the event ID may be used to indicate abnormal terminal behavioral information (Abnormal UE behavior information), and the event filter is not specifically specified. The first network element may compare, based on the event ID, the terminal behavioral information of the terminal on the first network element with the network-expected terminal behavioral information of the terminal on the first network element, and if finding that the terminal behavioral information of the terminal on the first network element does not match the network-expected terminal behavioral information of the terminal on the first network element, the first network element further reports the terminal behavioral information of the terminal on the first network element to the data analytics network element. On the other hand, the event ID may be used to indicate terminal behavioral information (UE behavior information), and the event filter may include indication information (for example, a pre-check indicator). The indication information is used to instruct the first network element to compare the terminal behavioral information of the terminal on the first network element with the network-expected terminal behavioral information of the terminal on the first network element, and if it is found that the terminal behavioral information of the terminal on the first network element does not match the network-expected terminal behavioral information of the terminal on the first network element, the terminal behavioral information of the terminal on the first network element is further reported to the data analytics network element.

S602: In response to the first request message, the first network element sends a first response message to the data analytics network element, where the first response message includes identification information of one or more terminals and terminal behavioral information of each of the one or more terminals on the first network element.

For the terminal behavioral information of each terminal on the first network element, refer to the descriptions in Embodiment 2. Details are not described herein again.

It should be understood that, after receiving the first request message, the first network element may perform step 501, to determine that the abnormal terminal is served by the first network element, or determine the abnormal terminal behavioral information.

S603: The data analytics network element requests terminal behavioral information of the one or more terminals on a second network element from the second network element based on the identification information of the one or more terminals.

For example, S603 may be implemented in the following manner: The data analytics network element sends a second request message to the second network element, such that the second network element receives the second request message from the data analytics network element. The second request message requests the terminal behavioral information of the one or more terminals on the second network element. The second network element sends a second response message to the data analytics network element, such that the data analytics network element receives the second response message. The second response message includes the terminal behavioral information of the one or more terminals on the second network element. For example, the second request message may carry a first field, and the first field requests the terminal behavioral information of the one or more terminals on the second network element. Alternatively, the second request message requests the terminal behavioral information of the one or more terminals on the second network element from the second network element.

For example, the second request message may include the identification information of the one or more terminals.

S604: The data analytics network element determines exception information based on the terminal behavioral information of the one or more terminals on the first network element, the terminal behavioral information of the one or more terminals on the second network element, and network-expected terminal behavioral information of the one or more terminals.

For an implementation of S604, refer to an implementation process of S505 in Embodiment 2. Details are not described herein again.

In a possible implementation, after S604, the method provided in this embodiment of this application further includes S605 and S606. Descriptions of S605 and S606 are the same as the descriptions of S510 and S511 in Embodiment 2. Details are not described herein again.

It should be understood that a difference between Embodiment 3 and Embodiment 2 lies in: in Embodiment 2, the first network element triggers, using the indication information, the data analytics network element to obtain the terminal behavioral information of the terminal, such that the data analytics network element can determine the exception information of the terminal based on the terminal behavioral information of the terminal that is obtained from the second network element. Additionally, in Embodiment 3, after the data analytics network element proactively subscribes to the information of the abnormal terminal from the first network element, and obtains the identification information of the abnormal terminal and the terminal behavioral information of the abnormal terminal on the first network element, the data analytics network element obtains, from the second network element, the terminal behavioral information of the abnormal terminal on the second network element based on the identification information of the abnormal terminal, and obtains the exception information of the terminal through analysis with reference to the terminal behavioral information of the abnormal terminal on the first network element and the terminal behavioral information of the abnormal terminal on the second network element.

The foregoing describes the solutions in the embodiments of this application mainly from a perspective of interaction between the network elements. It may be understood that, to implement the foregoing functions, the network elements, such as the information processing apparatus and the information sending apparatus, include corresponding hardware structures and/or software modules for performing the functions. A person skilled in the art should be aware that, in combination with the examples of units and algorithms steps that are described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the information processing apparatus and the information sending apparatus may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into units is an example, and is merely a logical function division. In an actual implementation, another division manner may be used.

Descriptions are made below using an example in which each functional unit is obtained through division based on a corresponding function.

Figure 16:
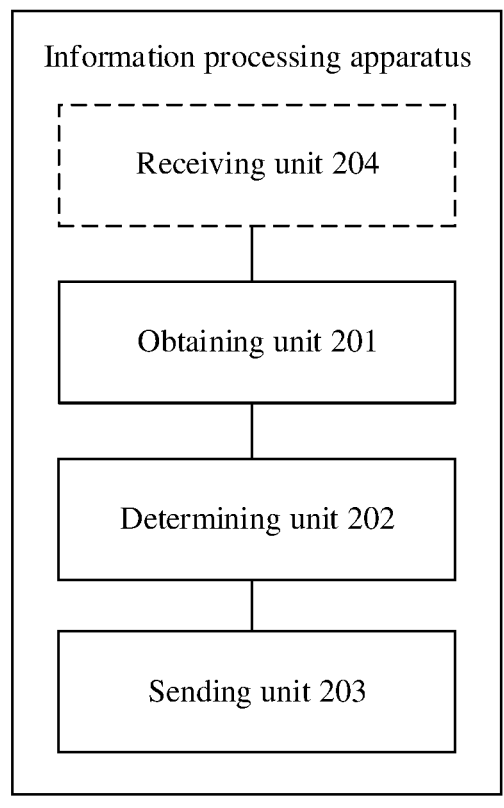
FIG. 16 is a schematic structural diagram of an information processing apparatus according to an embodiment of this application.

When an integrated unit is used, FIG. 16 is a possible schematic structural diagram of the information processing apparatus in the foregoing embodiments. The information processing apparatus may be a data analytics network element, or a chip applied to a data analytics network element. The information processing apparatus includes an obtaining unit 201, a determining unit 202, and a sending unit 203. The obtaining unit 201 is configured to support the information processing apparatus in performing S101 and S1011 in the foregoing embodiment. The determining unit 202 is configured to support the information processing apparatus in performing S102, S111, and S112 in the foregoing embodiment. The sending unit 103 is configured to support the information processing apparatus in performing S103, S1012, S105, and S109 in the foregoing embodiment. Optionally, the information processing apparatus may further include a receiving unit 204 configured to support the information processing apparatus in performing S108 in the foregoing embodiment. All related content of the steps in the foregoing method embodiments may be cited for function descriptions of the corresponding functional modules. Details are not described herein again.

Figure 17:
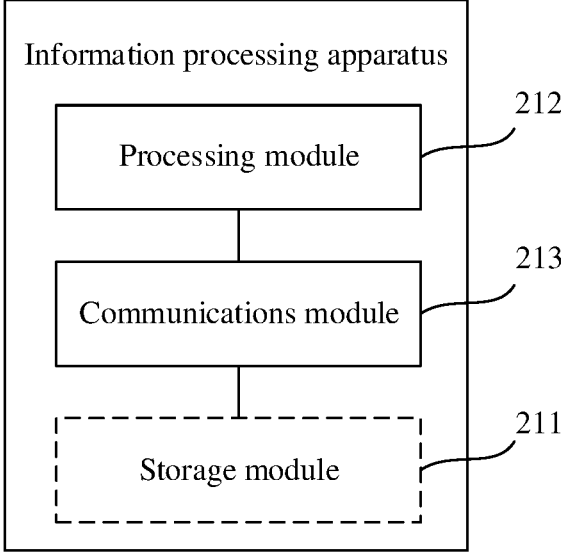
FIG. 17 is a schematic structural diagram of an information processing apparatus according to an embodiment of this application.

When an integrated unit is used, FIG. 17 is a possible schematic diagram of a logical structure of the information processing apparatus in the foregoing embodiments. The information processing apparatus may be the data analytics network element, or a chip applied to the data analytics network element in the foregoing embodiments. The information processing apparatus includes a processing module 212 and a communications module 213. The processing module 212 is configured to control and manage an action of the information processing apparatus. For example, the processing module 212 is configured to perform a message or data processing step on the information processing apparatus side, for example, support the information processing apparatus in performing S102, S111, and S112 in the foregoing embodiment. The communications module 213 is configured to support the information processing apparatus in performing S103, S1012, S105, S108, and S109 in the foregoing embodiment; and/or is used in another process performed by the information processing apparatus in the technology described in this specification.

Optionally, the information processing apparatus may further include a storage module 211 configured to store program code and data of the information processing apparatus.

The processing module 212 may be a processor or controller. For example, the processing module 212 may be a central processing unit, a general-purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 18:
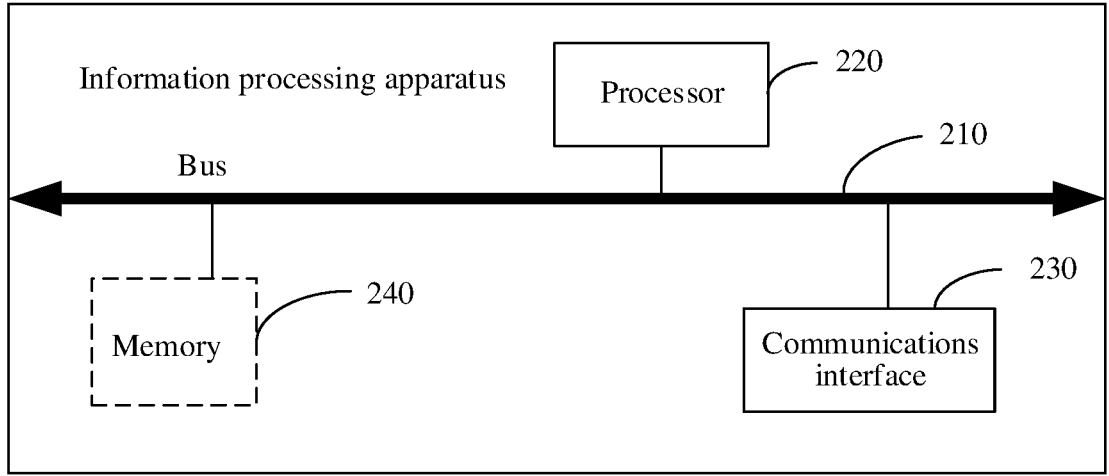
FIG. 18 is a schematic structural diagram of an information processing apparatus according to an embodiment of this application.

When the processing module 212 is a processor 220, the communications module 213 is a communications interface 230 or a transceiver, and the storage module 211 is a memory 240, the information processing apparatus in this application may be a device shown in FIG. 18.

The communications interface 230, one or more (including two) processors 220, and the memory 240 are connected to each other using a bus 210. The bus 210 may be a peripheral component interconnect (PCI) bus, an extended industry standard architecture (EISA) bus, or the like. The bus 210 may be classified into an address bus, a data bus, a control bus, and the like. For ease of representation, only one thick line is used to represent the bus in FIG. 18, but this does not mean that there is only one bus or only one type of bus. The memory 240 is configured to store program code and data of the information processing apparatus. The communications interface 230 is configured to support the information processing apparatus in communicating with another device (for example, an information sending apparatus), for example, support the information processing apparatus in performing S1012, S105, S108, and S109. The processor 220 is configured to support the information processing apparatus in executing the program code and the data that are stored in the memory 240, to implement S102, S111, and S112 provided in this application.

Figure 19:
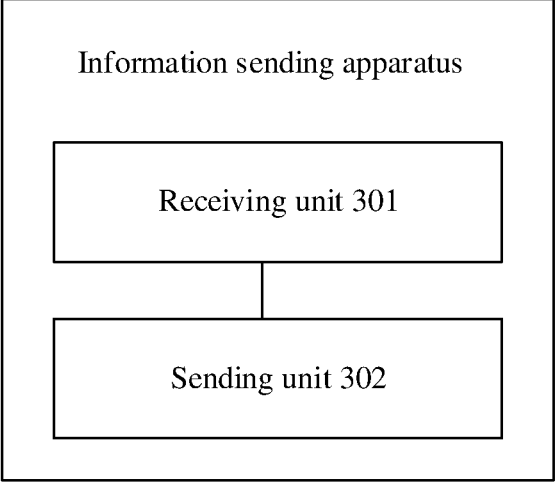
FIG. 19 is a schematic structural diagram of an information sending apparatus according to an embodiment of this application.

When an integrated unit is used, FIG. 19 is a possible schematic structural diagram of the information sending apparatus in the foregoing embodiments. The information sending apparatus may be a core network element, or a chip applied to a core network element. The information sending apparatus includes a receiving unit 301 and a sending unit 302. The receiving unit 301 is configured to support the information sending apparatus in performing S1013 in the foregoing embodiment, and the sending unit 302 is configured to support the information sending apparatus in performing S1014 in the foregoing embodiment. All related content of the steps in the foregoing method embodiments may be cited for function descriptions of the corresponding functional modules. Details are not described herein again.

Figure 20:
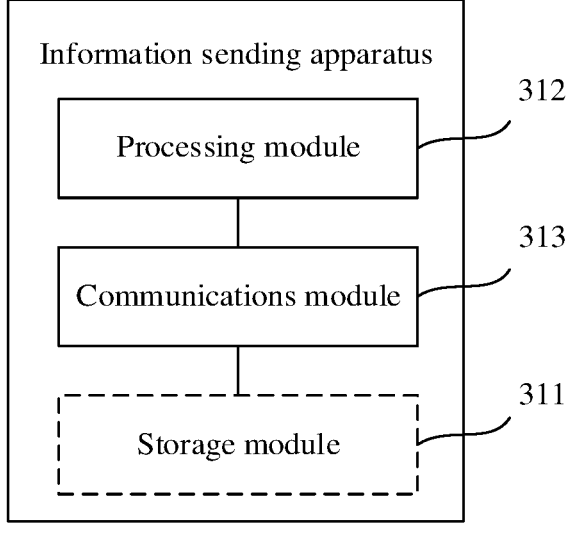
FIG. 20 is a schematic structural diagram of an information sending apparatus according to an embodiment of this application.

When an integrated unit is used, FIG. 20 is a possible schematic diagram of a logical structure of the information sending apparatus in the foregoing embodiments. The information sending apparatus may be the core network element, or a chip applied to the core network element in the foregoing embodiments. The information sending apparatus includes a processing module 312 and a communications module 313. The processing module 312 is configured to control and manage an action of the information sending apparatus. For example, the processing module 312 is configured to perform a message or data processing step on the information sending apparatus side. The communications module 313 is configured to: support the information sending apparatus in performing S1014 and S1013 in the foregoing embodiment; and/or is used in another process performed by the information sending apparatus in the technology described in this specification.

Optionally, the information sending apparatus may further include a storage module 311 configured to store program code and data of the information sending apparatus.

The processing module 312 may be a processor or controller. For example, the processing module 312 may be a central processing unit, a general-purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 313 may be a transceiver, a transceiver circuit, a communications interface, or the like. The storage module 311 may be a memory.

Figure 21:
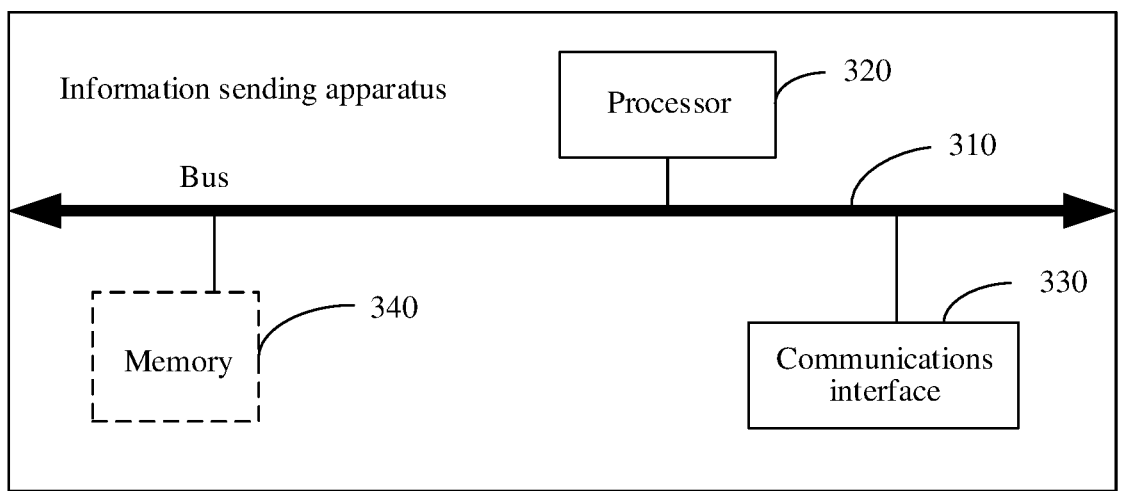
FIG. 21 is a schematic structural diagram of an information sending apparatus according to an embodiment of this application.

When the processing module 312 is a processor 320, the communications module 313 is a communications interface 330 or a transceiver, and the storage module 311 is a memory 340, the information sending apparatus in this application may be a device shown in FIG. 21.

The communications interface 330, one or more (including two) processors 320, and the memory 340 are connected to each other using a bus 310. The bus 310 may be a PCI bus, an EISA bus, or the like. The bus 310 may be classified into an address bus, a data bus, a control bus, and the like. For ease of representation, only one thick line is used to represent the bus in FIG. 21, but this does not mean that there is only one bus or only one type of bus. The memory 340 is configured to store program code and data of the information sending apparatus. The communications interface 330 is configured to support the information sending apparatus in communicating with another device (for example, a terminal). The processor 320 is configured to support the information sending apparatus in executing the program code and the data that are stored in the memory 340, to implement S1013 and S1014 provided in this application.

Figure 22:
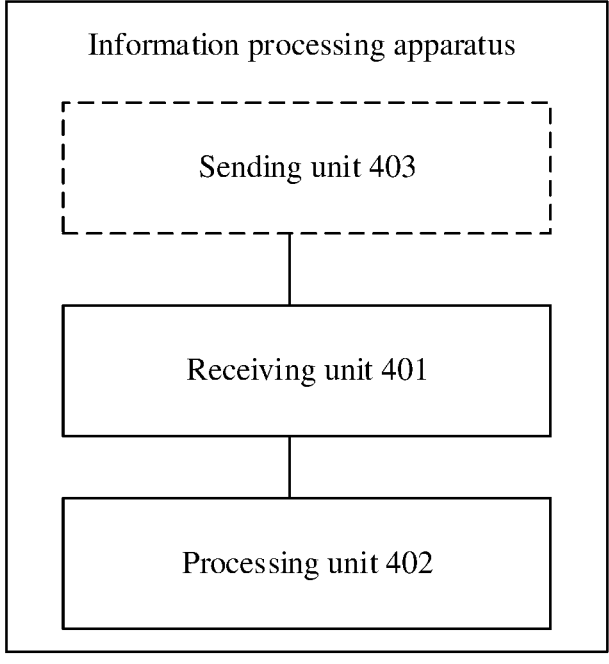
FIG. 22 is a schematic structural diagram of an information processing apparatus according to an embodiment of this application.

When an integrated unit is used, FIG. 22 is a possible schematic structural diagram of the information processing apparatus in the foregoing embodiments. The information processing apparatus may be a user data management network element, or a chip applied to a user data management network element. The information processing apparatus includes a receiving unit 401 and a processing unit 402. The receiving unit 401 is configured to support the information processing apparatus in performing S104, S106, and S110 in the foregoing embodiment. The processing unit 402 is configured to support the information processing apparatus in performing S104-1 in the foregoing embodiment. Optionally, the information processing apparatus may further include a sending unit 403 configured to support the information processing apparatus in performing S107 in the foregoing embodiment. All related content of the steps in the foregoing method embodiments may be cited for function descriptions of the corresponding functional modules. Details are not described herein again.

Optionally, the information processing apparatus shown in FIG. 22 may alternatively be a policy control function network element or a chip in a policy control function network element. In this case, for a process performed by each unit in the information processing apparatus, refer to the foregoing descriptions. Details are not described herein again. A difference lies in that the receiving unit 401 may not be configured to perform S106, but is configured to perform S113. In this case, the processing unit 402 may not need to perform S104-1, but may determine the network-expected terminal behavioral information corresponding to each core network element in the network-expected terminal behavioral information.

Figure 23:
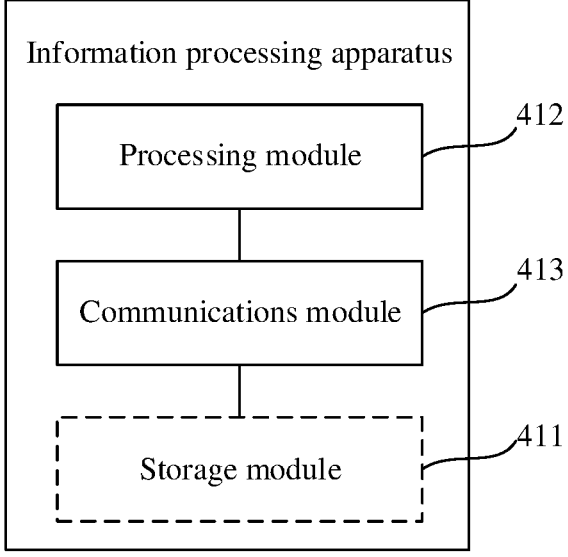
FIG. 23 is a schematic structural diagram of an information processing apparatus according to an embodiment of this application.

When an integrated unit is used, FIG. 23 is a possible schematic diagram of a logical structure of the information processing apparatus in the foregoing embodiments. The information processing apparatus may be the user data management network element, or a chip applied to the user data management network element in the foregoing embodiments. The information processing apparatus includes a processing module 412 and a communications module 413. The processing module 412 is configured to control and manage an action of the information processing apparatus. For example, the processing module 412 is configured to perform a message or data processing step, for example, S104-1, on the information processing apparatus side. The communications module 413 is configured to support the information processing apparatus in performing S104, S106, S107, and S110 in the foregoing embodiment; and/or is used in another process performed by the information processing apparatus in the technology described in this specification.

Optionally, the information processing apparatus may further include a storage module 411 configured to store program code and data of the information processing apparatus.

Optionally, when the information processing apparatus is a policy control function network element or a chip applied to a policy control function network element, for steps performed by the modules in the information processing apparatus, refer to the foregoing descriptions. Details are not described herein again. A difference lies in that the communications module 413 may not be configured to perform S106, but is configured to perform S113. In this case, the processing module 412 may not need to perform S104-1, but may determine the network-expected terminal behavioral information corresponding to each core network element in the network-expected terminal behavioral information.

The processing module 412 may be a processor or controller. For example, the processing module 412 may be a central processing unit, a general-purpose processor, a digital signal processor, an application-specific integrated circuit, a field programmable gate array or another programmable logic device, a transistor logic device, a hardware component, or any combination thereof. The processing module 412 may implement or execute various example logical blocks, modules, and circuits described with reference to content disclosed in the present disclosure. Alternatively, the processor may be a combination of processors implementing a computing function, for example, a combination of one or more microprocessors, or a combination of a digital signal processor and a microprocessor. The communications module 413 may be a transceiver, a transceiver circuit, a communications interface, or the like. The storage module 411 may be a memory.

Figure 24:
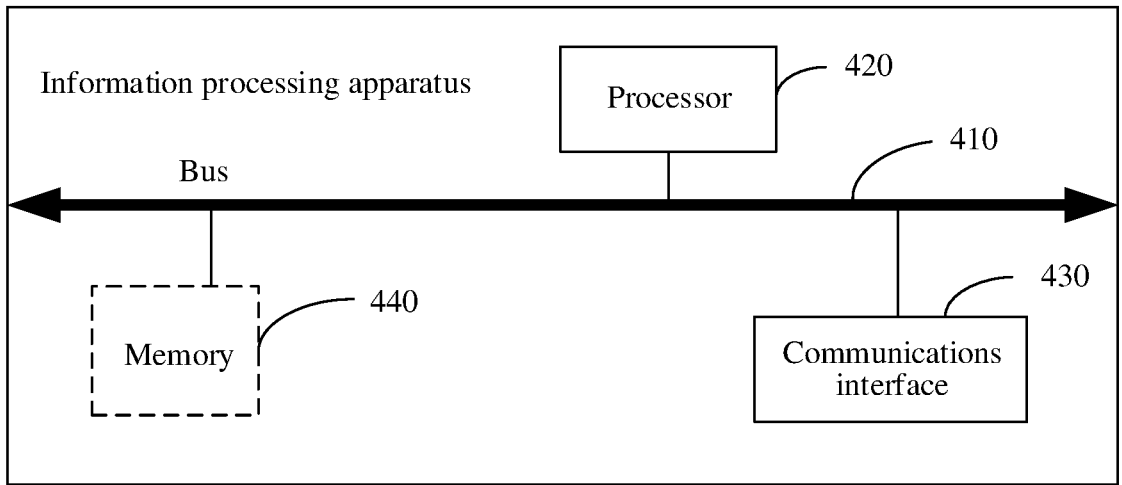
FIG. 24 is a schematic structural diagram of an information processing apparatus according to an embodiment of this application.

When the processing module 412 is a processor 420, the communications module 413 is a communications interface 430 or a transceiver, and the storage module 411 is a memory 440, the information processing apparatus in this application may be a device shown in FIG. 24.

The communications interface 430, one or more (including two) processors 420, and the memory 440 are connected to each other using a bus 410. The bus 410 may be a PCI bus, an EISA bus, or the like. The bus may be classified into an address bus, a data bus, a control bus, and the like. For ease of representation, only one thick line is used to represent the bus in FIG. 24, but this does not mean that there is only one bus or only one type of bus. The memory 440 is configured to store program code and data of the information processing apparatus. The communications interface 430 is configured to support the information processing apparatus in communicating with another device (for example, an information sending apparatus). The processor 420 is configured to support the information processing apparatus in executing the program code and the data that are stored in the memory 440, to implement S104, S104-1, S106, S107, and S110 provided in this application.

Figure 25:
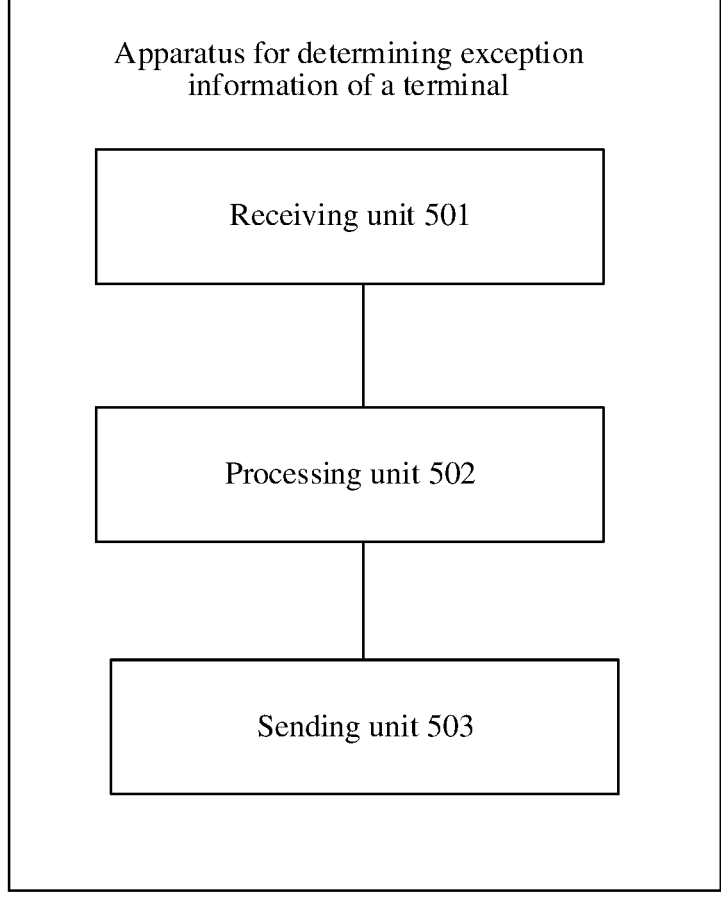
FIG. 25 is a schematic structural diagram of an apparatus for determining exception information of a terminal according to an embodiment of this application.

FIG. 25 is a possible schematic diagram of a logical structure of the apparatus for determining exception information of a terminal in the foregoing embodiments. The apparatus for determining exception information of a terminal may be the data analytics network element, or a chip applied to the data analytics network element in the foregoing embodiments. The apparatus for determining exception information of a terminal includes a receiving unit 501 and a processing unit 502.

The receiving unit 501 is configured to support the data analytics network element in performing S503 and S504 in the foregoing embodiment. The processing unit 502 is configured to support the data analytics network element in performing S505 in the foregoing embodiment.

In an optional implementation, the receiving unit 501 is further configured to support the data analytics network element in performing S507, S5042, and S509 in the foregoing embodiment. In an optional implementation, the apparatus for determining exception information of a terminal may further include a sending unit 503 configured to support the data analytics network element in performing S5041 and S510 in the foregoing embodiment. To be more specific, when the apparatus shown in FIG. 25 is configured to implement the steps performed by the data analytics network element in Embodiment 2, the sending unit 503 is an optional unit.

In an optional implementation, the apparatus for determining exception information of a terminal shown in FIG. 25 may further include a storage unit configured to store an instruction or a program.

When the apparatus for determining exception information of a terminal shown in FIG. 25 uses the structure shown in FIG. 18, the sending unit 503 and the receiving unit 501 may correspond to the communications interface 230, and the processing unit 502 may correspond to the processor 220. In an optional implementation, when the apparatus for determining exception information of a terminal shown in FIG. 25 uses the structure shown in FIG. 18, the storage unit may correspond to the memory 240. The communications interface 230 is configured to support the apparatus for determining exception information of a terminal shown in FIG. 18 in performing S503 and S504 in the foregoing embodiment. The processor 220 is configured to support the apparatus for determining exception information of a terminal shown in FIG. 18 in performing S505 in the foregoing embodiment.

In an optional implementation, the communications interface 230 is configured to support the apparatus for determining exception information of a terminal shown in FIG. 18 in performing S507, S5042, and S509 in the foregoing embodiment. In an optional implementation, the communications interface 230 is further configured to support the apparatus for determining exception information of a terminal shown in FIG. 18 in performing S5041 and S510 in the foregoing embodiment.

Figure 26:
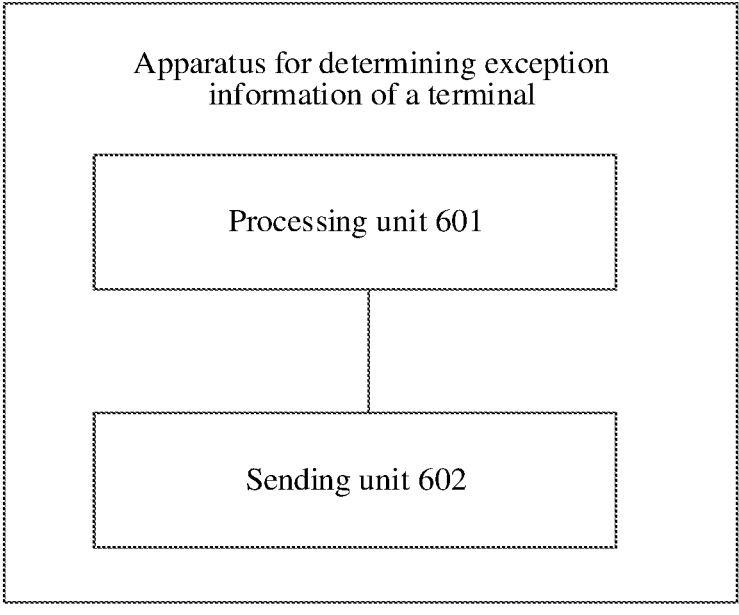
FIG. 26 is a schematic structural diagram of an apparatus for determining exception information of a terminal according to an embodiment of this application.

FIG. 26 is a possible schematic diagram of a logical structure of the apparatus for determining exception information of a terminal in the foregoing embodiments. The apparatus for determining exception information of a terminal may be the data analytics network element, or a chip applied to the data analytics network element in the foregoing embodiments. Alternatively, the apparatus for determining exception information of a terminal may be the first network element, or a chip applied to the first network element in the foregoing embodiments. The apparatus for determining exception information of a terminal includes a processing unit 601 and a sending unit 602.

For example, the apparatus shown in FIG. 26 is the data analytics network element, or a chip applied to the data analytics network element in the foregoing embodiments. The sending unit 602 is configured to support the data analytics network element in performing S601 and S603 in the foregoing embodiment. The processing unit 601 is configured to support the data analytics network element in performing S604 in the foregoing embodiment. The sending unit 602 is further configured to support the data analytics network element in performing S605 in the foregoing embodiment.

For another example, the apparatus shown in FIG. 26 is the first network element, or a chip applied to the first network element in the foregoing embodiments. The processing unit 601 is configured to support the first network element in performing S501 in the foregoing embodiment. The sending unit 602 is configured to support the first network element in performing S502 in the foregoing embodiment.

In an optional implementation, the sending unit 602 is further configured to support the first network element in performing S506 in the foregoing embodiment.

In an optional implementation, the apparatus shown in FIG. 26 may further include a storage unit configured to store an instruction or a program.

When the apparatus shown in FIG. 26 uses the structure shown in FIG. 18, the sending unit 602 may correspond to the communications interface 230, and the processing unit 602 may correspond to the processor 220. In an optional implementation, when the apparatus for determining exception information of a terminal shown in FIG. 26 uses the structure shown in FIG. 18, the storage unit may correspond to the memory 240.

For example, when the apparatus shown in FIG. 18 is a data analytics network element, the communications interface 230 is configured to support the apparatus for determining exception information of a terminal shown in FIG. 18 in performing S601, S603, and S605 in the foregoing embodiment. The processor 220 is configured to support the apparatus for determining exception information of a terminal shown in FIG. 18 in performing S604 in the foregoing embodiment.

For another example, when the apparatus shown in FIG. 18 is a first network element, the processor 220 is configured to support the apparatus for determining exception information of a terminal shown in FIG. 18 in performing S501 in the foregoing embodiment. The communications interface 230 is configured to support the apparatus for determining exception information of a terminal shown in FIG. 18 in performing S502 in the foregoing embodiment.

In an optional implementation, the communications interface 230 is configured to support the apparatus for determining exception information of a terminal shown in FIG. 18 in performing S506 in the foregoing embodiment.

An embodiment of this application provides a communications apparatus. The communications apparatus includes one or more modules configured to implement the method in step 601 to step 606. The one or more modules may correspond to step 601 to step 606. In this embodiment of this application, for each step performed by the first network element in the method, the first network element includes a unit or module for performing the step in the method. For each step performed by the data analytics network element in the method, the data analytics network element includes a unit or module for performing the step in the method. For example, a module that controls or processes an action of the information transmission apparatus may be referred to as a processing module, and a module that performs a message or data processing step on the information transmission apparatus side may be referred to as a communications module.

Figure 27:
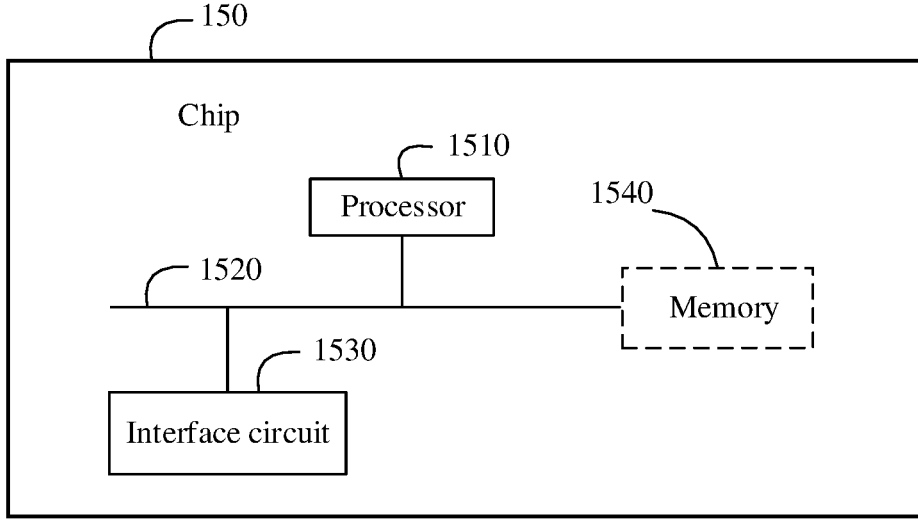
FIG. 27 is a schematic structural diagram of a chip according to an embodiment of this application.

FIG. 27 is a schematic structural diagram of a chip 150 according to an embodiment of the present disclosure. The chip 150 includes one or more (including two) processors 1510 and an interface circuit 1530.

Optionally, the chip 150 further includes a memory 1540. The memory 1540 may include a read-only memory and a random access memory, and provide an operation instruction and data to the processor 1510. A part of the memory 1540 may further include a non-volatile random-access memory (NVRAM).

In some implementations, the memory 1540 stores the following elements, an executable module or a data structure, or a subset thereof, or an extended set thereof.

In this embodiment of the present disclosure, a corresponding operation is performed by invoking the operation instruction stored in the memory 1540 (the operation instruction may be stored in an operating system).

A possible implementation is: A data analytics network element, a user data management network element, and a core network element use a similar chip structure, and different apparatuses may use different chips to implement respective functions.

The processor 1510 controls operations of the data analytics network element, the user data management network element, and the core network element. The processor 1510 may also be referred to as a central processing unit (CPU). The memory 1540 may include a read-only memory (ROM) and a random-access memory (RAM), and provide an instruction and data to the processor 1510. A part of the memory 1540 may further include an NVRAM. For example, in an application, the memory 1540, the interface circuit 1530, and the memory 1540 are coupled together using a bus system 1520. In addition to a data bus, the bus system 1520 may further include a power bus, a control bus, a status signal bus, and the like. However, for clear description, various types of buses in FIG. 27 are marked as the bus system 1520.

The method disclosed in the foregoing embodiments of the present disclosure may be applied to the processor 1510, or implemented by the processor 1510. The processor 1510 may be an integrated circuit chip and has a signal processing capability. In an implementation process, the steps in the foregoing methods can be implemented using a hardware integrated logic circuit in the processor 1510, or using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1510 may implement or perform the methods, the steps, and logical block diagrams that are disclosed in the embodiments of the present disclosure. The general-purpose processor may be a microprocessor, or the processor may be any conventional processor or the like. The steps of the methods disclosed with reference to the embodiments of the present disclosure may be directly implemented by a hardware decoding processor, or may be implemented by a combination of hardware and software modules in the decoding processor. A software module may be located in a mature storage medium in the art, such as a random-access memory, a flash memory, a read-only memory, a programmable read-only memory, an electrically erasable programmable memory, a register, or the like. The storage medium is located in the memory 1540, and the processor 1510 reads information in the memory 1540 and implements the steps in the foregoing methods in combination with hardware of the processor.

Optionally, the interface circuit 1530 is configured to perform the receiving and sending steps processed by the data analytics network element, the user data management network element, and the core network element in the embodiments shown in FIG. 3, FIG. 4, FIG. 6, FIG. 7, FIG. 8, FIG. 9, FIG. 10, FIG. 11A and FIG. 11B, FIG. 12A and FIG. 12B, FIG. 13, FIG. 14, and FIG. 15.

The processor 1510 is configured to perform the steps processed by the data analytics network element, the user data management network element, and the core network element in the embodiments shown in FIG. 3, FIG. 4, FIG. 6, FIG. 7, FIG. 8, FIG. 9, FIG. 10, FIG. 11A and FIG. 11B, FIG. 12A and FIG. 12B, FIG. 13, FIG. 14, and FIG. 15.

In the foregoing embodiment, the instruction stored in the memory for being executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

According to an aspect, a computer-readable storage medium is provided. The computer-readable storage medium stores an instruction. When the instruction is run, a data analytics network element or a chip applied to a data analytics network element is enabled to perform S102, S111, S112, S103, S1012, S105, S108, and S109 in the embodiments; and/or is enabled to be used in another process performed by the data analytics network element or the chip applied to the data analytics network element in the technology described in this specification.

According to another aspect, a computer-readable storage medium is provided. The computer-readable storage medium stores an instruction. When the instruction is run, a core network element or a chip applied to a core network element is enabled to perform S1014 and S1013 in the embodiments; and/or is enabled to be used in another process performed by the core network element or the chip applied to the core network element in the technology described in this specification.

According to still another aspect, a computer-readable storage medium is provided. The computer-readable storage medium stores an instruction. When the instruction is run, a user data management network element or a chip applied to a user data management network element is enabled to perform S104-1, S104, S106, S107, and S110 in the embodiments; and/or is enabled to be used in another process performed by the user data management network element or the chip applied to the user data management network element in the technology described in this specification.

According to another aspect, a computer-readable storage medium is provided. The computer-readable storage medium stores an instruction. When the instruction is run, a data analytics network element or a chip applied to a data analytics network element is enabled to perform S503, S504, S505, S507, S5042, S509, S5041, and S510 in the embodiments; and/or is enabled to be used in another process performed by the data analytics network element or the chip applied to the data analytics network element in the technology described in this specification.

According to still another aspect, a computer-readable storage medium is provided. The computer-readable storage medium stores an instruction. When the instruction is run, a data analytics network element or a chip applied to a data analytics network element is enabled to perform S601, S603, S604, and S605 in the embodiments; and/or is enabled to be used in another process performed by the data analytics network element or the chip applied to the data analytics network element in the technology described in this specification.

According to still another aspect, a computer-readable storage medium is provided. The computer-readable storage medium stores an instruction. When the instruction is run, a first network element or a chip applied to a first network element is enabled to perform S501, S502, and S506 in the embodiments; and/or is enabled to be used in another process performed by the first network element or the chip applied to the first network element in the technology described in this specification.

The foregoing readable storage medium may include: any medium that can store program code, such as a USB flash drive, a removable hard disk, a read-only memory, a random access memory, a magnetic disk, or an optical disc.

According to an aspect, a computer program product including an instruction is provided. The computer program product stores the instruction. When the instruction is run, a data analytics network element or a chip applied to a data analytics network element is enabled to perform S102, S111, S112, S103, S1012, S105, S108, and S109 in the embodiments; and/or is enabled to be used in another process performed by the data analytics network element or the chip applied to the data analytics network element in the technology described in this specification.

According to another aspect, a computer program product including an instruction is provided. The computer program product stores the instruction. When the instruction is run, a core network element or a chip applied to a core network element is enabled to perform S1014 and S1013 in the embodiments; and/or is enabled to be used in another process performed by the core network element or the chip applied to the core network element in the technology described in this specification.

According to another aspect, a computer program product including an instruction is provided. The computer program product stores the instruction. When the instruction is run, a user data management network element or a chip applied to a user data management network element is enabled to perform S104-1, S104, S106, S107, and S110 in the embodiments; and/or is enabled to be used in another process performed by the user data management network element or the chip applied to the user data management network element in the technology described in this specification.

According to another aspect, a computer program product including an instruction is provided. The computer program product stores the instruction. When the instruction is run, a data analytics network element or a chip applied to a data analytics network element is enabled to perform S503, S504, S505, S507, S5042, S509, S5041, and S510 in the embodiments; and/or is enabled to be used in another process performed by the data analytics network element or the chip applied to the data analytics network element in the technology described in this specification.

According to still another aspect, a computer program product including an instruction is provided. The computer program product stores the instruction. When the instruction is run, a data analytics network element or a chip applied to a data analytics network element is enabled to perform S601, S603, S604, and S605 in the embodiments; and/or is enabled to be used in another process performed by the data analytics network element or the chip applied to the data analytics network element in the technology described in this specification.

According to still another aspect, a computer program product including an instruction is provided. The computer program product stores the instruction. When the instruction is run, a first network element or a chip applied to a first network element is enabled to perform S501, S502, and S506 in the embodiments; and/or is enabled to be used in another process performed by the first network element or the chip applied to the first network element in the technology described in this specification.

According to one aspect, a chip is provided. The chip is applied to a data analytics network element. The chip includes one or more (including two) processors and an interface circuit. The interface circuit is interconnected to the one or more (including two) processors using a line. The processor is configured to run an instruction, to perform S102, S111, S112, S103, S1012, S105, S108, and S109 in the embodiments; and/or to be used in another process performed by the data analytics network element in the technology described in this specification.

According to another aspect, a chip is provided. The chip is applied to a core network element. The chip includes one or more (including two) processors and an interface circuit. The interface circuit is interconnected to the one or more (including two) processors using a line. The processor is configured to run an instruction, to perform S1014 and S1013 in the embodiments; and/or to be used in another process performed by the core network element in the technology described in this specification.

According to still another aspect, a chip is provided. The chip is applied to a user data management network element. The chip includes one or more (including two) processors and an interface circuit. The interface circuit is interconnected to the one or more (including two) processors using a line. The processor is configured to run an instruction, to perform S104-1, S104, S106, S107, and S110 in the embodiments; and/or to be used in another process performed by the user data management network element in the technology described in this specification.

According to another aspect, a chip is provided. The chip is applied to a data analytics network element. The chip includes one or more (including two) processors and an interface circuit. The interface circuit is interconnected to the one or more (including two) processors using a line. The processor is configured to run an instruction, to perform S503, S504, S505, S507, S5042, S509, S5041, and S510 in the embodiments.

According to still another aspect, a chip is provided. The chip is applied to a data analytics network element. The chip includes one or more (including two) processors and an interface circuit. The interface circuit is interconnected to the one or more (including two) processors using a line. The processor is configured to run an instruction, to perform S601, S603, S604, and S605 in the embodiments.

According to still another aspect, a chip is provided. The chip is applied to a first network element. The chip includes one or more (including two) processors and an interface circuit. The interface circuit is interconnected to the one or more (including two) processors using a line. The processor is configured to run an instruction, to perform S501, S502, and S506 in the embodiments.

In addition, this application further provides a communications system. The communications system includes the information processing apparatus shown in FIG. 16 to FIG. 18, the information sending apparatus shown in FIG. 19 to FIG. 21, and the information processing apparatus shown in FIG. 22 to FIG. 24.

In addition, this application further provides a communications system. The communications system includes: the apparatus for determining exception information of a terminal shown in FIG. 25, used as a data analytics network element; and the apparatus for determining exception information of a terminal shown in FIG. 26, used as a first network element. For steps performed by the data analytics network element and the first network element in the system, refer to descriptions in FIG. 25 and FIG. 26. Details are not described herein again.

All or some of the foregoing embodiments may be implemented by software, hardware, firmware, or any combination thereof. When a software program is used to implement the embodiments, the embodiments may be implemented partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, various modifications and combinations may be made to them without departing from the scope of this application. Correspondingly, the specification and accompanying drawings are merely example description of this application defined by the accompanying claims, and is considered as any of or all modifications, variations, combinations or equivalents that cover the scope of this application. A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:

obtaining, by a data analytics network element, terminal behavioral information of a plurality of second terminals;

determining, by the data analytics network element and based on the terminal behavioral information of the plurality of second terminals, expected terminal behavioral information;

sending, by the data analytics network element and to a first core network element, the expected terminal behavioral information;

receiving, by the first core network element, from the data analytics network element, the expected terminal behavioral information;

sending, by the first core network element and to the data analytics network element, first terminal behavioral information of a first terminal based on the first core network element's determination from a comparison of the first terminal behavioral information of the first terminal to the received expected terminal behavioral information from the data analytics network element, wherein the first terminal behavioral information of the first terminal does not match the expected terminal behavioral information;

receiving, by the data analytics network element and from the first core network element, the first terminal behavioral information of the first terminal; and determining, by the data analytics network element and based on the expected terminal behavioral information and the first terminal behavioral information, that the first terminal is abnormal and has an exception type, wherein the exception type of the first terminal comprises at least one of being incorrectly used or being hijacked.

2. The method of claim 1, wherein the expected terminal behavioral information comprises one or more of a stationary indication, a terminal moving trajectory, a periodic communication indicator, a communication duration, a communication period, or a scheduled communication time.

3. The method of claim 1, wherein either the first core network element is an access and mobility management function network element, or the first core network element is a session management function network element.

4. The method of claim 1, further comprising sending, by the data analytics network element and to a user data management network element, the expected terminal behavioral information, wherein the expected terminal behavioral information is configured to be used as user subscription data.

5. The method of claim 1, further comprising obtaining, by the data analytics network element and from a second core network element, second terminal behavioral information of the first terminal.

6. The method of claim 5, wherein determining that the first terminal is abnormal comprises determining, by the data analytics network element and based on the expected terminal behavioral information, the first terminal behavioral information of the first terminal, and the second terminal behavioral information of the first terminal, that the first terminal is abnormal.

7. The method of claim 1, further comprising determining, by the data analytics network element and based on the expected terminal behavioral information and the first terminal behavioral information, exception information of the first terminal, wherein the exception information of the first terminal comprises at least one of the exception type, an exception identifier, or an exception level.

8. The method of claim 7, further comprising sending, by the data analytics network element and to a network element, an analytics result, wherein the analytics result indicates the exception information of the first terminal.

9. The method of claim 8, further comprising terminating, by the network element and based on the exception information from the data analytics network element, network service for the first terminal.

10. A communication system comprising:
a data analytics network element configured to:
obtain terminal behavioral information of a plurality of second terminals;
determine, based on the terminal behavioral information of the plurality of second terminals, expected terminal behavioral information;
send the expected terminal behavioral information to a first core network element;
receive, from the first core network element, first terminal behavioral information of a first terminal; and
determine, based on the expected terminal behavioral information and the first terminal behavioral information, that the first terminal is abnormal and has an exception type, wherein the exception type of the first terminal comprises at least one of being incorrectly used or being hijacked; and
the first core network element configured to:
receive, from the data analytics network element, the expected terminal behavioral information; and
send, to the data analytics network element, the first terminal behavioral information of the first terminal based on the first core network element's determination from a comparison of the first terminal behavioral information of the first terminal to the received expected terminal behavioral information from the data analytics network element, wherein the first terminal behavioral information of the first terminal does not match the expected terminal behavioral information.

11. The communication system of claim 10, wherein the expected terminal behavioral information comprises one or more of a stationary indication, a terminal moving trajectory, a periodic communication indicator, a communication duration, a communication period, or a scheduled communication time.

12. The communication system of claim 10, wherein the first core network element is either an access and mobility management function network element or a session management function network element.

13. The communication system of claim 10, wherein the data analytics network element is further configured to send, to a user data management network element, the expected terminal behavioral information, and wherein the expected terminal behavioral information is configured to be used as user subscription data.

14. The communication system of claim 10, wherein the data analytics network element is further configured to obtain, from a second core network element, second terminal behavioral information of the first terminal.

15. The communication system of claim 14, wherein the data analytics network element is configured to determine that the first terminal is abnormal by determining, based on the expected terminal behavioral information, the first terminal behavioral information of the first terminal, and the second terminal behavioral information of the first terminal, that the first terminal is abnormal.

16. The communication system of claim 10, wherein the data analytics network element is further configured to determine, based on the expected terminal behavioral information and the first terminal behavioral information, exception information of the first terminal, and wherein the exception information of the first terminal comprises at least one of the exception type, an exception identifier, or an exception level.

17. The communication system of claim 16, further comprising a network element, wherein the data analytics network element is further configured to send, to the network element, the exception information of the first terminal, and wherein the network element is configured to revive, from the data analytics network element, the exception information of the first terminal.

18. The communication system of claim 17, wherein the network element is further configured to terminate, based on the exception information from the data analytics network element, network service for the first terminal.

19. A communication system comprising:
a data analytics network element comprising:
a first memory configured to store first instructions; and
one or more first processors coupled to the first memory and configured to execute the first instructions to cause the data analytics network element to:
obtain terminal behavioral information of a plurality of second terminals;
determine, based on the terminal behavioral information of the plurality of second terminals, expected terminal behavioral information;
send the expected terminal behavioral information to a first core network element;
receive, from the first core network element, first terminal behavioral information of a first terminal; and
determine, based on the expected terminal behavioral information and the first terminal behavioral information, that the first terminal is abnormal and has an exception type, wherein the exception type of the first terminal comprises at least one of being incorrectly used or being hijacked; and
the first core network element comprising:
a second memory configured to store second instructions; and
one or more second processors coupled to the second memory and configured to execute the second instructions to cause the first core network element to:
receive, from data analytics network element, the expected terminal behavioral information; and
send, to the data analytics network element, the first terminal behavioral information of the first terminal based on the first core network element's determination from a comparison of the first terminal behavioral information of the first terminal to the received expected terminal behavioral information from the data analytics network element, wherein the first terminal behavioral information of the first terminal does not match the expected terminal behavioral information.

20. The communication system of claim 19, wherein the expected terminal behavioral information comprises one or more of a stationary indication, a terminal moving trajectory, a periodic communication indicator, a communication duration, a communication period, or a scheduled communication time.

* * * * *